US012101399B2

(12) United States Patent
Dawson, III et al.

(10) Patent No.: US 12,101,399 B2
(45) Date of Patent: Sep. 24, 2024

(54) SECURE STORAGE TECHNIQUES UTILIZING CONSORTIUM DISTRIBUTED LEDGERS

(71) Applicant: Pruve Systems, Inc., Silver Spring, MD (US)

(72) Inventors: Thomas J. Dawson, III, Silver Spring, MD (US); Edward Pasewicz, Fort Lauderdale, FL (US); Kawal Arora, Silver Spring, MD (US); Sunil Kumar Arora, Reading (GB)

(73) Assignee: PRUVE SYSTEMS, INC., Silver Spring, MD (US)

( * ) Notice: Subject to any disclaimer, the term of this patent is extended or adjusted under 35 U.S.C. 154(b) by 393 days.

(21) Appl. No.: 17/380,815

(22) Filed: Jul. 20, 2021

(65) Prior Publication Data
US 2022/0021528 A1 Jan. 20, 2022

Related U.S. Application Data

(60) Provisional application No. 63/070,421, filed on Aug. 26, 2020, provisional application No. 63/054,137, (Continued)

(51) Int. Cl.
H04L 9/08 (2006.01)
G06F 21/30 (2013.01)
(Continued)

(52) U.S. Cl.
CPC ........... *H04L 9/0866* (2013.01); *G06F 21/30* (2013.01); *H04L 9/0819* (2013.01);
(Continued)

(58) Field of Classification Search
CPC ... H04L 9/0866; H04L 9/0819; H04L 9/0894; H04L 9/3236; H04L 9/50;
(Continued)

(56) References Cited

U.S. PATENT DOCUMENTS 10,972,475 B1 * 4/2021 Zaki ...................... H04L 63/101
11,093,033 B1 * 8/2021 Wang .................... G06V 40/18
(Continued)

FOREIGN PATENT DOCUMENTS

CN 112132812 A 12/2020

OTHER PUBLICATIONS

Application No. PCT/US2021/042422, International Search Report and Written Opinion, Mailed on Nov. 2, 2021, 13 pages.

*Primary Examiner* — Shaqueal D Wade-Wright
(74) *Attorney, Agent, or Firm* — Kilpatrick Townsend & Stockton LLP

(57) ABSTRACT

Techniques are disclosed for securely managing data. In one example, a service provider receives user image data and user biometric data associated with a user. The service provider generates a user profile cryptographic key based on hashing this data, which may be associated with a user identifier. The service provider may further generate a public/private key pair associated with the user identifier. The public key and the user profile cryptographic key are stored, in association with the user identifier, to a consortium blockchain network. The service provider then receives a request, signed with the private key, to store a document in association with the user identifier. The service provider generates a document cryptographic key of the document, and executes a request to store the document cryptographic key to the blockchain in association with the user profile cryptographic key, the request verified using the public key.

20 Claims, 31 Drawing Sheets

Related U.S. Application Data filed on Jul. 20, 2020, provisional application No. 63/054,126, filed on Jul. 20, 2020, provisional application No. 63/054,110, filed on Jul. 20, 2020, provisional application No. 63/054,122, filed on Jul. 20, 2020.

(51) Int. Cl.
*H04L 9/32* (2006.01)
*H04L 9/40* (2022.01)
*G06F 21/62* (2013.01)
*H04L 9/00* (2022.01)

(52) U.S. Cl.
CPC .......... *H04L 9/0894* (2013.01); *H04L 9/3236* (2013.01); *H04L 63/08* (2013.01); *G06F 21/6209* (2013.01); *G06F 21/6218* (2013.01); *H04L 9/50* (2022.05)

(58) Field of Classification Search
CPC ............. H04L 2209/463; H04L 9/3239; H04L 9/3255; H04L 63/08; H04L 9/32; H04L 9/3231; H04L 9/3234; H04L 9/321; H04L 63/0853; H04L 63/0861; H04L 63/101; H04L 63/102; G06F 21/30; G06F 21/60; G06F 21/602; G06F 21/604; G06F 21/62; G06F 21/6209; G06F 21/6218; H04W 12/06

See application file for complete search history.

(56) References Cited

U.S. PATENT DOCUMENTS

| | | |
|---|---|---|
| 2017/0279801 A1 | 9/2017 | Andrade |
| 2018/0115426 A1 | 4/2018 | Andrade |
| 2019/0149334 A1 | 5/2019 | Van Der Velden |
| 2019/0222567 A1 | 7/2019 | Caldera et al. |
| 2020/0036707 A1* | 1/2020 | Callahan ................. H04L 67/53 |
| 2020/0293515 A1* | 9/2020 | Wang .................. G06F 16/2379 |
| 2021/0399904 A1* | 12/2021 | Fan ...................... H04L 63/0823 |
| 2022/0038291 A1* | 2/2022 | Hong .................... H04L 9/3231 |

* cited by examiner

SECURE STORAGE TECHNIQUES UTILIZING CONSORTIUM DISTRIBUTED LEDGERS

CROSS-REFERENCE TO RELATED APPLICATIONS

This application claims priority to U.S. Provisional Application No. 63/054,110, entitled, "A SECURE STORAGE PLATFORM COMPRISING A CONSORTIUM OF PUBLIC ENTITIES STORING DISTRIBUTED LEDGERS (098000-1199824-000200US)," filed on Jul. 20, 2020; U.S. Provisional Application No. 63/054,122, entitled, "LIVE ONBOARDING AND CREATION OF A PERSONAL UNIQUE IDENTITY FOR USE IN A SECURE STORAGE PLATFORM (098000-1199825-000300US)," filed on Jul. 20, 2020; U.S. Provisional Application No. 63/054,126, entitled, "ONBOARDING A CORPORATION/RECORDING A DOCUMENT OR AGREEMENT ON A SECURE STORAGE PLATFORM (098000-1199827-000400US)," filed on Jul. 20, 2020; U.S. Provisional Application No. 63/054,137, entitled, "SECURELY SIGNING AN AGREEMENT BETWEEN MULTIPLE PARTIES USING A SECURE STORAGE PLATFORM/VERIFICATION OF THE AGREEMENT OR OTHER DOCUMENT (098000-1199828-000500US)," filed on Jul. 20, 2020; and U.S. Provisional Application No. 63/070,421, entitled, "A SECURE VOTING PLATFORM (098000-1206137-000600US)," filed on Aug. 26, 2020, the contents of each are incorporated by reference herein in their entirety for all purposes.

BACKGROUND

Computer systems are often tasked with, among other computing operations, storing files (e.g., documents). For example, a person may author a document (e.g., a digital artwork, a legal contract, etc.) and store the document on a computer system (e.g., of a cloud computing service). The person may subsequently share the document with other people, for example, giving access to one or more people to edit the document using the cloud computing service (e.g., a person may intend to sign a legal contract, a person may make one or more changes to a digital artwork, etc.). While these methods of document authoring and/or collaborating have several advantages (e.g., ease of sharing documents and/or enabling users to make updates to documents), several challenges remain.

For example, in some cases, it may be challenging for a user to prove that they are original owner (e.g., author) of a particular document. In another example, it may be challenging for a user to determine if a particular document (e.g., a digital artwork) that they currently possess is in fact the authentic digital artwork. In yet another example, it may be challenging to confirm the authenticity of a document (e.g., a legal contract) that is purported to be signed by multiple parties. These challenges are evident when considering that data may often be shared from party to party, the data may often need to be stored and managed for lengthy periods of time, and/or the possibility that data storage systems may sometimes be compromised (e.g., by an unauthorized party). Accordingly, it would be advantageous to improve upon existing systems for verifying, storing, and/or sharing data.

BRIEF DESCRIPTION OF THE DRAWINGS

Various embodiments in accordance with the present disclosure will be described with reference to the drawings, in which:

Figure 12:
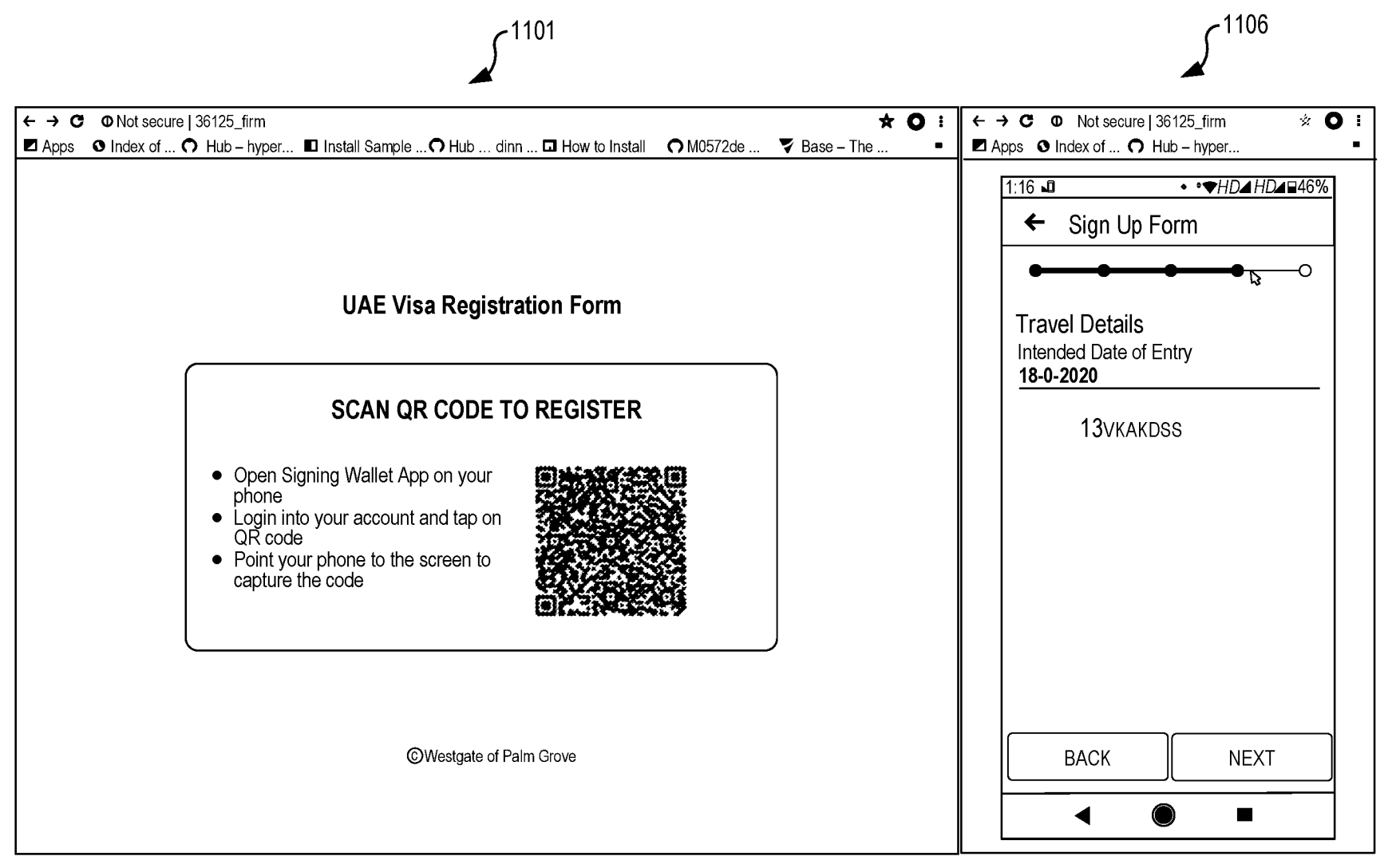

FIG. 12 illustrates additional example UI views that may be presented to facilitate an application process for a new Visa, according to some embodiments;

Figure 13:
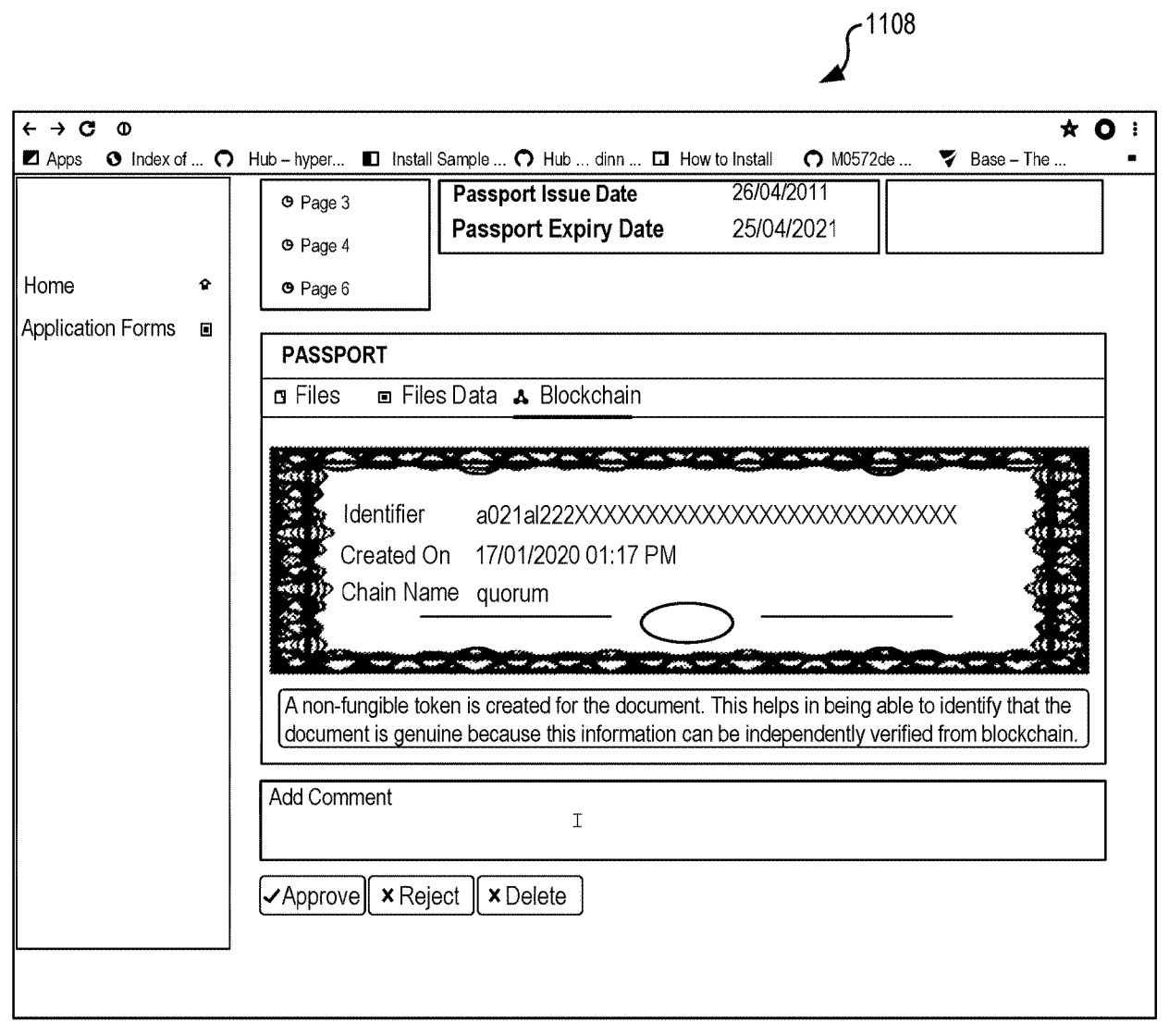

FIG. 13 illustrates additional example UI views that may be presented to facilitate an application process for a new Visa, according to some embodiments;

DETAILED DESCRIPTION

Figure 1:
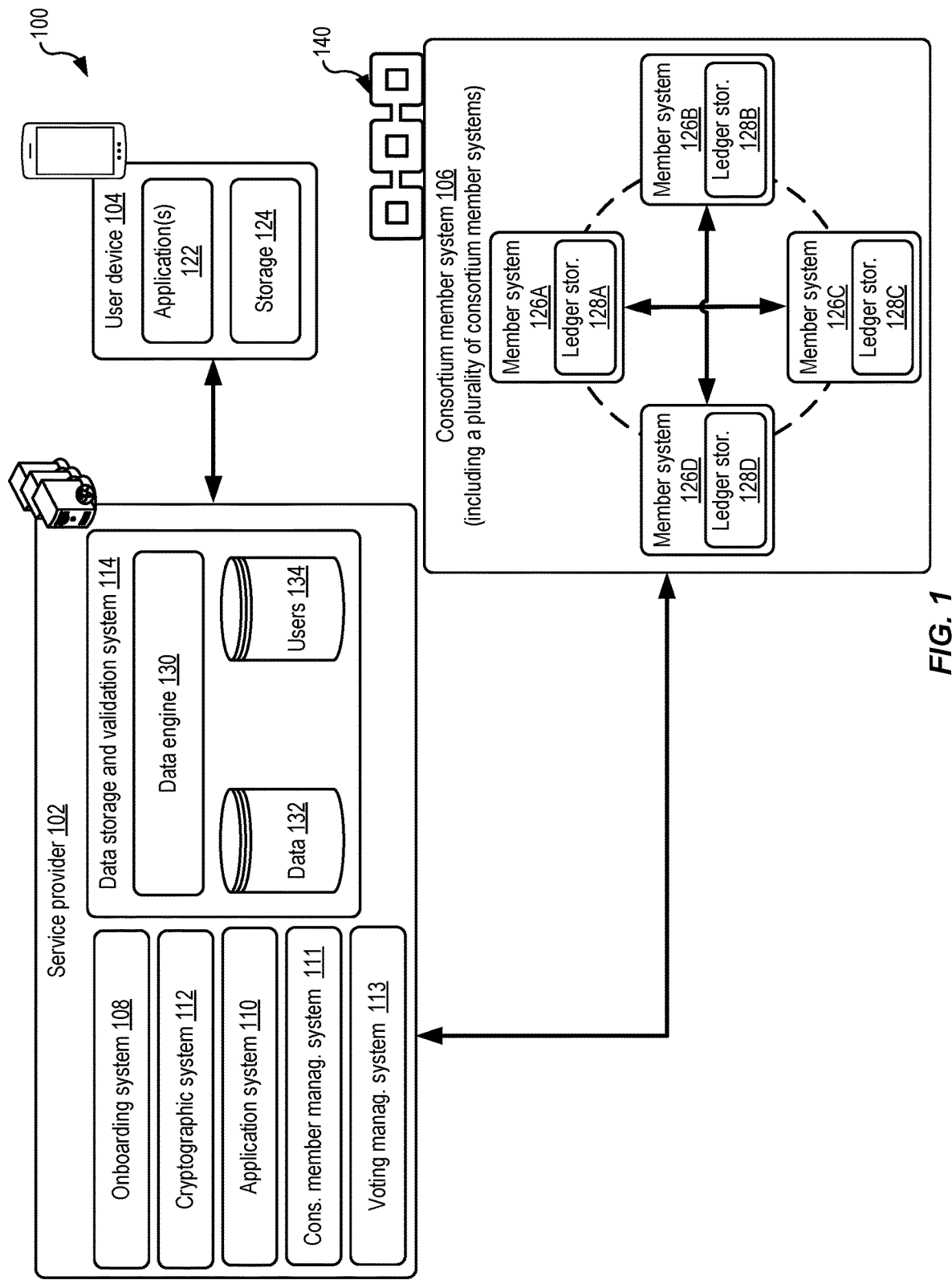
FIG. 1 illustrates a block diagram showing an example architecture, platform, and/or system for managing blockchain-based documents and blockchain-based identities, according to some embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments described herein are directed to, among other things, techniques for securely storing, retrieving, sharing, and/or verifying data as it relates to conducting secure transactions, authenticating documents and users, and the like. Consider an illustrative example in which a service provider computing system (which may be alternatively described herein as a "service provider") enables a service whereby a user may onboard with the service provider (e.g., via a user device), and subsequently may store a document in association with the user (e.g., indicating that the user is the original author and/or owner of the stored document). In this example, the user device may first register (e.g., onboard) a user account with the service provider. For example, the user device may receive user credentials (e.g., such as a username, password, security information, etc.), and then provide the information to the service provider. The user credentials may be used by the service provider to generate user cryptographic keys (e.g., including a user private key/user public key pair), whereby the user private key may be subsequently used to sign a transaction as being authorized by the particular user. Continuing with this example, during the onboarding process, the user device may further capture (e.g., via an attached camera and/or other suitable input/output (I/O) device) a livestream that shows the user's face moving in different directions (e.g., showing their face from different angles), as prompted by instructions displayed for the user by the user device. The user device may also receive (e.g., via an image upload) an image corresponding to a jurisdictional identifier (e.g., a passport photo) of the user. Both the livestream sequence of images and the passport photo may be uploaded to the service provider. The service provider may verify that the image and the livestream images match. Upon verifying the match, the service provider generate a user profile of the user that is associated with (e.g., includes) the uploaded image/livestream content. The service provider may further hash data of the user profile to generate one or more hashes and/or an overall hash, which may alternatively be referred to herein as a user profile cryptographic key. In some embodiments, any suitable hashing algorithm may be used to generate a hash (e.g., a Message-Digest algorithm 5 (MD5), a Secure Hash Algorithm (SHA-1), etc.). This user profile cryptographic key may also be provided for storage on the user device. As part of the onboarding process, the service provider may further store one or more keys (e.g., and/or other data objects, such as a user identifier for the user account) to a blockchain network (e.g., which may include a plurality of consortium member systems that respectively maintain a distributed ledger). For example, the service provider may store, among other things, the user public key and the user profile cryptographic key to the blockchain network. The service provider may also store keys and/or other data objects to the service provider system. In some embodiments, the plurality of consortium member systems may be a set of member computer systems that have respective agreements with the service provider (e.g., as trusted entities forming the consortium). For example, in some embodiments, a member system may be associated with a trusted public utility entity, a municipality, a government agency, etc.

Subsequent to the onboarding process, and, continuing with the example above, the user may decide to author and store a document via the service provider. For example, the user device may receive user credentials (e.g., username and password) to log in to the service provider. In this case, the user credentials (and/or a previously generated recovery key) may be used to generate the user private key, which may, in turn, be used to log in to the service provider (e.g., via signing a challenge text using the user private key). In some embodiments, the service provider may authenticate the login process by using the user public key to verify the signature of the challenge text. Once the user device is logged in via the user's credentials, the user device may receive input that requests a document (e.g., a legal contract, a digital artwork, etc.) to be stored by the service provider, whereby the request further indicates to associate the user as being the owner and/or author of the document. The service provider may then generate a document cryptographic key by generating a hash of the document data. The service provider may then invoke (e.g., execute) a transaction request to the plurality of consortium member systems, requesting to the store the document in association with the user. In some embodiments, the user device (and/or the service provider) may sign the transaction request with the user private key. In some embodiments, the transaction request may include any suitable information, including, for example, the document cryptographic key, document data, metadata about the document and/or transaction (e.g., the user's name, document creation date, etc.), the user profile cryptographic key, etc.

Continuing with the illustration, a representative consortium member system of the plurality of consortium member systems of the blockchain network may receive the transaction request, verify the request, and then store the one or more data objects in accordance with the request. For example, the representative consortium member system may verify the request based in part on verifying the signature of the transaction request by using the user public key (e.g., previously stored to the blockchain). In some embodiments, a smart contract may be used to perform the verification process and/or one or more functions associated with performing the transaction. For example, a particular smart contract may verify this particular transaction request, which may indicate that this particular user has the authority to execute one or more functions of this smart contract. Upon verification, the smart contract may then store to the distributed ledger data objects in association with one another. In some embodiments, the associated data objects may include, for example, the document cryptographic key, the user profile cryptographic key for the user (e.g., associated with the user's identity), the document metadata, a user identifier (ID) for the user, etc. In some embodiments, any suitable data objects (e.g., document data, images, cryptographic keys, etc.) may be stored to the blockchain. The smart contract may then provide a response to the service provider, indicating that the transaction was successfully executed. The service provider may further store (e.g., to the service provider system) the document data and/or other suitable information associated with the transaction. In some embodiments, in part for storage efficiency, the service provider may handle storage of data with a significant disk footprint (e.g., document data, images, etc.), while the blockchain network may be used to efficiently store data that is used for auditing and/or verification purposes (e.g., cryptographic keys such as document or user profile hashes, public keys, user identifiers, etc.). Upon completion of the transaction execution, the service provider may return a response to the user device, indicating that the transaction was successfully executed.

In some embodiments, a service provider may enable various applications for securely storing, retrieving, sharing, and/or verifying data as it relates to conducting secure transactions, authenticating documents and users, and the like. For example, in some embodiments, the service provider may enable a user device to confirm an authenticity and/or status of a particular document (e.g., confirming that a digital artwork is the original artwork, and/or if the digital artwork is copyright protected). In some embodiments, this may be enabled based in part on using the blockchain network to store a document cryptographic key (e.g., a hash) of the original digital artwork. In another example, embodiments, may enable a plurality of parties to be associated with a particular one or more documents. For example, the service provider may facilitate the signing and secure storage of a legal contract by multiple parties. In some embodiments, this may also be facilitated by using the blockchain network to securely validate and store associations between data objects (e.g., via execution of one or more smart contracts.)

In some embodiments, the service provider may enable onboarding of one or more organizational entities (e.g., a law firm, a hospital, a government organization, etc.). For example, organizational entity information (e.g., an organization ID, a cryptographic key, etc.) may be stored by the service provider to the blockchain network (and/or the service provider system). In some embodiments, one or more users may be associated with a particular organizational entity. For example, suppose that the registered user in the above illustration is also a partner with a law firm, which itself is registered as an organizational entity with the service provider. The registered user may request to additionally be onboarded with the service provider as a registered partner of the law firm. This onboarding process may enable an additional user role (e.g., an organizational entity role) to be associated with the registered user (e.g., in addition to their personal role as a user). As described further herein, this may enable the registered user to, among other things, sign documents on behalf of the law firm, operating within their role as a partner of the law firm. In some embodiments, a user (e.g., a user identifier of the personal user account of the user) may be associated with any suitable number of roles (e.g., role identifiers) within an organization (e.g., a president, a secretary, a treasurer, etc.), and/or across a plurality of organizational entities. In some embodiments, this may be facilitated via one or more smartcards that may be provisioned to a user and/or a user device. In some embodiments, a smartcard may be a physical device or an electronic smartcard. For example, a smartcard may include (and/or be associated with) a role cryptographic key, which may be associated with a particular role of a user within an organizational entity. In some embodiments, the smartcard may be used by a user to execute transactions on behalf of the role of the user within the particular organizational entity (e.g., the partner signing a legal document on behalf of the law firm).

In some embodiments, the service provider may facilitate conducting an election. For example, a service provider may onboard a plurality of users (e.g., voters), which may be conducted similarly to as described above. In this example, the service provider may partner with (and/or include) an election commission entity. In some embodiments, the election commission entity may be associated with (e.g., appoint) a plurality of election officials that administer the election. The election commission entity may obtain (e.g., determine) a pair of election public/private keys to be used for a particular election. In some embodiments, respective user devices of each voter may receive the election public key, which may subsequently be used to vote in the particular election. In some embodiments, the private key may be divided into a plurality of private key parts and distributed among a plurality of election officials that collectively administer the election (e.g., whereby a private key part is stored on a user device of each official). In some embodiments, these private key parts may be subsequently used (e.g., combined) within a multi-signature ("multisig") verification process, as described further herein. In some embodiments, one or more keys (e.g., a user private key, an election private key part, etc.) stored on a user device (and/or external device connected to the user device) may also be encrypted and/or otherwise secured, as described further herein. When the election is conducted, a user device of a representative voter may receive input to vote for a particular candidate. The vote may be encrypted (e.g., signed) with the public key for the election. In some embodiments, the service provider may facilitate the process of voting. For example, in some embodiments, a user device may log in to the service provider and then transmit a signed vote to the service provider. It should be understood that the service provider may not be able to see which candidate a user voted for, at least because the vote is encrypted. In some embodiments, as described further herein, the service provider may invoke a smart contract of the blockchain network and transmit signed votes to the smart contract for tallying. Meanwhile, a blockchain network node (e.g., a consortium member system that is authorized to participate in conducting the election) may receive private key parts from a sufficient plurality of election officials, whereby the number of private key parts is sufficient for the smart contract to authorize conducting the election. Upon the smart contract verifying the private key via a multi-signature algorithm, the smart contract may then proceed with tallying the votes that were signed with the election public key.

In some embodiments, the service provider (e.g., in association with the election commission entity) may enable voting by implementing, among other features, functionality to onboard users (e.g., as described above), create and manage new elections, generate cryptographic keys for the new elections and for users, cast votes (e.g., via a user application on the user device), and/or calculate votes (e.g., via a smart contract deployed to the blockchain network). In some embodiments, these features may enable a voting method that is secure from hacking, correctly identifies voters, provides results that can be verified by a technical auditor, ensures privacy (e.g., does not disclose which option a user votes for), and/or enables a comprehensive voting process to be performed.

Embodiments described herein provide several technical advantages over conventional techniques. For example, techniques described herein are primarily directed to systems, methods, devices, computer-readable media, and the like for providing an online solution for storing and retrieving data in a manner that can support electronic signatures, validate documents, and/or ensure chain of custody for a document. In some embodiments, a document (e.g., a data file) may correspond to any suitable type of data object (e.g., a text document, an image, a metadata file, a video file, etc.). In some embodiments, a document may be used for any suitable purpose, including, but not limited to, being used for providing evidence in court, legal due diligence, statutory reporting requirements (e.g., Sarbanes-Oxley), credentialing, licensing, contracting, traveling, etc. Use of a blockchain network may facilitate not only secure verification and/or storage of data, but also the maintenance of secure data that may be used to conduct an audit (e.g., an audit trail) of transactions over any suitable period of time.

As described herein, the service provider system may combine technology with the legitimacy of court and government institutions to provide a secure and trusted computing system for verifying, storing, and sharing data. For example, techniques described herein may address evidentiary concerns often raised by lawyers, for example by providing a reliable way to verify that evidence has not been tampered with, that a particular document was authored by a particular person, etc. In some embodiments, techniques herein enable ensuring that a chain of evidence is preserved by creating an immutable chain of evidence to preserve and track evidence from the time it is collected until the time it is presented in court. In some embodiments, as described herein, techniques may preserve the chain of evidence by authenticating the person(s) in the possession of the evidence, and/or may preserve the chain of evidence by authenticating the evidence(s) being onboarded into the chain of custody. In some embodiments, techniques described herein may utilize, among other techniques, a combination of blockchain technology (e.g., for cryptographic calculations), artificial intelligence (e.g., utilizing machine learning algorithms for face matching and/or other biometric data matching), and a consortium distributed ledger that may be formed from court and government institutional entities. In some embodiments, these elements may combine to provide techniques for securely and efficiently managing (e.g., storing, sharing, verifying, authenticating, etc.) data, such as any type of electronic media or agreement.

In some embodiments, artificial intelligence (e.g., machine learning) and/or other system components may be used to confirm and/or affirm an identity of an individual or authenticity of a file at any suitable one or more times. For example, in some embodiments, when a user conducts a transaction involving a document (e.g., "signing" a document, entering a venue, obtaining access to a service), their identity may be confirmed. In some embodiments, any suitable technique may be used to confirm and/or store user identity information. Some non-limiting examples include the user showing their face from different angles via a livestream video (e.g., upon receiving one or more instructions), recording and verifying the user's voice, saying, "I approve," verifying the user's signature, etc. In some embodiments, the system may regularly update user identity information (e.g., images of the user, biometric data (e.g., fingerprints, voice recordings, video feeds, etc.). Accordingly, the system improves upon accuracy and reliability when verifying a person's identity when conducting a transaction.

In some embodiments, as described herein, techniques may use an artificial intelligence process to identify individuals through a face match technology. In some embodiments, the system may use that identification to allow the user to virtually sign documents or agreements. In some embodiments, once an electronic media (Portable Document Format (PDF) documents, word documents, image files, etc.) is prepared and ready for storage, a hash of the media may generated and stored into the distributed ledger (e.g., of a blockchain network of nodes). In some embodiments, a computing device (e.g., a user device, a service provider, and/or a blockchain node) may be enabled to execute one or more cryptographic computations to facilitate management (e.g., storage, retrieval, etc.) of media. In some embodiments, the calculation utilizes a majority (e.g., all) of the data within the media and a pointer to join the ledger to calculate a unique key (e.g., a hash). In some embodiments, the key cannot be decrypted and is specific only to the data within the media and the pointer to the ledger. In some embodiments, techniques described herein utilize blockchain (e.g., Ethereum, Hyperledger Fabric) as a method of storing data, with the additional use of a consortium distributed ledger. In some embodiments, members of the consortium distributed ledger may be vetted and/or valid public institutions. This may include organizations such as the Department of Justice regional offices, county, city, and/or state court offices, etc. In some embodiments, these jurisdictional authorities may be respectively associated with (e.g., and/or operate) a computing system, whereby the vetted/approved authority may join the computing system to the consortium as a consortium member system, thus forming a consortium blockchain network that includes a plurality of consortium member systems. In some embodiments, by ensuring that trusted entities may join the consortium, techniques herein may further ensure that data stored to the blockchain is secure.

To further illustrate advantages of the techniques described herein, consider an example in which a PDF may be generated that is a contract. A user may submit this PDF of the contract to the system, as described herein. After the PDF has been submitted, there may be a small icon at the bottom of the screen of the user device that displays a lock or has some suitable indication that shows that this is now part of that chain of evidence. In some embodiments, this may further indicate that the document is verifiable, is an approved document, and has not been tampered with. If an unauthorized changes is made to the document, the techniques may utilize the blockchain to verify that the changed document is no longer a legitimate copy. In some embodiments, the user device may indicate this via any suitable mechanism (e.g., presenting on the user device display an "X" that overlays the lock icon), so the user may be informed of the unauthorized change.

In another example of a technical advantage, techniques described herein may improve efficiency and/or saving computing resources when performing document transactions (e.g., involving new documents, new identities, verifications of documents, etc.). For example, a system described herein may process an increased number of requests (e.g., 400 requests per second, 1,000 request per second, 4,000 requests per second, etc.). In some embodiments, the number of requests processed may depend on multiple factors, including, for example, the number of data objects and/or the size (e.g., byte size) of data objects being processed.

In another example of a technical advantage, techniques herein may support multiple types of service offerings. For example, an organization that may typically store large amounts of data (e.g., a bank, an investment firm, a government organization) may have flexible options for storing the data. For example, data may be stored to any suitable location (e.g., local storage within the organization, on a public cloud, etc.). In some embodiments, the organization may store the keys (e.g., hashes) for the files that point back to the blockchain. In some embodiments, the service provider system may be tasked with validating the files against the keys. If there has been a change, the system may detect differences in the two keys. Thus, in this example, the system may generate the key, share it with the organization, and let the organization control the document. The system, however, may be used for verification of the document.

In another example, a service offering may include a service provider providing a system to manage documents within the system. This system may have full folder access, security access, etc. Under this system, the service provider may store the documents on behalf of users and store the keys (e.g., the hashes). The service provider may also verify the documents when requested. In some embodiments, the service provider may verify the documents on an ongoing basis and flag any differences. These flags may be shared with administrators or other document owners. It should be understood that data objects (e.g., documents, cryptographic keys, user profile data, data identifiers, etc.) may be stored to any suitable one or more locations and/or combinations thereof, including, for example, a user device(s), the service provider system, and/or member systems of the blockchain network of consortium member systems.

FIG. 1 describes a block diagram showing an example architecture, platform, and/or system 100 for managing blockchain-based documents and blockchain-based identities, according to at least one example. In some embodiments, the system 100 may be used to implement the techniques described herein. The system 100 includes a service provider 102, a user device 104, and a consortium member system 106. In some embodiments, the service provider 102 include any suitable combination of computing devices (e.g., server computers), which may be organized in a cluster, implemented as virtual instances (e.g., in a cloud computing service), or in any other suitable fashion. The service provider 102 in particular includes an onboarding system 108, an application system 110, a consortium member management system 111, a cryptographic system 112, a voting management system 113, and a data storage and validation system 114. Generally, each of the systems may be implemented by any suitable combination of software, firmware, and/or hardware. For example, each system may be embodied in its own server computer or set of server computers.

In some embodiments, as described in more detail with respect to FIGS. 5-9, the onboarding system 108 may be configured to communicate with the user device 104 to onboard a new user onto the system provided by the service provider 102. For example, the onboarding system 108 may include a set of application programming interfaces (APIs) for sending and receiving communications from the user device 104. In some embodiments, onboarding the new user may include generating a user profile in a manner that verifies, with a high degree of reliability, the identity of the user (e.g., personal identity, corporate-officer identity). For example, the onboarding system 108 may include an artificial intelligence module that executes a machine learning model for comparing uploaded user image data (e.g., an image captured from an government-issued ID of the user, which may correspond to an example jurisdictional identifier) with user biometric data (e.g., a sequence of livestream images showing movement of a face of the user in different directions over a period of time). In some embodiments, to facilitate reception of the user biometric data, the user device 104 may receive instructions from the onboarding system 108 that direct the user to turn their head to show their face from a different angle at a particular time, which may increase the reliability of determining the identity of the user (e.g., decreasing the risk of spoofing). In some embodiments, the artificial intelligence module may determine whether the person depicted is the same person. In some embodiments, the onboarding system 108 may be configured to receive other user biometric data in addition to or instead of the user image data. For example, a fingerprint, a faceprint, eye scan, body scan, or other biometric data may be used to confirm the identity of the user. In some embodiments, the onboarding system 108 may store a multi-dimensional vector that represents a unique feature(s) of the user. For example, faceprint may include a multi-dimensional vector, whereby each dimension of the vector is associated with a characteristic of the face of the user. In some embodiments, this may facilitate storage efficiency when saving data to the blockchain, as described further herein.

In some embodiments, the onboarding system 108 may collect information from a user device 104 that is associated with a role of the user within an organizational entity (e.g., a corporation, a government organization, etc.). For example, user device 104 may transmit an image and/or documentation that confirms that the user has the particular role within the organization. In some embodiments, the onboarding system 108 may further enable a user to register an organizational entity (e.g., uploading official documents for the organization). Upon registration of the organizational entity, new user roles (e.g., president, vice-president, secretary, etc.) may be associated with the organization, and the onboarding system 108 may facilitate user devices that respectively onboard with a new user role(s). In some embodiments, a particular user may be onboarded as an individual user (e.g., uploading personal data such as user image data, user biometric data), and then may subsequently be associated with one or more user roles (e.g., of one or more organizational entities), described further herein.

In some embodiments, while not illustrated, the system 100 includes one or more remote data collection device(s) that can capture such data and share the data with the service provider 102. For example, a set of overhead cameras may be used to capture overhead body scan images of users as part of confirming identity. In some embodiments, these same data collection devices may be used when the user attempts to verify their cryptographic key as part of signing a document, registering to vote, etc.

In some embodiments, the onboarding system 108 may be responsible for provisioning the user device 104 with one or more data objects (e.g., cryptographic keys and/or smartcards) as part of the onboarding process. For example, as described further herein, the user device 104 may be provisioned with one or more of a user cryptographic key (e.g., a user private key, which may be used for subsequent log on to the system), a user profile cryptographic key (e.g., a unique hash of one or more personal identity data, such as user image data and/or user biometric data), a role cryptographic key (e.g., associated with a particular role that user has within a particular organizational entity), etc. In some embodiments, the onboarding system 108 may provision one or more smartcards to the user device 104. In some embodiments, a smartcard may correspond to a container (e.g., a digital container such as a folder or other suitable data structure, a physical card, etc.) that may contain cryptographic information (e.g., keys) operable for executing transactions. In some embodiments, a particular smartcard may be associated with a particular user role (e.g., within an organization). For example, suppose that user, associated with user device 104, is both the president and secretary of an organization. In this example, the user device 104 may first onboard with the onboarding system 108 and be provisioned with a user cryptographic key for the user (e.g., for signing transactions as their personal identity) and/or a user profile cryptographic key (e.g., operable for subsequently confirming their identity in a future audit process). Then, the user device 104 may further register the organizational entity, and then be provisioned with two smartcards that are stored on the user device 104. One smartcard may be associated with the user's role has the president, and another smartcard may be associated with the same user's role as the secretary of the organization. Subsequently, depending on the type of document and/or transaction, the user (e.g., via the user device 104) may determine to sign the transaction with a particular key (e.g., the personal user cryptographic key, or one of the role cryptographic keys). In some embodiments, a particular user role may be associated with one or more smartcards. For example, each smartcard may be associated with performing different types of tasks associated with the given role.

In some embodiments, the application system 110 is configured to provide one or more applications for interacting with the service provider 102. For example, the application system 110 may include a web server that hosts one or more web applications useable by the user device 104 for interacting with the service provider 102. In some embodiments, the applications (e.g., applications 122 of the user device 104) may include functionality described herein with respect to the service provider 102 such as, for example, onboarding, performing cryptographic functions, storing, retrieving, and validating data, executing transactions such as voting, etc. In some embodiments, the application system 110 may provide content for presentation via a UI of applications 122. In some embodiments, the UI may be used for onboarding, for example, as described in reference to FIGS. 8 and 9. In another example, the UI may be used to submit documentation that is used to register for a Visa (e.g., see FIGS. 10, 11, 12, and 13). It should be understood that the application system 110 may facilitate any suitable interactions between the user device 104 and the service provider 102. For example, in some embodiments, the UI may be used to conduct any suitable process that may involve confirming a user's personal information (e.g., identity, location, demographics, etc.) and/or applying/registering for a program (and/or service, credentials, etc.). Some not limiting examples may include using the UI to verify one's personal information when applying for a state-issued ID, a driver's license, a passport, a country club card, a business access card, a vaccine passport, etc.

In some embodiments, the cryptographic system 112 is configured to perform one or more cryptographic functions such as those described herein. This may include, for example, executing one or more algorithms to generate hashes of documents, user profiles, any suitable parts of documents and/or profiles, and any other suitable data. In some embodiments, the data may be hashed differently (or not hashed at all) depending on data type. For example, public information may not be hashed, while sensitive data is hashed. Depending on the use and/or hashing algorithm, the resulting hash may be referred to as a cryptographic key, cryptograph, signature, token, etc. In some embodiments, at least some portion of the cryptographic system 112 may be implemented such that it is operable for interacting with a suitable blockchain environment. For example, as depicted with respect to FIG. 2, the cryptographic system 112 may interact with a blockchain network layer such as Ethereum, Hyperledger Fabric, and/or any suitable blockchain network. In some embodiments, any suitable cryptographic techniques may be utilized by the cryptographic system 112 and/or any other computing device described herein (e.g., user device 104, consortium member system 106, etc.). Examples of cryptographic algorithms may include triple data encryption standard (TDES), data encryption standard (DES), advanced encryption standard (AES), hashing algorithms such as MD5 and SHA-1, etc. In some embodiments, the cryptographic system 112 may verify a cryptographic key and/or encrypted content. For example, the cryptographic system 112 may be used to facilitate a login process, whereby a user device may be issued a challenge text. The user device (e.g., user device 104) may sign the challenge text with a private key (e.g., a user (cryptographic) private key, provisioned during the onboarding process), and then return the signed challenge text to the service provider 102. In this example, the cryptographic system 112 may verify the signed challenge text by using the user public key counterpart to the user private key, which may be previously stored to the service provider 102 during onboarding. In another example, the cryptographic system 112 may be used to sign one or more transactions that involve the blockchain network (e.g., storing new user account information to the consortium member system 106, storing a document, etc.). It should be understood that the cryptographic system 112 may be used to facilitate secure communications with any one or more entities (e.g., an election commission entity (e.g., described further herein), consortium member system 106, user device 104, an organizational entity, etc.). In some embodiments a secure communication may be associated with providing data encryption, ensuring data authenticity, verified identity attribution, and the like.

In some embodiments, the consortium member management system 111 is configured interact with a plurality of consortium member systems within the consortium member system 106. In some embodiments, as depicted in FIG. 1, consortium member system 106 may correspond to a collective entity that includes plurality of consortium member systems 126 that form a blockchain network 140 (e.g., including consortium member system 126A, consortium member system 126B, etc.). Accordingly, as described herein consortium member system 106 may also and/or alternatively referred to herein as a "plurality of consortium member systems." Also, in some embodiments, consortium member system 106, the plurality of consortium member systems 126, and/or the blockchain network 140 may be used interchangeably, depending on the context. In some embodiments, interacting with the plurality of consortium member systems may involve sending data to be stored to the plurality of consortium member systems. In another example, the consortium member management system 111 may query the consortium member system 106 for retrieving information (e.g., retrieving a cryptographic key, a document, public information etc.). In some embodiments, the consortium member management system 111 may also be configured to manage onboarding of a consortium member system 126 to the consortium member system 106. This may include verifying that the consortium member system 126 includes the proper configurations (e.g., APIs) to communicate with the service provider 102, to update the distributed ledgers 128, and retrieve keys from the distributed ledgers 128, etc.

In some embodiments, the voting management system 113 may be configured to facilitate conducting an election via the consortium member system 106. In some embodiments, the voting management system 113 may interact with (and/or include) an election commission system, whereby the interaction may involve any suitable functions. For example, the interactions may involve creating a new election, setting the rules for the election (e.g., eligible voters, rules for tallying votes, etc.), generating cryptographic keys for voting (e.g., public/private keys), etc. In some embodiments, the voting management system 113 may further interact with the consortium member system 106 for one or more tasks, including securely tallying votes, verifying the authenticity of a particular vote, etc. As described herein, the voting management system 113 may perform these tasks while still not having access to determine who a voter voted for (e.g., based at least in part on a vote being encrypted).

In some embodiments, the data storage and validation system 114 may be configured to store data (e.g., documents, images, videos, and any other suitable data) and/or store cryptographic keys that represent the data. In some embodiments, the data storage and validation system 114 includes a data engine 130, data storage 132, and user storage 134. The data engine 130 may be configured to process requests for verifying, authenticating, and/or validating cryptographic keys. The documents, images, etc. described herein may be stored in the data storage 132. In some embodiments, the hashes that represent these documents may also be stored in the data storage 132 or in a different data storage. In the user storage 134 is stored data associated with users of the service provider 102. This may include, for example, user profile data, public information about a user, documents associated with the user, user role data, etc. In some embodiments, the user storage 134 may further include entity data, for example, including organizational entity information, user role data associated with an organizational entity, etc. In some embodiments, any suitable one or more of the data objects stored by the data storage and validation system 114 may also (and/or alternatively) be stored to the consortium member system 106. In some embodiments, as described herein, consortium member system 106 may not store document content (e.g., which may have a larger disc footprint), and instead may store hashes (e.g., with smaller data footprints) of the document content (e.g., for future auditing purposes, such as validating document authenticity, authorship, and/or ownership). In this case, the data storage and validation system 114 may store the actual document content and/or the hashes (and/or other suitable links) to the document content.

In some embodiments, the user device 104, as introduced herein, includes data application(s) 122 and storage 124. The data storage 124 may be used to store documents, images, user information, etc. as described herein. In some embodiments, a portion of data from the data storage 124 is synced with the data storage 132. In some embodiments, the data storage 124 may further include a digital wallet, which may include one or more cryptographic keys and/or smartcards. In some embodiments, the digital wallet may be secured through any suitable means. For example, the wallet may be encrypted, whereby the user device 104 may receive user input (e.g., a password, facial recognition data) to decrypt the wallet to access the one or more keys. In some embodiments, the digital wallet and/or other sensitive data may be stored to an external device from the user device 104 (e.g., a secure drive). The applications 122, as described herein, may include applications to enable the user device 104 to interact with the service provider 102 and perform the techniques described herein.

In some embodiments, as described above, the consortium member system 106 may include the plurality of consortium member systems 126 (e.g., including representative member systems such as member system 126A, member system 126B, member system 126C, member system 126D, etc.). In some embodiments, the plurality of consortium member systems 126 may implement the blockchain network 140. In some embodiments, each consortium member system 126 includes a ledger storage 128 for storing a distributed ledger (e.g., including representative ledger storages such as ledger storage 128A, ledger storage 128B, ledger storage 128C, ledger storage 128D, etc.). In some embodiments, the ledger storage 128 may store any suitable data, for example, one or more smart contracts, as described further in reference to FIG. 4. In some embodiments, a smart contract itself may store executable code and/or data associated with the blockchain network. In some embodiments, the distributed ledger 128 may be used to store cryptographic keys, etc. In some embodiments, the consortium member system 106 includes the plurality of consortium member systems 126, which may respectively be associated with a trusted entity (e.g., a public entity) such as a court, government, agency, etc. Because of entities such as these being included in the consortium member system 106, the consortium member system 106 may have a higher degree of trust than other comparable systems. Additionally, because the public agencies are trusted and typically secure, use of the such agencies in the consortium member system 106 may result in a more secure system. In some embodiments, a consortium member system (e.g., 126A) may be onboarded to join the blockchain network 140 via any suitable mechanism, such as a federated/consortium blockchain technology. The consortium member system 106 may be configured to store information to the ledger storage 128 and retrieve information from the ledger storage 128. The consortium member system 106, i.e., each member 126, may store the hash ledger itself (e.g., including blockchain data). In some embodiments, the service provider 102 is not responsible for storing the hash ledger, and instead, the service provider 102 interacts with the blockchain network, which is determined to securely store data. In some embodiments, this arrangement may facilitate increased reliability of data stored by (and/or processes implemented by) the government institutions, courts, voter registration systems, banks, etc. In some embodiments, a jurisdiction outreach program may be used to make this technology accessible. In some embodiments, the members 126 are part of the consortium member system 106 free of charge, or may pay a subscription fee. In some embodiments, the fee may entitle the systems to additional services such as data storage and verification, chain of custody verification, etc.

Figure 2:
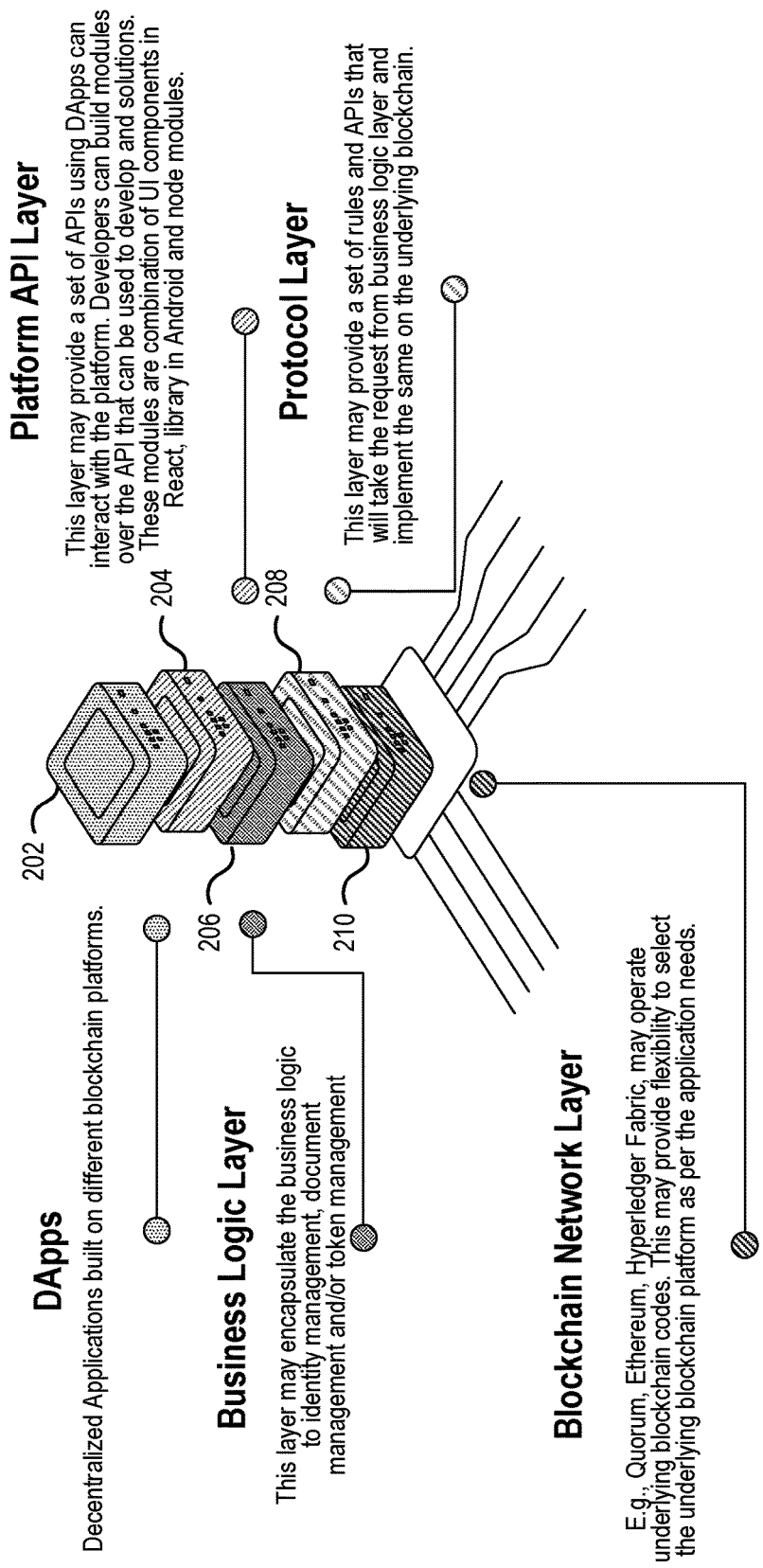
FIG. 2 illustrates an example platform framework for creating blockchain-based solutions, according to some embodiments.

FIG. 2 illustrates an example platform framework 200 for creating blockchain-based solutions in accordance with the techniques described herein, according to at least one example. The framework 200 may be suitable for creating blockchain solutions (e.g., using the blockchain network 140) which are scalable, and enabling the ease of development of blockchain-based solutions for the enterprises/developers/government organizations. In some embodiments, the platform framework 200 that implements techniques described herein may implement layered architecture. For example, the platform framework 200 may include at least four different layers. In some embodiments, a layered approach may make it more efficient to change a module as blockchain technology evolves. In some embodiments, the platform framework 200 includes the following modular layers: blockchain network layer 210, protocol layer 208, business logic layer 206, and platform API layer 204. In some embodiments, the blockchain network layer 210 may implement any suitable underlying blockchain technology (e.g., Quorum, Ethereum, Hyperledger Fabric, etc.). In some embodiments, the type of blockchain technology employed may depend in part on customer requirements. In some embodiments, protocol layer 208 may provide a set of rules and/or API's that may be used to process a request from the business logic layer 206 via the underlying blockchain network layer 210. In some embodiments, the business logic layer may include business logic for identity management, document management, and/or token (e.g., key) management. In some embodiments, the platform API layer 204 may enable developers to create Decentralized applications 202 that utilize the platform framework as per their needs. In some embodiments, service provider 102, user device 104, and/or blockchain network 140 of FIG. 1 may implement any one or more of the layers of platform framework 200.

Figure 3:
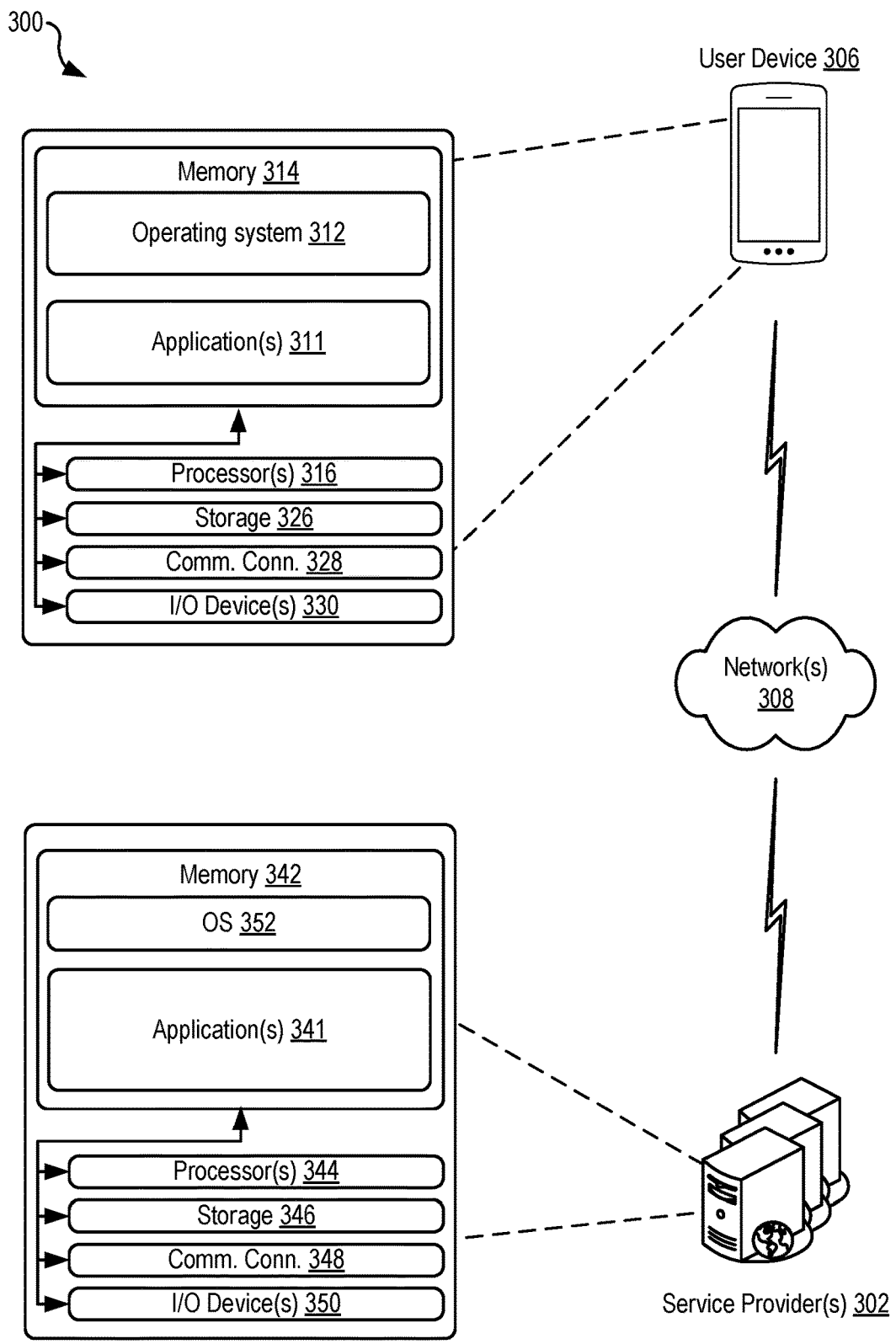
FIG. 3 illustrates an example architecture for a service provider system that interacts with one or more user devices, according to some embodiments.

FIG. 3 illustrates an example architecture 300 for a service provider system that interacts with one or more user devices, according to at least one example. In some embodiments, the example architecture 300 may further be configured to enable a user device 306 and service provider computer 302 to share information. The service provider computer 302 may be an example of the service provider 102. In some embodiments, the service provider computer 302 may include the consortium member system 106. In some embodiments, the service provider computer 302 may not include the consortium member system 106, and may instead interact with the consortium member system 106 (e.g., a blockchain network) via the network 308. The user device 306 is an example of the user device 104. In some embodiments, the devices may be connected via one or more networks 308 (e.g., via Bluetooth, WiFi, the Internet). In some embodiments, the service provider computer 302 may be configured to implement at least some of the techniques described herein, with reference to the user device 306 and vice versa.

In some embodiments, the networks 308 may include any one or a combination of many different types of networks, such as cable networks, the Internet, wireless networks, cellular networks, satellite networks, other private and/or public networks. While the illustrated example represents the user device 306, accessing the service provider computer 302 via the networks 308, the described techniques may equally apply in instances where the user device 306 interacts with the service provider computer 302 over a landline phone, via a kiosk, or in any other manner. It is also noted that the described techniques may apply in other client/server arrangements (e.g., set-top boxes), as well as in non-client/server arrangements (e.g., locally stored applications, peer-to-peer configurations).

As noted above, the user device 306 may be any type of computing device such as, but not limited to, a mobile phone, a smartphone, a personal digital assistant (PDA), a laptop computer, a desktop computer, a thin-client device, a tablet computer, a wearable device such as a smart watch, or the like. In some embodiments, the user device 306 may be in communication with the service provider computer 302 via the network 308, or via other network connections. In some embodiments, the user device 306 may be used to communicate with a consortium member system 106 via the network 308.

In one illustrative configuration, the user device 306 may include at least one memory 314 and one or more processing units (or processor(s)) 316. The processor(s) 316 may be implemented as appropriate in hardware, computer-executable instructions, firmware, or combinations thereof. Computer-executable instruction or firmware implementations of the processor(s) 316 may include computer-executable or machine-executable instructions written in any suitable programming language to perform the various functions described. The user device 306 may also include geo-location devices (e.g., a global positioning system (GPS) device or the like) for providing and/or recording geographic location information associated with the user device 306.

The memory 314 may store program instructions that are loadable and executable on the processor(s) 316, as well as data generated during the execution of these programs. Depending on the configuration and type of the user device 306, the memory 314 may be volatile (such as random access memory (RAM)) and/or non-volatile (such as read-only memory (ROM), flash memory, etc.). The user device 306 may also include additional removable storage and/or non-removable storage 326 including, but not limited to, magnetic storage, optical disks, and/or tape storage. The disk drives and their associated non-transitory computer-readable media may provide non-volatile storage of computer-readable instructions, data structures, program modules, and other data for the computing devices. In some implementations, the memory 314 may include multiple different types of memory, such as static random access memory (SRAM), dynamic random access memory (DRAM), or ROM. While the volatile memory described herein may be referred to as RAM, any volatile memory that would not maintain data stored therein once unplugged from a host and/or power would be appropriate.

The memory 314 and the additional storage 326, both removable and non-removable, are all examples of non-transitory computer-readable storage media. For example, non-transitory computer-readable storage media may include volatile or non-volatile, removable or non-removable media implemented in any method or technology for storage of information such as computer-readable instructions, data structures, program modules, or other data. The memory 314 and the additional storage 326 are both examples of non-transitory computer-storage media. Additional types of computer-storage media that may be present in the user device 306 may include, but are not limited to, phase-change RAM (PRAM), SRAM, DRAM, RAM, ROM, Electrically Erasable Programmable Read-Only Memory (EEPROM), flash memory or other memory technology, compact disc read-only memory (CD-ROM), digital video disc (DVD) or other optical storage, magnetic cassettes, magnetic tape, magnetic disk storage or other magnetic storage devices, or any other medium that can be used to store the desired information and that can be accessed by the user device 306. Combinations of any of the above should also be included within the scope of non-transitory computer-readable storage media. Alternatively, computer-readable communication media may include computer-readable instructions, program modules, or other data transmitted within a data signal, such as a carrier wave, or other transmission. However, as used herein, computer-readable storage media does not include computer-readable communication media. In some embodiments, the memory 314 and/or additional storage 326 may be similar to storage 124.

The user device 306 may also contain communications connection(s) 328 that allow the user device 306 to communicate with a data store, another computing device or server, user terminals, and/or other devices via the network 308. The user device 306 may also include I/O device(s) 330, such as a keyboard, a mouse, a pen, a voice input device, a touch screen input device, a display, speakers, a printer, etc.

Turning to the contents of the memory 314 in more detail, the memory 314 may include an operating system 312 and/or one or more application programs or services for implementing the features disclosed herein such as applications 311 (e.g., the applications 122). Similarly, at least some techniques described with reference to the service provider computer 302 may be performed by the user device 306.

The service provider computer 302 may also be any type of computing device such as, but not limited to, a collection of virtual or "cloud" computing resources, a remote server, a mobile phone, a smartphone, a PDA, a laptop computer, a desktop computer, a thin-client device, a tablet computer, a wearable device, a server computer, or a virtual machine instance. In some embodiments, the service provider computer 302 may be in communication with the user device 306 via the network 308, or via other network connections.

In one illustrative configuration, the service provider computer 302 may include at least one memory 342 and one or more processing units (or processor(s)) 344. The processor(s) 344 may be implemented as appropriate in hardware, computer-executable instructions, firmware, or combinations thereof. Computer-executable instruction or firmware implementations of the processor(s) 344 may include computer-executable or machine-executable instructions written in any suitable programming language to perform the various functions described.

The memory 342 may store program instructions that are loadable and executable on the processor(s) 344, as well as data generated during the execution of these programs. Depending on the configuration and type of service provider computer 302, the memory 342 may be volatile (such as RAM) and/or non-volatile (such as ROM, flash memory, etc.). The service provider computer 302 may also include additional removable storage and/or non-removable storage 346 including, but not limited to, magnetic storage, optical disks, and/or tape storage. The disk drives and their associated non-transitory computer-readable media may provide non-volatile storage of computer-readable instructions, data structures, program modules, and other data for the computing devices. In some implementations, the memory 342 may include multiple different types of memory, such as SRAM, DRAM, or ROM. While the volatile memory described herein may be referred to as RAM, any volatile memory that would not maintain data stored therein, once unplugged from a host and/or power, would be appropriate. The memory 342 and the additional storage 346, both removable and non-removable, are both additional examples of non-transitory computer-readable storage media.

The service provider computer 302 may also contain communications connection(s) 348 that allow the service provider computer 302 to communicate with a data store, another computing device or server, user terminals, and/or other devices via the network 308. The service provider computer 302 may also include I/O device(s) 350, such as a keyboard, a mouse, a pen, a voice input device, a touch input device, a display, speakers, a printer, etc.

Turning to the contents of the memory 342 in more detail, the memory 342 may include an operating system 352 and/or one or more application programs 341 or services for implementing the features disclosed herein including the onboarding system 108, the application system 110, the consortium member management system 111, the cryptographic system 112, the voting management system 113, and/or the data storage and validation system 114. In some embodiments, the service provider 302 may implement one or more features for interacting with and/or providing a blockchain network (e.g., blockchain network 140), as described herein.

Figure 4:
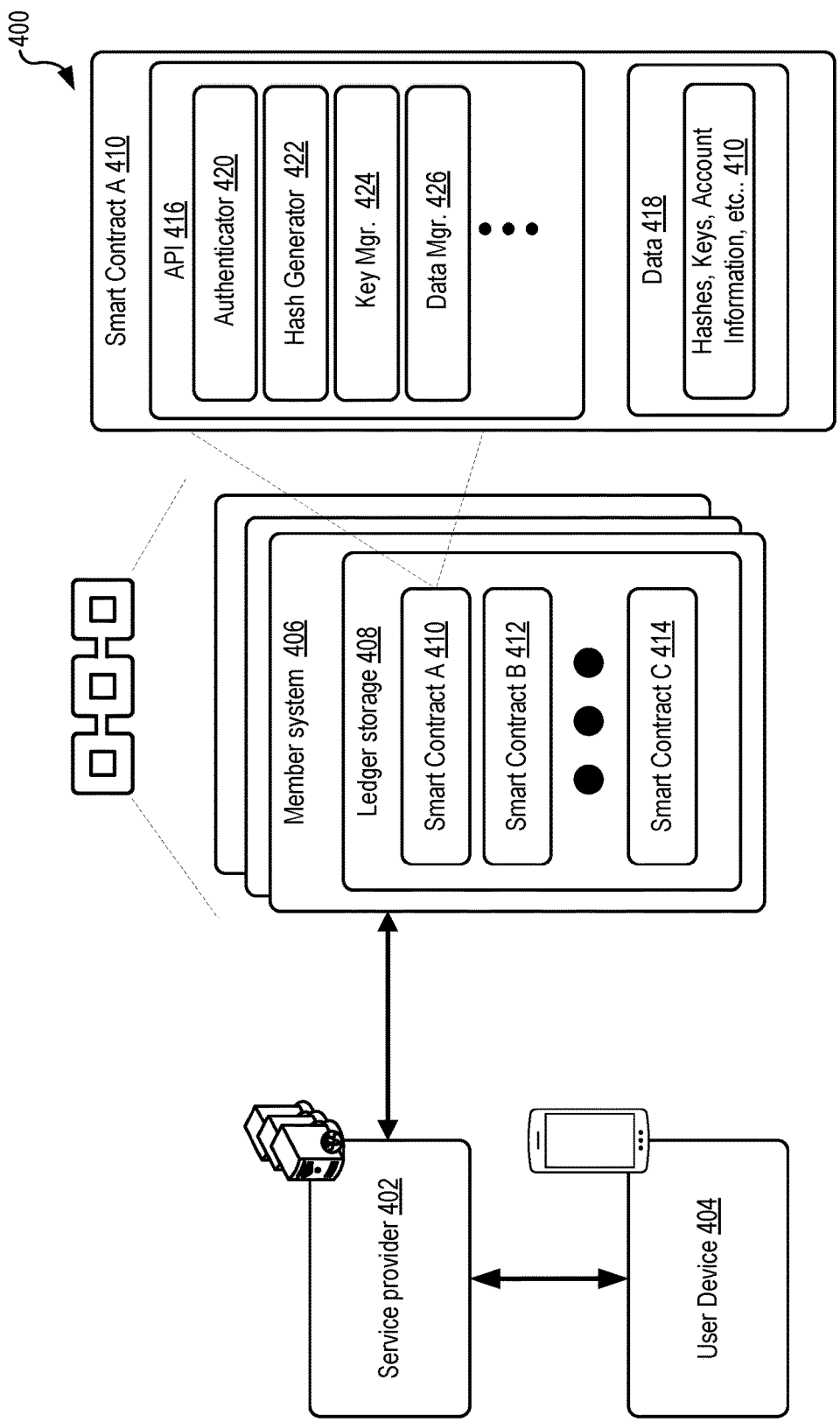
FIG. 4 illustrates an example technique whereby a service provider system utilizes smart contracts to execute transactions, according to some embodiments.

FIG. 4 illustrates an example technique whereby a service provider system utilizes smart contracts to execute transactions, according to some embodiments. In diagram 400, several elements are depicted, including a user device 404 (e.g., which may be similar to any user device described herein), service provider 402 (e.g., which may be similar to any service provider described herein), and a plurality of consortium member systems associated with a blockchain network (e.g., blockchain network 140). For example, consortium member system 406 may be a representative member of the blockchain network 140 (e.g., similar to consortium member system 126A, which is a member of the blockchain consortium member system 106).

In some embodiments, member system 406 may include a ledger storage 408, as described herein. In some embodiments, the ledger storage 408 may include (e.g., within the ledger storage 408 and/or any suitable storage facility of the member system 406) one or more smart contracts (e.g., representative smart contract A 410, smart contract B 412, smart contract C 414, etc.). In some embodiments, a smart contract may be a computer program or transaction protocol that may execute, control, and/or document one or more events/actions. In some embodiments, the smart contract may be executed by a node of a blockchain network (e.g., a member system). It should be understood that a plurality of member systems of the blockchain network (e.g., all members) may execute the smart contract, in accordance with the rules of the blockchain network. In some embodiments, as described herein, the smart contract may be used for legally relevant purposes (e.g., auditing, document verification, ownership verification, etc.). Turning to the example smart contract A 410 in further detail, smart contract A 410 may include an API 416 and data 418. In some embodiments, the API 416 may include one or more procedures (e.g., functions), such as authenticator 420, hash generator 422, key manager module 424, data manager module 426, and any other suitable module configured to perform other functions in addition to those described herein. It should be understood that a smart contract may include/perform any suitable functions. For example, another smart contract (e.g., see FIG. 28) may be associated with conducting an election, and may include a different set of functions for decrypting and verifying a signed vote, tallying the results of votes, etc. In the example of smart contract A 410, the functions may be associated with, among other things, storing a document that is associated with a user of the service provider 402.

For example, authenticator 420 may be responsible for verifying a signed data object (e.g., a transaction request), which may be signed using a cryptographic key (e.g., a user cryptographic private key associated with the user of user device 404). For example, the user device 404 may request (e.g., via an web UI application 122) the service provider 402 to store a document. The service provider 402 may invoke a transaction request on behalf of the user device 404, whereby the transaction request is signed with the user cryptographic private key (which may also be referred to herein as a "user private key"). In some embodiments, the user device 404 may directly invoke the transaction request via an API provided by the service provider 402. In any case, the authenticator 420 may verify the signed transaction request by using a corresponding user public key that is associated with the user. For example, the smart contract A 410 may store in the data 418 one or more associations between data objects. Some examples of data objects that may be stored in association with one another include, but are not limited to, a user profile cryptographic key (e.g., a hash of the user profile), a user public key, a user identifier, public information about the user, a role identifier (e.g., of a role of the user in an organizational entity), etc. The smart contract A 410 may retrieve the user public key for this user and then verify the transaction request.

In some embodiments, a hash generator 422 may receive a data object (e.g., document data) and generate a hash. For example, in some embodiments, the transaction request may include a document to be stored. Upon authenticating the request, the hash generator 422 may generate a hash of the document. In some embodiments, the service provider 402 may generate a hash of the document (and/or other data objects), and include the data objects within the transaction request. In some embodiments, a key manager 424 may perform one or more functions associated with management keys, including, for example, retrieving cryptographic keys from data 418, applying a cryptographic function using a cryptographic key to a data object (e.g., to encrypt/decrypt the data object), etc. In some embodiments, a data manager 426 may be responsible for managing non-cryptographic data, including, for example, documents, metadata (e.g., a date the document was stored, an associated user identifier, an author's name, etc.), etc. It should be understood that any suitable data may be managed by the smart contract A 410 and any other of the other smart contracts described herein. In some embodiments, other functions may be included to perform operations on data. For example, the smart contract A 410 may retrieve from data 418 a plurality of data objects, determine how many data objects have a particular characteristic (e.g., a vote type, a document type, etc.), and then store that information for future reporting (e.g., to the service provider 402 and/or user device 404). In some embodiments, data 418 may include storage of any suitable data objects (e.g., cryptographic keys, files such as documents, statistics information, metadata, public information that is not encrypted, etc.), and may utilize any suitable blockchain-based mechanism.

Figure 5:
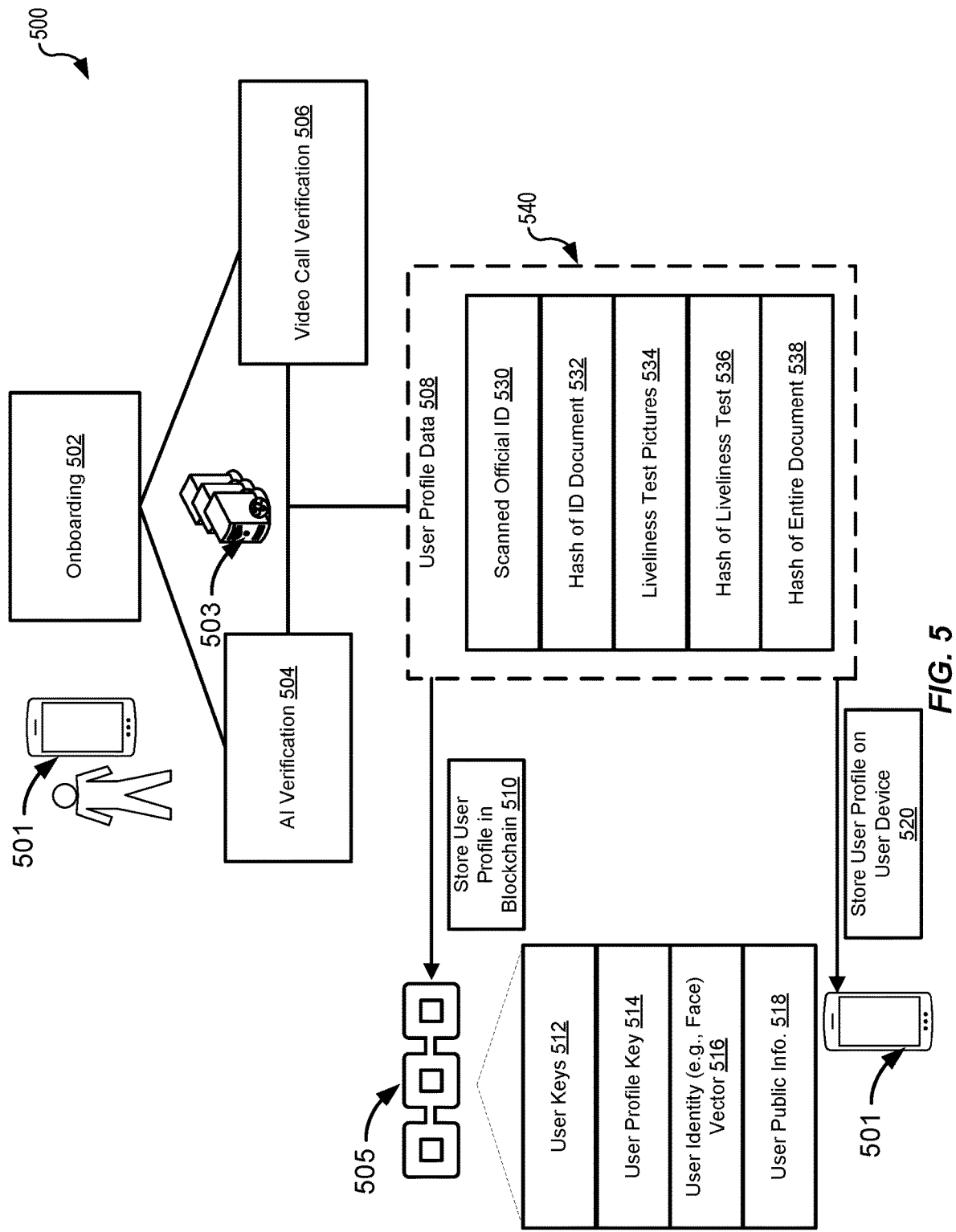
FIG. 5 illustrates an example technique for a service provider system to facilitate onboarding a new user, according to some embodiments.

FIG. 5 illustrates an example technique for a service provider system to facilitate onboarding a new user, according to some embodiments. Diagram 500 of FIG. 5 depicts several elements, including, among other things, a user device 501 of a user, an onboarding process 502, an artificial intelligence (AI) verification process 504, a service provider 503, a video call verification process 506, user profile data 508, a user profile cryptographic key 540, a profile storage process 510, a blockchain network 505, user keys 512, a user profile key 514, a user identity vector 516, user public information 518, and a profile storage process 520. It should be understood that user device 501, service provider 503, blockchain network 505, and the like, may be similar to (e.g., the same as) other similarly named elements described in various figures herein.

As shown in FIG. 5, as part of the onboarding process 502, the user device 501 may launch an application (e.g., application 122 of FIG. 1) and present a UI to the user. The application may enable at least two sub-processes to be performed via the UI, including the AI verification process 504 and the video call verification process 506. In one example, the AI verification process 504 may receive user image data. For example, the user device 501 may upload an image (e.g., an image of an official government ID, which may be a jurisdictional identifier) to the service provider 503. The service provider 503 may identify one or more characteristics of the user identified in the image. For example, the image may show the user's face, and may be used to generate a multi-dimensional vector associated with characteristics of the user's face. It should be understood that any suitable one or more AI algorithms may be used to perform the onboarding process. As used herein, the term "artificial intelligence" refers to any suitable computer-implemented artificial intelligence technique including machine learning (supervised or unsupervised), natural language processing, machine perception, computer vision, affective computing, statistical learning and classification (including use of hidden Markov models, Bayesian network models and Kalman filters), reinforcement learning including neural networks, search algorithms and optimization algorithms (including evolutionary computing) and automated reasoning. Meanwhile the video call verification process 506 may include providing instructions to the UI for the user to move their face in different directions (e.g., showing different angles of their face) over a period of time, such that the movement is captured via a sequence of livestream images (e.g., captured by a camera of the user device 501). In some embodiments, livestream image data received during the video call verification process 506 may correspond to user biometric data. In some embodiments, this onboarding process 502 may reduce the likelihood of spoofing (e.g., imitating the real user) by an unauthorized user. For example, by verifying the user over the livestream and/or verifying the user follows a specific sequence instructions over time, the system may increase the probability that actual user consents to being onboarded with the system, and that a user profile created is authentically matched to the user. It should be understood that any suitable technique(s) may be used to improve security verification during onboarding, for example, requesting that the user provide their signature in real-time. Accordingly, any suitable user biometric data may be collected and/or analyzed during the onboarding process (e.g., fingerprints, faceprints, signature information, etc.).

In some embodiments, the onboarding process 502 may proceed whereby the service provider 503 may generate a user profile of the user. In some embodiments, the user profile may include user profile data 508 associated with the identity of the user. For example, the user profile may include user image data 530 (e.g., one or more jurisdictional identifiers, such as an image of the ID document, for example, a passport or driver's license), user biometric data 534 (e.g., which may correspond to a sequence of livestream images captured by a liveness test occurring during the video call verification process 506), a user identifier (e.g., a unique alphanumeric string), a multidimensional vector (e.g., of facial characteristics) that may be used to uniquely identify a particular user, etc. In some embodiments, other user profile data 508 may also be included that is associated with the onboarding and/or identification of the user (e.g., an IP address of the participant, time and other audit data). In some embodiments, as depicted in diagram 500, the user profile data 508 may further include one or more hashes of user profile data. For example, the user image data 530 (e.g., a scanned official ID) may be hashed to generate a user image data hash 532. Also, the user biometric data 534 (e.g., liveness test pictures) may be hashed to generate user biometric data 536, and included within the user profile data 508. In some embodiments, a hash of at least a portion of (e.g., a bundle of) the user profile data 508 (e.g., including, user image data 530, user image data hash 532, user biometric data 534, and/or user biometric data hash 536) may further be computed, as a user profile hash 538. In some embodiments, the user profile hash 538 (and/or the component one or more hashes and/or data) may be combined and/or otherwise collectively referred to herein as the user profile cryptographic key 540. In some embodiments, as described herein, the user profile cryptographic key may 540 be subsequently used for auditing purposes (e.g., as a trusted identity of the user), for example, to verify user ownership of a document. In some embodiments, the user profile cryptographic key 540 may be used for any suitable verification and/or authentication purposes associated with a user's identity. In some embodiments, as described herein, the user profile cryptographic key 540 may be updated over time with new identity information (e.g., new user image data 530). It should be understood that any suitable hash(es) of one or more data objects (e.g., an image, a sequences of images, hashes, etc.) and/or combinations of hashes thereof, collectively associated with a person's unique identity, may be used to generate the user profile cryptographic key 540.

Upon generating the user profile data 508 and/or an associated user profile cryptographic key 540, the service provider 503 may store information to the blockchain that is associated with the user profile (e.g., an identity) of the user. In some embodiments, this information may be stored via a profile storage process 510. For example, the service provider 503 may invoke a smart contract of the blockchain network 505 (e.g., consortium member system 106), whereby consortium member systems of the blockchain network 505 may respectively execute the smart contract to store the profile for the user. In some embodiments, the profile storage process 510 may be invoked by a signed transaction request that requests creation of a new account for the user on the blockchain. In some embodiments, this request may be signed by a cryptographic key of the service provider 503. In some embodiments, the profile storage process 510 may include storing profile information for the user account, including, for example, user keys 512 (e.g., a user public key), a user profile key 514 (e.g., the user profile cryptographic key 540, generated during onboarding), a user identity vector 516 (e.g., a multidimensional vector of the user's facial characteristics), user public information 518 (e.g., demographic information about the user), etc. In some embodiments, any suitable information may be associated with the user profile for the user, including, for example, a unique user identifier, an organizational entity to which the user is associated, a role identifier associated with the user (e.g., identifying the user as a president of a particular organization), a role cryptographic key, etc. In some embodiments, one or more of the elements may be subsequently associated with the user profile (e.g., via a separate table), for example, when a new organizational entity is added or a new user role is added.

In some embodiments, as described herein, the user profile cryptographic key 540 (e.g., a hash) is stored in blockchain 505 along with the user's public key in the user's account in the blockchain 505. In some embodiments, the user profile cryptographic key 540 may be also be stored on the user device 501 during a profile storage process 520. In some embodiments, this may form the basis of how the user authenticates and/or proves that they are the rightful owners and/or authors of a particular document, during a subsequent processes. In some embodiments, the user profile cryptographic key 540 may represent a trusted identity of the user. In some embodiments, the user profile cryptographic key 540 may be regenerated during a later time, for example, to update the key and/or during a key recovery process.

Figure 6:
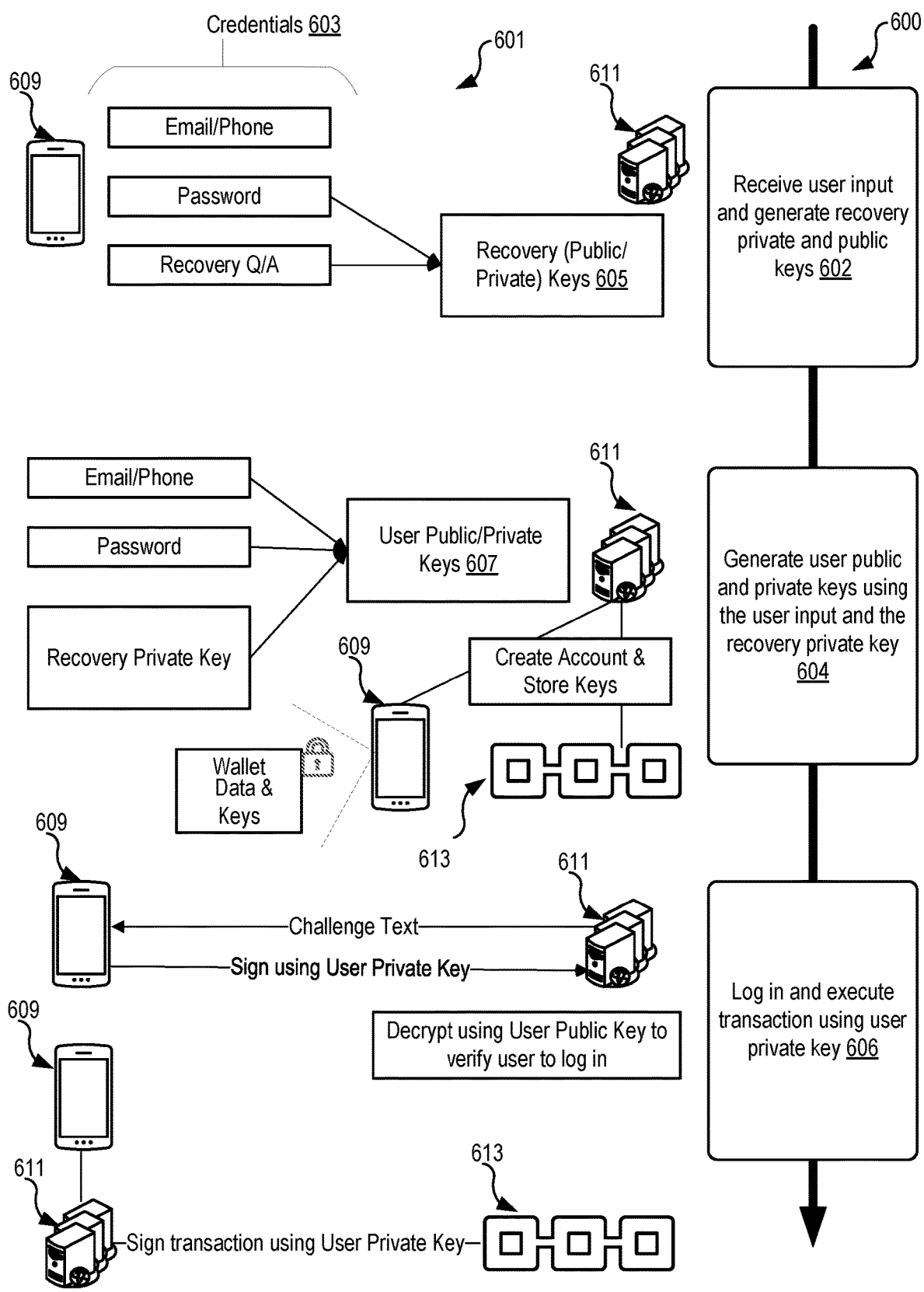
FIG. 6 illustrates an example technique for a service provider system to facilitate onboarding a new user and conducting a transaction, according to some embodiments.

FIG. 6 illustrates another example technique for a service provider system to facilitate onboarding a new user and conducting a transaction, according to some embodiments. In FIG. 6, process 600 depicts one or more operations that may be performed (e.g., by a service provider and/or user device) when onboarding a user to create a new account. In some embodiments, the process 600 may be performed as another component of the onboarding process 502 of FIG. 5. Diagram 601 includes elements that depict aspects of one or more operations that may occur during performance of process 600. Diagram 601 depicts, among other things, a user device 609, a service provider 611, and a blockchain network 613, which may be similar to any respective entity described herein. In some embodiments, the process 600 may be performed by a service provider, which may, in turn, utilize a blockchain network, as described herein.

At block 602, the process 600 includes receiving user input and generating recovery keys. Using diagram 601 for illustration, the user device 609 may launch an application (e.g., application 122) and initiate an onboarding process. During the onboarding process, the user device 609 may receive, as user input, one or more credentials 603. As depicted in diagram 601, this may include an email address, a phone number, a user password, and/or any other suitable information that may be used to identify the user. In some embodiments, the credentials 603 may also include questions and/or answers (Q/A) to security questions (e.g., place of birth, mother's maiden name, etc.). In some embodiments, one or more of the credentials may be string-combined together and used generate a hash. The hash may be used to generate a pair of recovery private/public keys 605. In some embodiments, the recovery private key may be stored on the user device 609. In some embodiments, in the event that a recovery key is subsequently unable to be retrieved, the recovery key may be regenerated using a similar process. In some embodiments, the service provider 611 (and/or the user device 609) may perform one or more of the operations of block 602.

At block 604, the process 600 includes generating user cryptographic keys (e.g., a pair of keys, including a user public key and a user private key) using the input and/or the recovery private key. For example, as depicted in diagram 601, the recovery private key may be string-combined with one or more credentials (e.g., email, phone, and/or password) to generate a hash, which may be used (e.g., by service provider 611 and/or user device 609) to generate user cryptographic keys 607. In some embodiments, the user cryptographic keys 607 may be generated by the user device 609, the service provider 611, or the blockchain network 613. In some embodiments, as part of the account creation/onboarding process, the service provider 611 may provision keys and/or data to be stored in one or more locations. For example, in some embodiments, the user device 609 may store keys and/or data to a wallet of the user device 609, for example, including the user private key, recovery private key, and/or user data (e.g., an email address, user identifier, etc.). In some embodiments, the user private key may be stored to an external device that is accessible by the user device. In some embodiments, the user private key may not be stored by the user device. In this example, upon a subsequent login by the user device 609 to the service provider 611, the user private key may be automatically regenerated during the login process (e.g., similar to as described above), and then used to log in. In some embodiments, one or more data objects may be encrypted. For example, the recovery public and/or private key may be encrypted (e.g., being decryptable via an email/password combination) and/or stored to the user device. In some embodiments, user data (e.g., an ID card image) stored to the user device may be encrypted (e.g., by the recovery key). It should be understood that any suitable data and/or keys may be encrypted and/or stored to the user device 609, the service provider 611, and/or an external device (e.g., accessible by the user device 609). In some embodiments, an external device may be a physical smartcard that stores a cryptographic key(s) or a disk drive. In any case, upon obtaining (e.g., generating, receiving) keys and data for the onboarding process, the service provider 611 may store one or more data objects (e.g., keys, user data) to the blockchain network 613. For example, this storage may occur when the user account is created on the blockchain network 613 (e.g., by each of the plurality of consortium member systems, respectively executing a smart contract to create a user account). This stored data may include, for example, the user public key, the user recovery public key, and/or other user data (e.g., email, phone number, etc.) determined during the onboarding process. In some embodiments, the user data stored to the blockchain network 613 may or may not be encrypted. It should be understood that the data stored to the blockchain network 613 may be stored in association with the user profile, described in reference to FIG. 5 (e.g., during the onboarding process). For example, the user public key and/or the recovery public key may be stored as components of user keys 512. In some embodiments, the service provider 611 itself may store suitable keys/user data in reference to the user account, as described herein.

At block 606, the process 600 includes logging in and/or executing a transaction using the user private key. For example, upon completion of the onboarding process, the user account may be created and information may be stored to the blockchain network 613 (and/or the user device 609 or service provider 611). The user device 609 may subsequently launch an application (e.g., application 122) to log in. During the login, the service provider 611 may send a challenge text to the user device 609. The user device 609 may then obtain the user private key using any suitable method (e.g., retrieving from a wallet on the user device 609, retrieving from an external storage device, or regenerating the user private key). The user device 609 may then sign the challenge text with the user private key, which the service provider 611 may then verify by using the corresponding user public key (e.g., previously stored by the service provider for the user's account). It should be understood that by enabling the user private key to be generated automatically upon logging in (e.g., via the email/password), embodiments may enable an better user experience. For example, while a cryptographic key (e.g., a user private key) may be used to log in and/or execute transactions (e.g., via the blockchain), key management/generation may be handled automatically, apart from direct user maintenance. In some embodiments, a user may directly manage (e.g., store, retrieve) the user private key, as described herein. Upon the service provider 611 confirming the user may log in (e.g., by verifying the signature of the challenge text, using the user public key), the user device 609 may execute a transaction. For example, the user device 609 may determine to store a document to the blockchain. In this example, the user device 609 may transmit a request to the service provider 611, which may include signing the document with the user private key. The service provider 611 may, in turn, execute a transaction request to the blockchain network 613. In some embodiments, the transaction request may include the signed document, whereby a smart contract executing on a consortium member system may authenticate the request based in part on using the user public key to verify the signed document. If verified, the smart contract may execute one or more functions to process the transaction, as described herein.

It should be understood that any suitable mechanism may be used to recovery key information in the event a key is unreachable. For example, the user device 609 may again receive credentials that may be used to regenerate the recovery keys and/or the user cryptographic keys (e.g., the user public/private keys). In some embodiments, the user may be further enabled to generate a new password and/or new keys from the new password. In some embodiments, a wallet stored on the user device 609 may itself be encrypted, thus adding security protections for securely storing documents.

Figure 7:
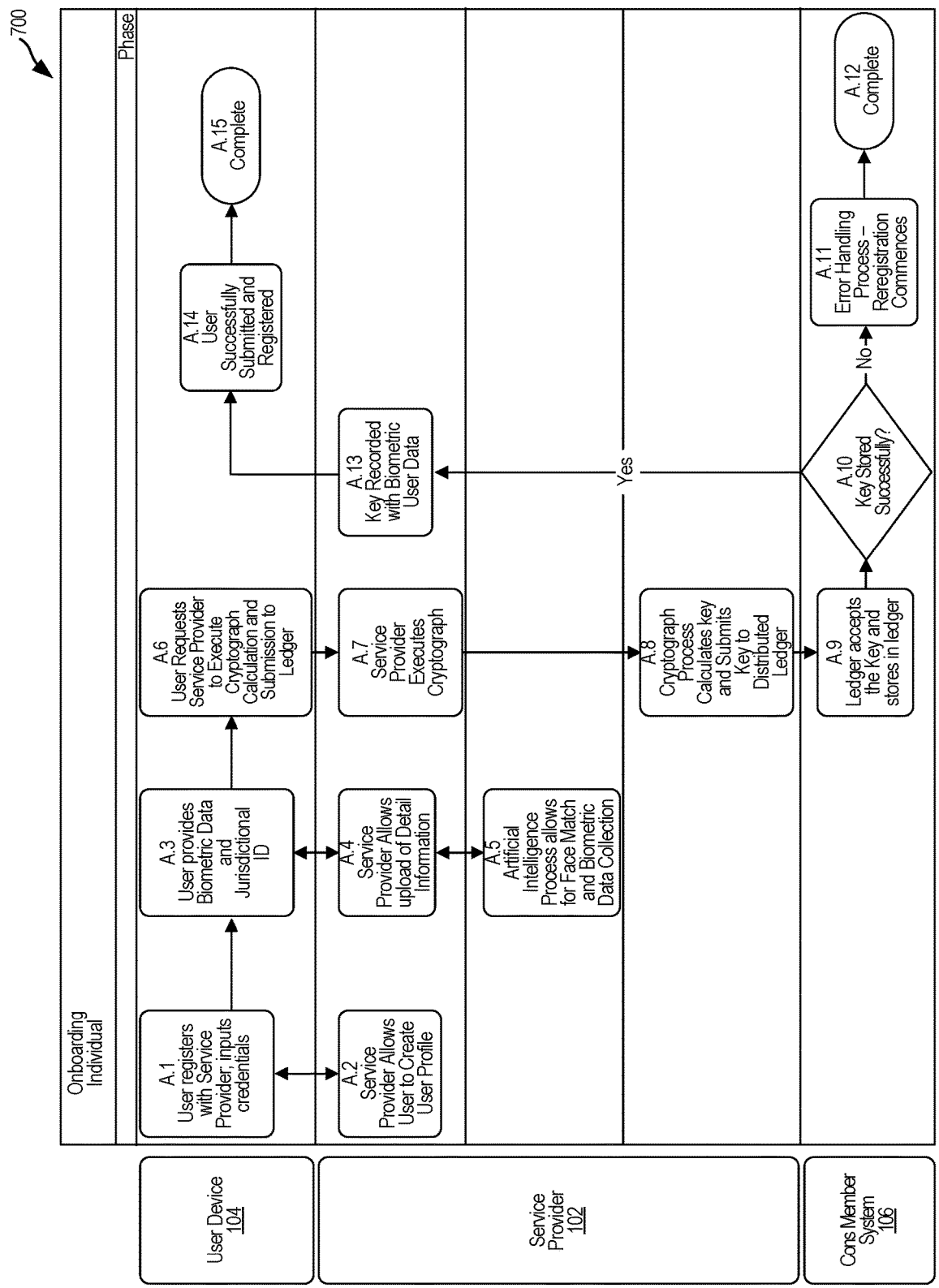
FIG. 7 illustrates a flow diagram for a service provider system to facilitate registration (e.g., onboarding) of a new user of a service provider system, according to some embodiments.

FIG. 7 illustrates a flow diagram of a process 700 for a service provider system to facilitate registration (e.g., onboarding) of a new user of a service provider system, according to some embodiments. In some embodiments, the process may incorporate one or more operations of the onboarding operations described herein (e.g., creating a user profile for a new user account (e.g., see FIG. 5), generating keys for log in and/or recovery (e.g., see FIG. 6)). As a result of the process. At the end of the process 700, the user account may be successfully created on the blockchain, whereby the user account is associated with a personal unique identity for the given user (e.g., a blockchain-based identity). The process may be performed by elements of the system 100 (e.g., the user device 104, the service provider 102, and/or the consortium member system 106). The user device 104 of the user may perform steps of the "User Device" in Table 1. The service provider 102 may perform steps of "Service Provider" in Table 1. The consortium member system 106 (e.g., each of the consortium member systems of the blockchain network) may perform steps of "Distributed Ledger" in Table 1. The onboarding process may be used when an individual first registers with the service provider, described herein. In addition to recording the user's name, address, and other demographic information, it also uses face match technology to record the individual's biometric data. In addition, the user can save graphic images of passports, driver's licenses, or other PII data securely.

TABLE 1

| Step | Performed By | Description |
|---|---|---|
| A.1 | User Device | User registers with Service Provider, providing basic information (e.g., credentials, demographic information) |
| A.2 | Service Provider | Enable creation of user profile (e.g., stored by the Service Provider) |
| A.3 | User Device | User provides biometric data and user image data (e.g., passport photo ID) |
| A.4 | Service Provider | Enable upload and storage of information from A.3 |
| A.5 | Service Provider | Perform AI processes to allow for face match and/or other biometric data collection/authentication |
| A.6 | User Device | User requests service provider to execute transaction to create account on blockchain |
| A.7 | Service Provider | Execute process to calculate cryptograph (e.g., key(s)) |
| A.8 | Service Provider | Calculate keys and submit to distributed ledger |
| A.9 | Distributed Ledger | Verify and accept submission from A.8 and store in the ledger |
| A.10 | Distributed Ledger | Determine if account is created and stored successfully on the blockchain |
| A.11 | Distributed Ledger | If no, perform error handling process; prompt for re-registration. |
| A.12 | Process Complete | Complete |
| A.13 | Service Provider | If yes, confirm that key(s) (e.g., user profile cryptographic key) is recorded in association with user identifying data. |
| A.14 | User Device | Notify user that the user registration was successful |
| A.15 | Process Complete | Complete |

Figure 8:
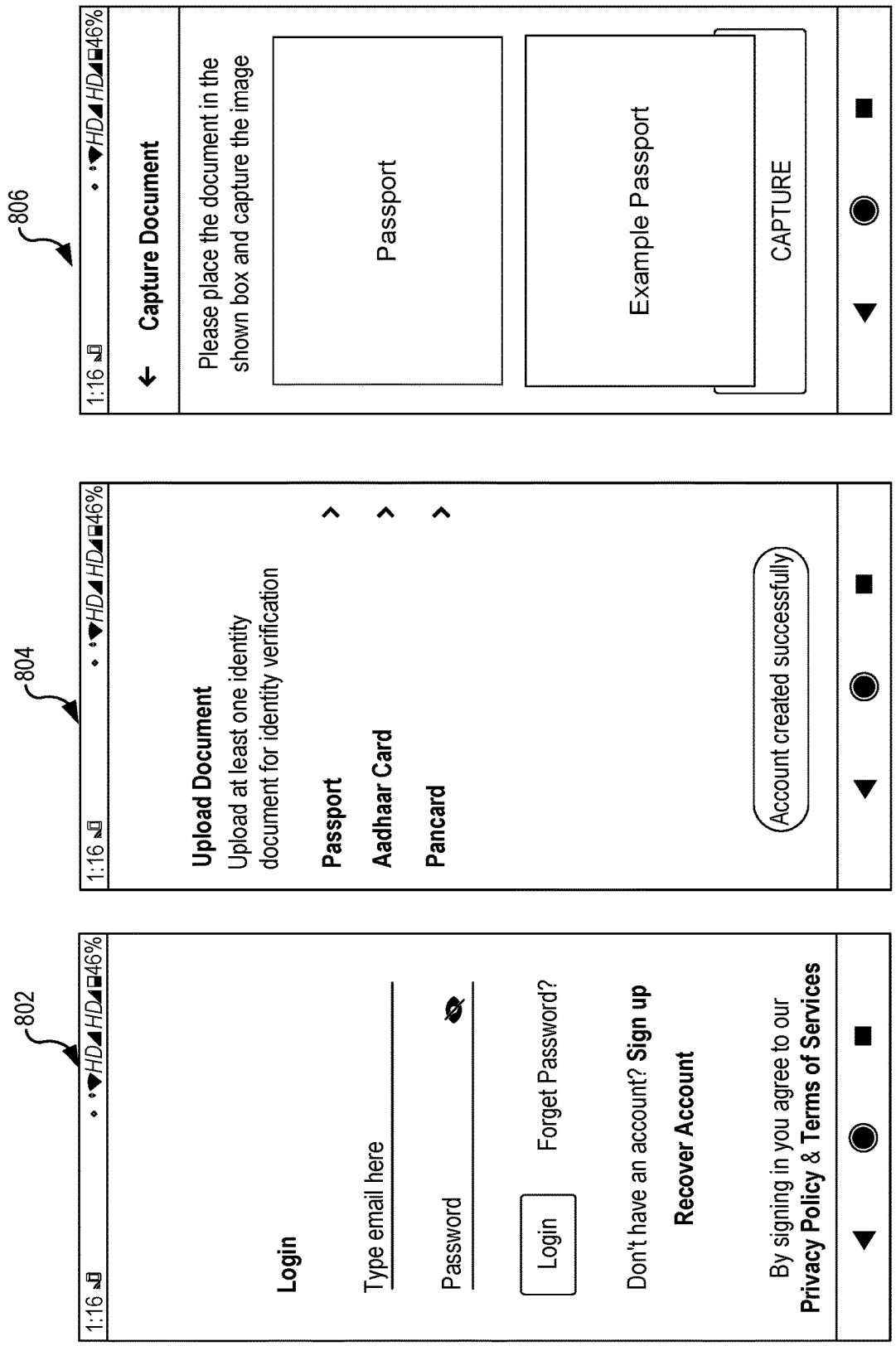
FIG. 8 illustrates example user interface (UI) views that may be presented via a user device to facilitate onboarding of a new user of a service provider system, according to some embodiments.
Figure 9:
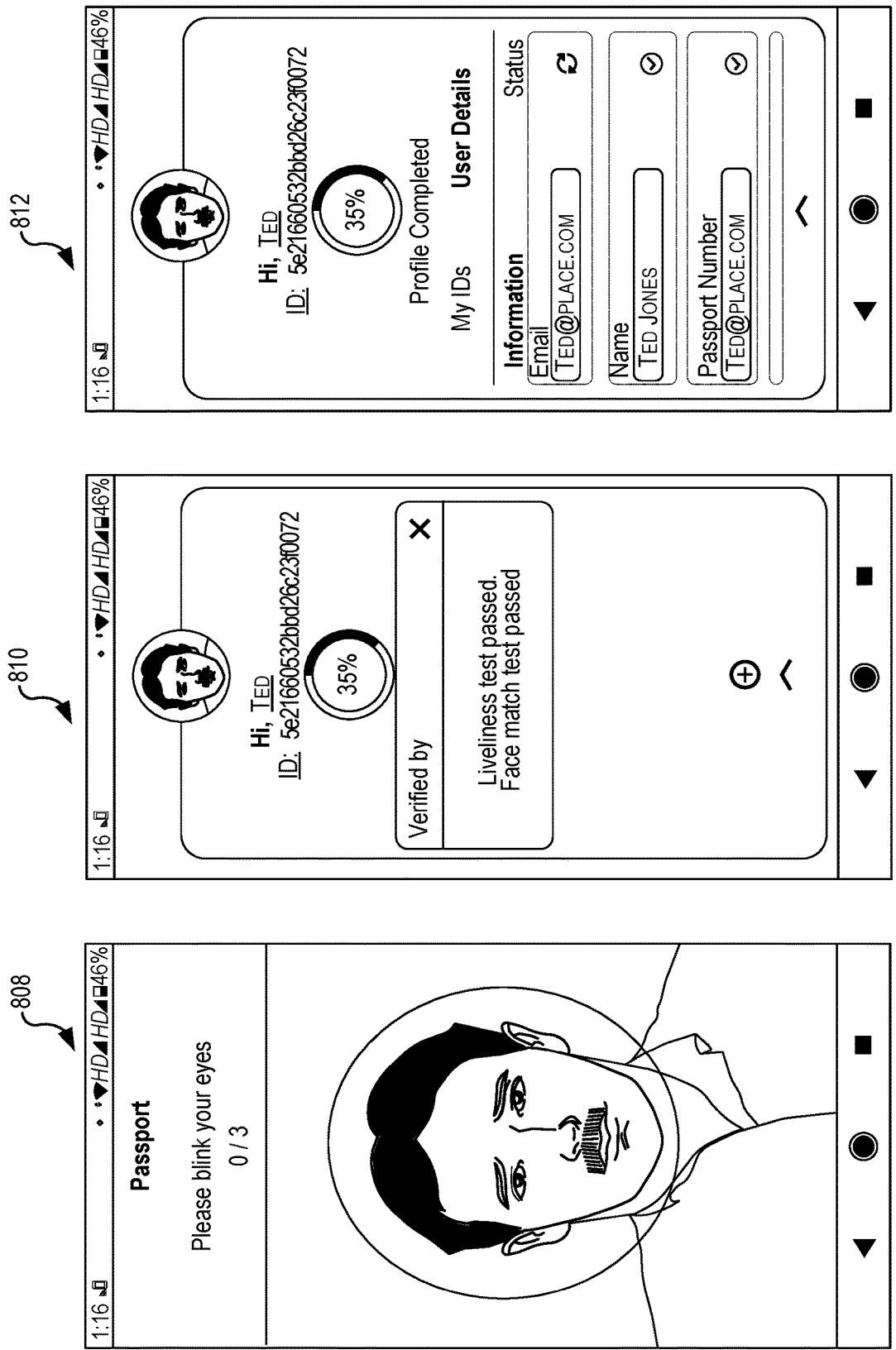
FIG. 9 illustrates additional example UI views that may be presented via a user device to facilitate onboarding of a new user of a service provider system, according to some embodiments.
Figure 10:
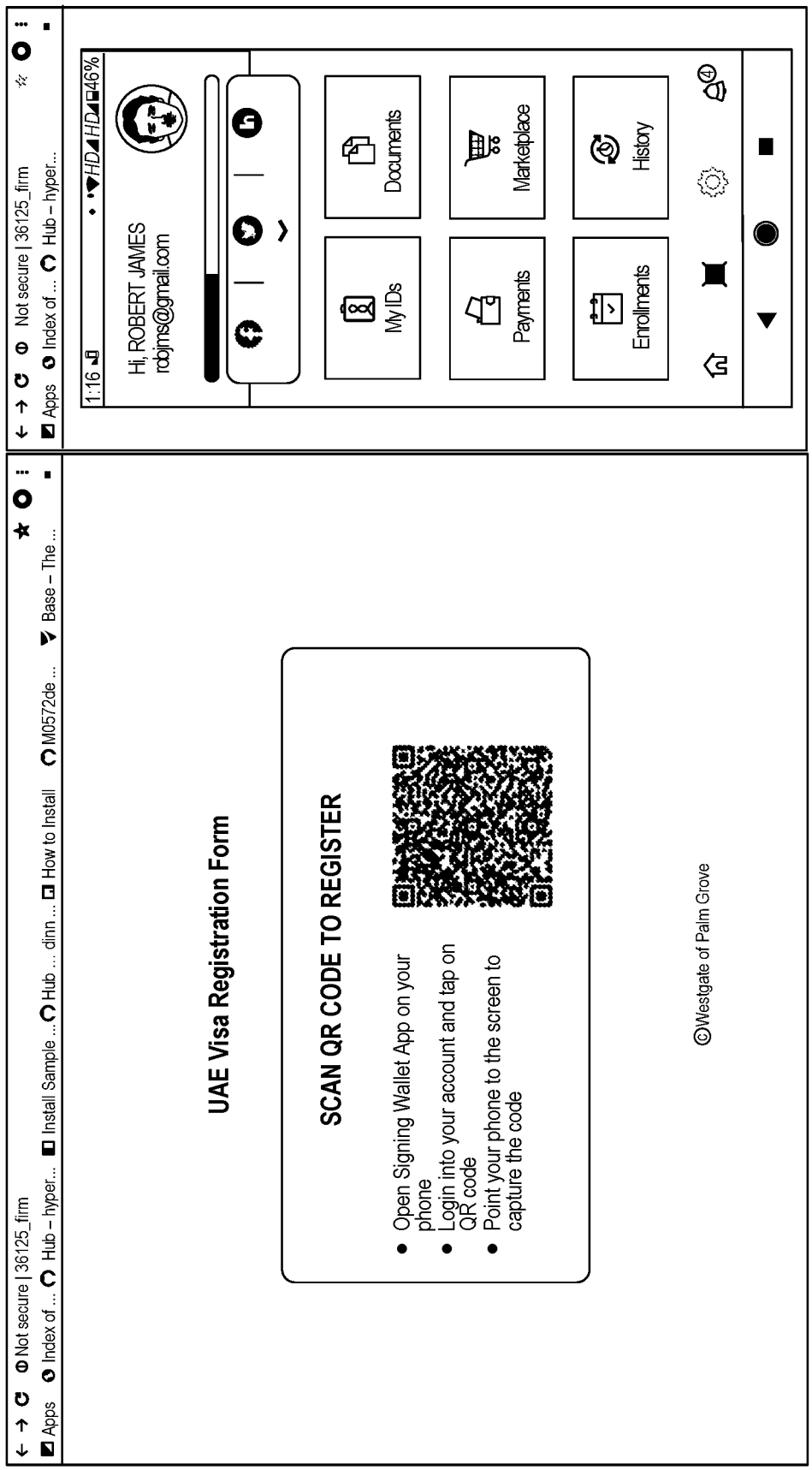
FIG. 10 illustrates example UI views that may be presented to facilitate an application process for a new Visa, according to some embodiments.
Figure 11:
FIG. 11 illustrates additional example UI views that may be presented to facilitate an application process for a new Visa, according to some embodiments.

FIG. 8 and FIG. 9 illustrate example user interface (UI) views that may be presented via a user device to facilitate onboarding of a new user of a service provider system, according to some embodiments. In some embodiments, one or more keys generated from the onboarding process may be used by the user to sign documents, obtain access to venues, and/or other suitable tasks associated with verifying user identity. The UI views may be presented on any of the user devices described herein. A service provider (e.g., service provider 102) may provide the application (e.g., application 122, which may be a web application, a native process, etc.) by which the UI views are presented.

Beginning with FIG. 8, using UI 802, the user device receives login credentials or initiates the process for creating a new account. As described herein, the login credentials may be used to access one or more keys (e.g., stored in a wallet on the user device) and/or other data (e.g., documents, keys, etc.) stored by the service provider. In some embodiments, whereby an account is to be created, presentation of the UI 802 at a user device may begin a process of communicating with the service provider 102 to create a new profile for the user based on queries from the application about demographic information. The queries may be in the form of fields to be filled in by the user. Using the UI 804 presented at the user device, the user may upload, as user image data, an identity document (e.g., a jurisdictional identifier) such as a passport, government-issued identity, or any other such document. This may be performed, using UI 806, which illustrates an example passport and a passport which is being imaged by a camera of the user device on which the UIs 802-812 are presented.

In FIG. 9, using UI 808, the application may use a camera on the user device to capture one or more "live" images of the user to perform a liveliness test. This may include opening their mouth, blinking their eyes, etc. to capture different images of the user to avoid spoofing using an image of the user. The service provider may use the livestream sequence of images and the image from the passport to verify that the user is the same. UI 810 depicts that the liveliness test has been passed and that a user identifier ("ID") has been generated for the user. In some embodiments, the user identifier may further indicate that one or more cryptographic keys have also been generated, in association with the user account. Thus, in this example, the user's face is depicted, the ID, and a message. UI 812 depicts similar data and other information about the user, which may be associated with the user account.

FIGS. 10, 11, 12, and 13, illustrate example UI views that may be presented to facilitate an application process for a new Visa, according to some embodiments. In one embodiment, UI view 1101 may be presented on a first user device such as a laptop, while UI views 1102, 1104 (of FIG. 11), and 1106 (of FIG. 12) may be presented on a second user device such as a smartphone. In some embodiments, UI view 1108 of FIG. 13 may be presented on an administrator device such as a laptop.

The UI view 1101 includes a QR code for registering for a Visa (e.g., for the United Arab Emirates (UAE)). To begin, a user may use their user device (e.g., user device 104) to scan the QR code, which may cause the application on the user device to verify their identity for purposes of registering for the Visa. In some embodiments, UI view 1102 is an example home screen view of the application prior to scanning the QR code. Using UI view 1104, the user may select the identity document to use to apply for the Visa. In this example, they have selected a passport. In some embodiments, the passport information may be prepopulated into the form fields. Similar UI views may be used to collect/verify other personal information to be provided for the Visa application. Using UI view 1106, the user may enter their travel details and submit. Upon submission, the service provider 102 may check the identity of the user by verifying one or more cryptographic key(s) (e.g., a user profile cryptographic key), as described herein. In some embodiments, the user may "sign" the Visa application using a cryptographic key (e.g., a user private key). Because a key may be unique to the user and known to the service provider 102, the service provider may confirm its authenticity. In UI view 1108, in an administrator portal, a view of a new cryptographic key (e.g., a hash) that has been created based on the passport used to apply for the Visa application is presented. In some embodiments, the hash may represent the application (e.g., passport, signature, and/or application combined).

Figure 14:
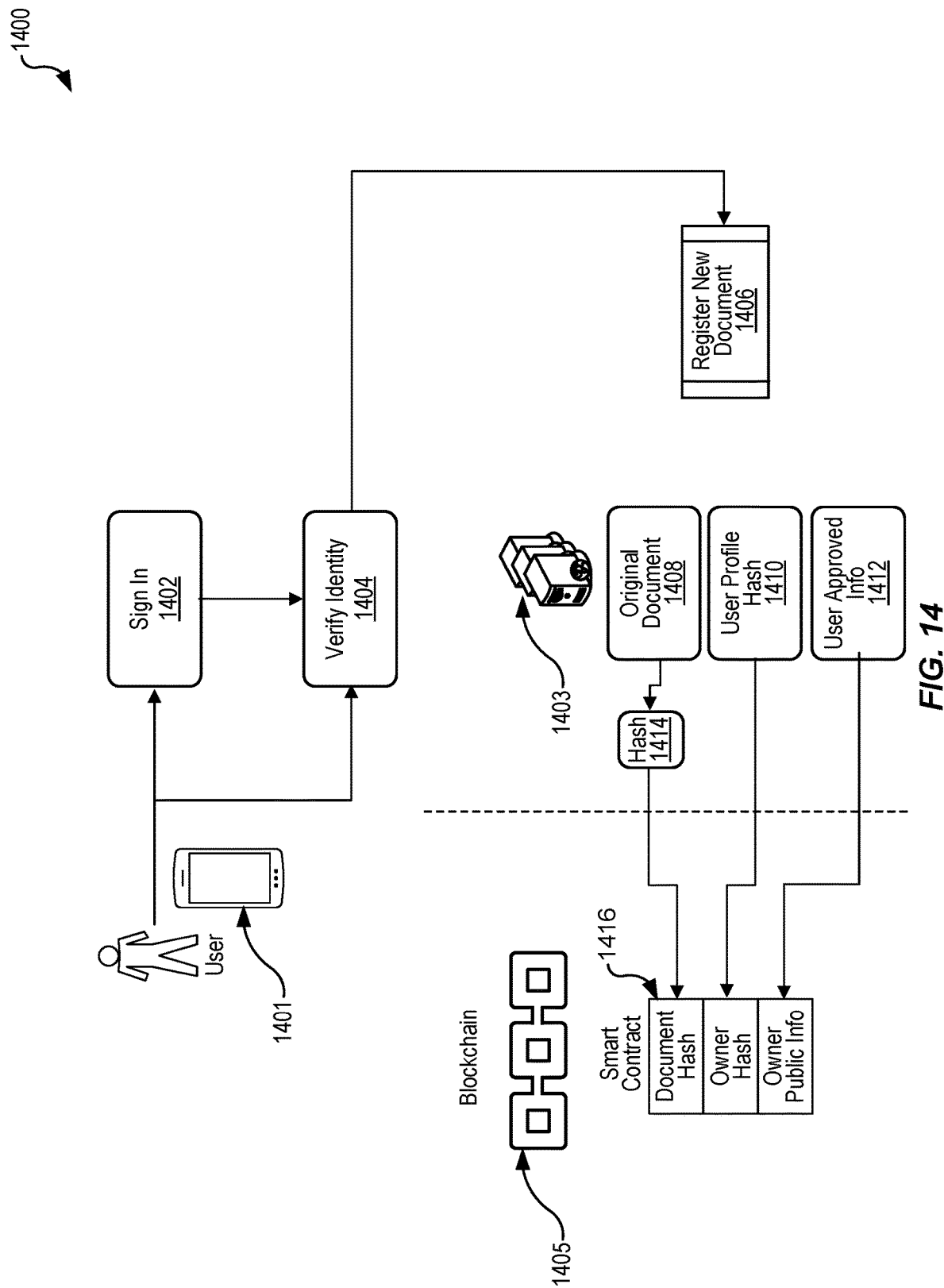
FIG. 14 illustrates an example technique for enabling a user to register a new document, according to some embodiments.

FIG. 14 illustrates an example technique for enabling a user to register a new document, according to some embodiments. Diagram 1400 of FIG. 14 depicts several elements, including a user device 1401 of a user, a sign in process 1402, an identity verification process 1404, a service provider 1403, and a blockchain network 1405.

As depicted in FIG. 14, in some embodiments, to register a new document, a user first logs in to the system and verifies their identity. For example, the user device 1401 (e.g., which may be similar to user device 104 of FIG. 1) may receive input to launch an application (e.g., application 122). In some embodiments, upon being launched, the application may receive user credentials (e.g., email address, password, phone number, etc.) to log in. In some embodiments, as described herein (e.g., see FIG. 6), upon receiving the credentials, the user private key (e.g., previously created during the onboarding process), may be automatically generated. In some embodiments, the user private key may be already stored on the user device 1401 (e.g., in a wallet) or on a separate device. In any case, the user private key be used to sign a challenge text, whereby the service provider may verify the signature, using the user public key. In some embodiments, subsequent to log in (and/or as part of the log in process), the user may further verify their identity. For example, the application may prompt the user to perform a video call verification process, similar to as described herein. In some embodiments, this process may be used to compare against previously stored biometric data for the user (e.g., a multidimensional vector of the user's face). Any suitable process may be used to verify the identity of the user. In some embodiments, a user profile cryptographic key (e.g., a hash of user profile data, as described in reference to FIG. 5) may be stored (e.g., in a wallet of the user device 1401 or external device, from a previous onboarding process). In some embodiments, during the identity verification process 1404, the user profile cryptographic key may be retrieved and provided for identity verification. In some embodiments, the process 1404 of verify a user's identity may be performed in conjunction with (or separate from) the login process 1402.

Upon logging in to the service provider 1403 and verifying the user identity with the service provider 1403, the user device 1401 may receive user input (e.g., a request) to execute a process 1406 to register a new document. For example the user may have authored a new document and may upload the document to the service provider 1403 via the application. In some embodiments, the service provider 1403 may generate a hash 1414 of the document (and/or other suitable data associated with storing a record of (and/or link to) the document to the blockchain). In some embodiments, the user device 1401 may further provide the user profile cryptographic key (e.g., a hash value), which may correspond to (e.g., include) user profile hash 1410. In some embodiments, the service provider 1403 may retrieve the user profile hash 1410 has that may be previously stored by the service provider 1403. In some embodiments, the user device 1401 may further provide user approved information 1412, which may be any suitable data associated with the transaction (e.g., user identity information, user demographics, document metadata, etc.). In some embodiments, the user approved information 1412 may (or may not) be encrypted.

In some embodiments, upon obtaining (e.g., generating and/or receiving) the data for executing process 1406, the service provider 1403 may invoke a transaction request to the plurality of consortium member systems of the blockchain network 1405. In some embodiments, the transaction request and/or data within the request (e.g., the hash 1414 of the document) may be signed using the user private key. In some embodiments, a smart contract, executed by a member system, may verify the transaction request based in part on retrieving a user public key that corresponds to the user private key. In some embodiments, the smart contract may verify the signature of the transaction request and verify that the particular user (e.g., the user account, associated with a user ID), associated with the user public key, is authorized to store the document via the smart contract. In some embodiments, the service provider 1403 may further sign one or more elements of the transaction request with a key (e.g., a private key of the service provider), to verify that the request is valid. This may apply to any suitable transaction request from the service provider 1403 to the blockchain network nodes.

Upon verification of the transaction request, the smart contract (e.g., for a plurality of member systems of the blockchain network 1405) may execute one or more functions, as described herein (e.g., see FIG. 4). For example, in the case of storing a new document, the smart contract may store one or more data objects associated with the transaction request. In some embodiments, these one or more data objects may be stored in association with one another, and/or with the user account information of the user previously stored on to the blockchain. For example, a document hash 1416 (e.g., which may be similar to (e.g., same as) the received hash 1414), an owner hash (e.g., corresponding to the user profile hash 1410), and/or user public information (e.g., corresponding to user approved information 1412) may be stored in association with one another. In some embodiments, once the blockchain network 1405 confirms that the information has been successfully store, a success result may be returned to the service provider 1403 and/or the user device 1401.

Figure 15:
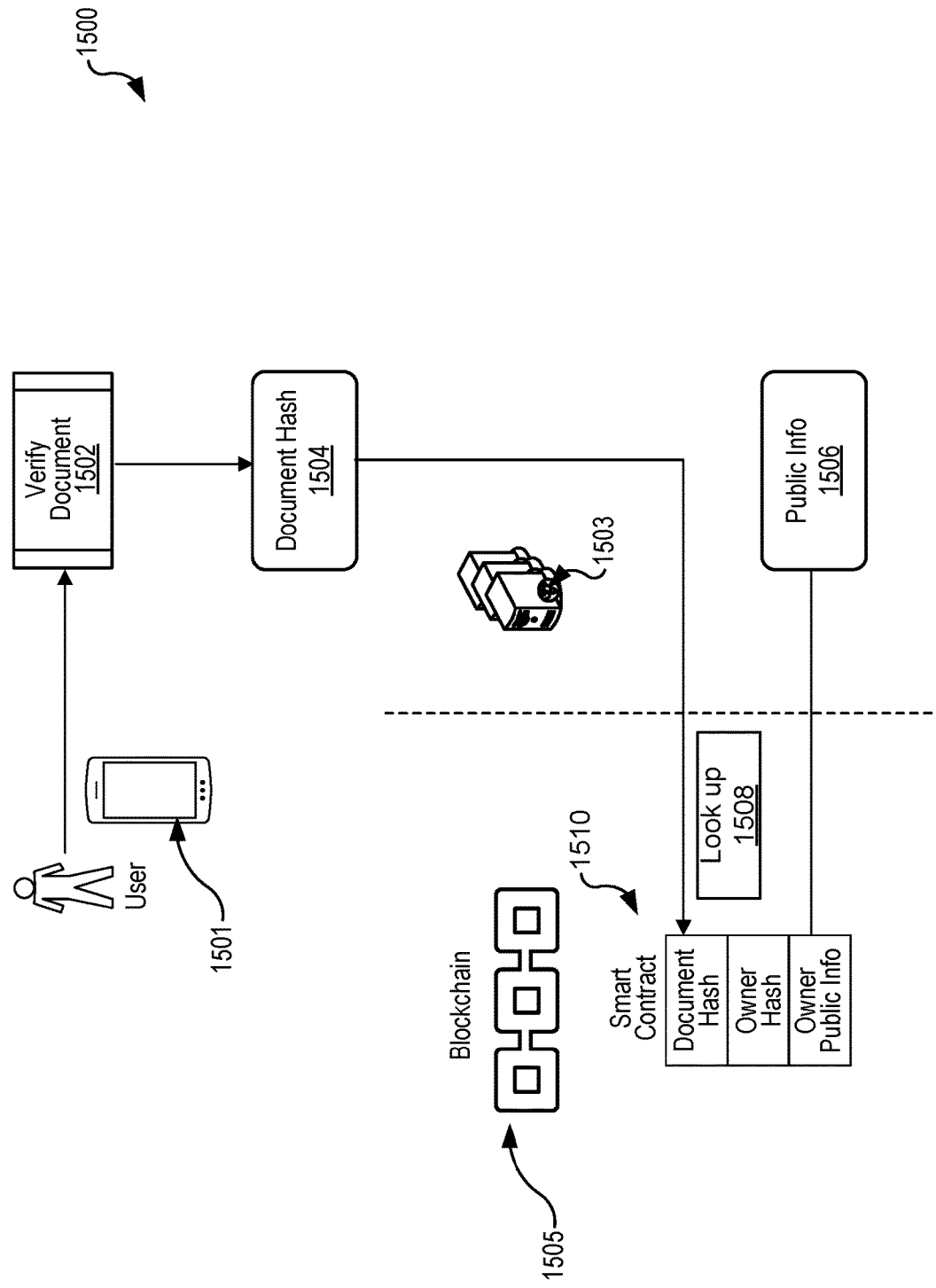
FIG. 15 illustrates an example technique for enabling a user to verify an authenticity of a document, according to some embodiments.

FIG. 15 illustrates an example technique for enabling a user to determine an authenticity and/or ownership of a document, according to some embodiments. Similar to diagram 1400 of FIG. 14, diagram 1500 depicts several elements, including a user device 1501 of a user, a service provider 1503, and a blockchain network 1505. In some embodiments, the user device 1501 may execute an application (e.g., application 122, upon logging in), whereby the application receives user input to execute process 1502, to verify a document. For example, the request may be associated with verifying whether the document is the original document that was saved to the blockchain network 1505. In another example, the request may be associated with determining the owner of the document. In any case, the user device may obtain (e.g., receive and/or generate) a document hash 1504 of a document, and transmit that to the service provider 1503. In some embodiments, logging in may not be required to execute this process. The service provider 1503 may perform process 1502 on behalf of the user device 1501, using the document hash 1504. In some embodiments, this may be perform via transaction request, similar to as described herein. In some embodiments, a user device 1501 may directly perform a look-up 1508 via the blockchain network 1505. In some embodiments, a consortium member system of the blockchain network 1505 may execute a smart contract to search for a document hash that matches document hash 1504. If a match is found, then the associated owner public information may be retrieved as public information 1506. In some embodiments, this may indicate, for example, the owner of the document. It may also indicate that the document provided by the user device 1501 is the authentic document associated with this particular user (e.g., as the owner and/or author). In some embodiments, this may be applicable in a case to determine if a particular file has a certain legal status (e.g., if it is copyright protected, and/or by whom).

Figure 16:
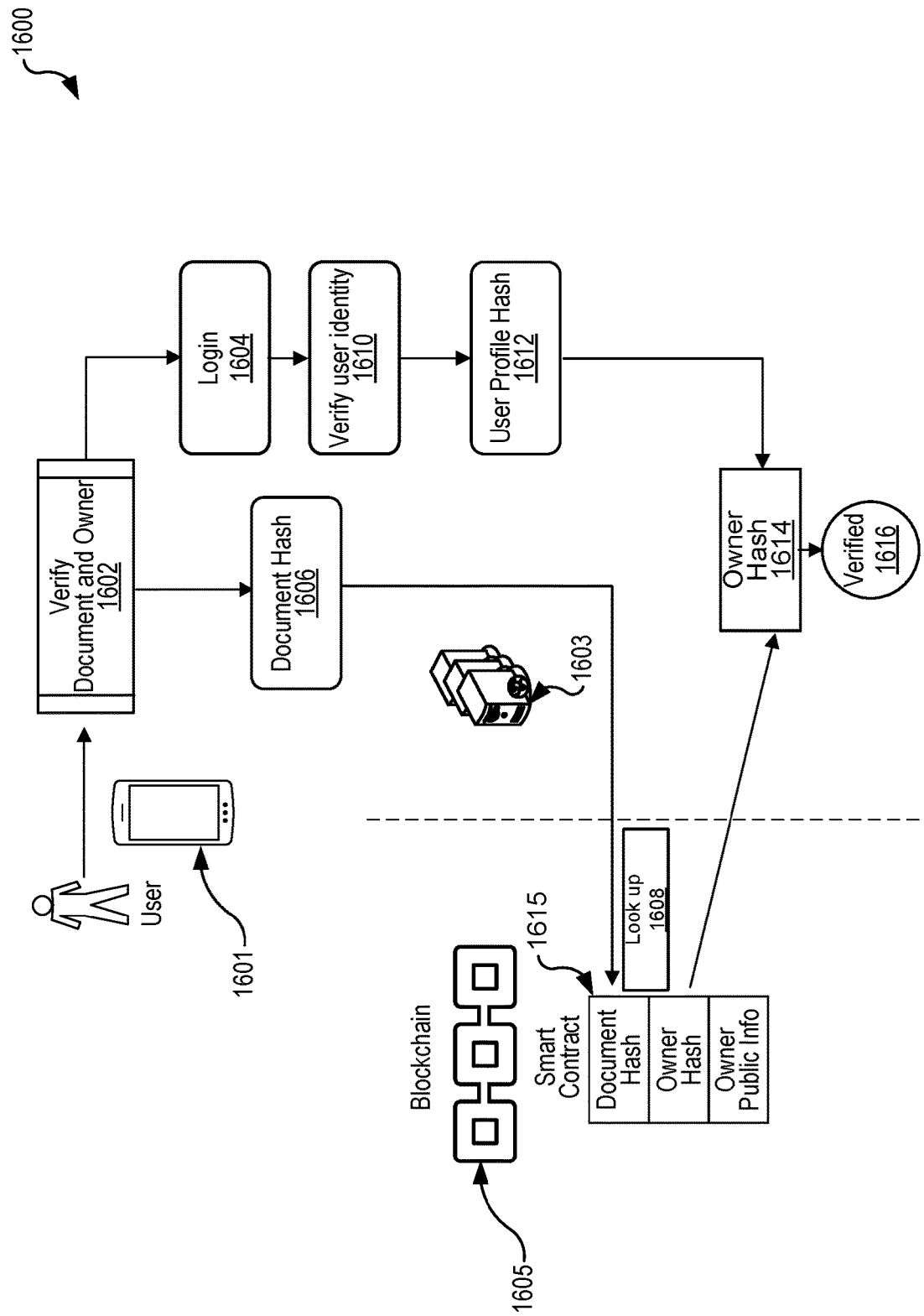
FIG. 16 illustrates an example technique for enabling a user to verify that a stored document is owned by the user, according to some embodiments.

FIG. 16 illustrates an example technique for enabling a user to verify that a stored document is owned by a particular user, according to some embodiments. Similar to diagram 1500 of FIG. 15, diagram 1600 of FIG. 16 depicts several elements, including a user device 1601 of a user, a service provider 1603, and a blockchain network 1605. In this example, an application executing on the user device 1601 may receive a request to verify that a particular document is owned by a particular owner. A process 1602 may be executed, whereby the document is received and a document hash 1606 is generated, as described herein. Additionally, the user device 1601 may execute a process 1604 to log in the user and process 1610 to verify the user's identity, similarly to as described herein (e.g., with respect to FIGS. 14 and/or 15). In some embodiments, the user profile cryptographic key (e.g., user profile hash 1612) may be retrieved. In some embodiments, the service provider 1603 may facilitate a look-up process 1608, whereby the document hash 1606 is used to perform a lookup on the blockchain network 1605 (e.g., via execution of a smart contract). If a matching document hash 1615 is found, then a previously stored owner hash 1614 (e.g., as described in reference to FIG. 14) may be retrieved. This owner hash 1614 may be compared with the user profile hash 1612 for the user that is currently logged in to user device 1601. If a match is determined, then the service provider 1603 may return a result 1616 indicating that the user is verified to be the true owner. If a match of hashes is not determined, then the user may not be true owner. It should be understood that the service provider 1603 and user device 1601 may coordinate performance of one or more operations for performing process 1602.

Figure 17:
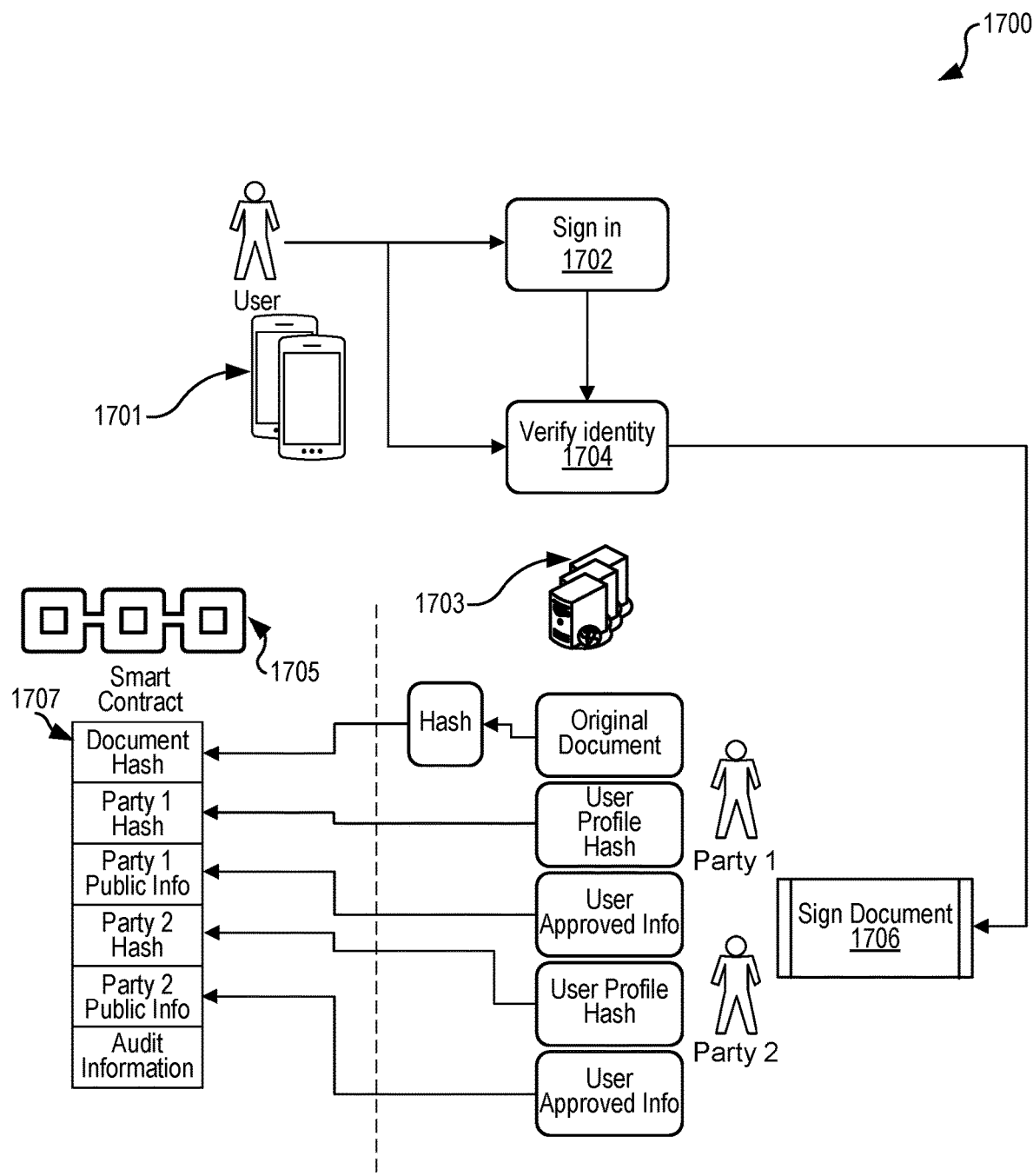
FIG. 17 illustrates an example technique for authenticating a plurality of users involved in signing a document, according to some embodiments.

FIG. 17 illustrates an example technique for authenticating a plurality of users involved in signing a document, according to some embodiments. Diagram 1700 of FIG. 17 depicts several elements, including user devices 1701 of a plurality of users (e.g., party 1 and party 2), a service provider 1703, and a blockchain network 1705. In this example, at least two parties (e.g., party 1 and party 2) may intend to execute a transaction together (e.g., signing a contract). As depicted in diagram 1700, and, similarly to as described herein, each user device (e.g., of each party) may execute a login process 1702 to sign in. Each user device may further execute an identity verification process 1704, to verify each user's identity. For example, upon signing in, each user device may retrieve a user profile cryptographic key for the respective user. In some embodiments, this process 1704 of verify a user's identity may be performed in conjunction with (or separate from) the login process 1702.

In some embodiments, each upon logging in and retrieving a user profile hash (e.g., a user profile cryptographic key for each user that identifies the respective user's identity), the service provider 1703 may execute a process 1706 to facilitate signing the contract by both parties. For example, an application provided by the service provider 1703 on each device may facilitate each user signing the document. It should be understood that any suitable protocol and/or procedure may be used by the application to facilitate both parties signing the document. For example, the service provider 1703 may provide that party 1 should sign first, and then party 2 will be afforded an opportunity to sign (or vice versa). In another example, one or both parties may be given opportunities to provide feedback on the document and/or make changes (e.g., to collaborate on the contract terms), and then a signing process may proceed. Accordingly, any suitable application logic may be implemented to facilitate transactions involving one or more users. In this example, party 1 may sign the contract document, and upload the document to the service provider 1703 via their user device. Then party 2 may retrieve the document from the service provider 1703 and sign the document. The service provider 1703 may generate a hash of the document, as described herein. The service provider 1703 may further collect the user profile hashes of the respective parties, as well as user approved information for each party (e.g., name, demographic information, etc.), as described herein. In some embodiments, 1703 the service provider 1703 may then execute a transaction request to the blockchain network 1705. This may involve storing to the blockchain the document hash 1707 of the signed document, along with other respective information provided by the parties. In some embodiments, additional audit information may also be stored to the blockchain. This may include, for example, a date or time at which the contract was executed, one or more IP addresses, etc. In this way, techniques may facilitate secure transactions involving one or more parties.

Figure 18:
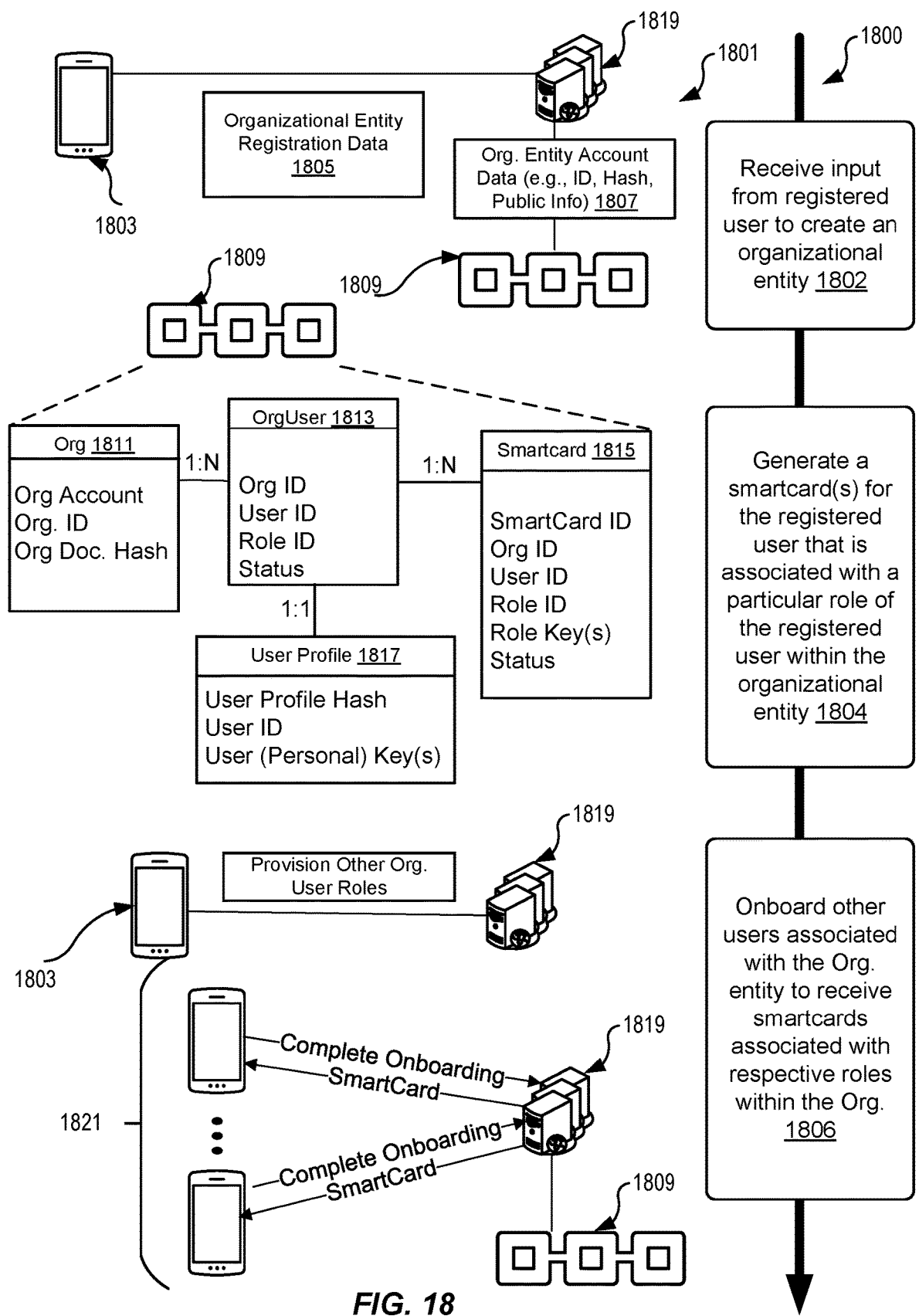
FIG. 18 illustrates an example technique for registering a new organizational entity and associating (e.g., onboarding) one or more users with the new organizational entity, according to some embodiments.

FIG. 18 illustrates an example process 1800 for registering a new organizational entity and/or associating (e.g., onboarding) one or more users with the new organizational entity, according to some embodiments. In some embodiments, the process 1800 may be performed as another component of the onboarding process 502 of FIG. 5, and/or in a future process that is subsequent to initial onboarding of the user. Diagram 1801 includes elements that depict aspects of one or more operations that may occur during performance of process 1800. Diagram 1801 depicts, among other things, a user device 1803, a service provider 1819, and a blockchain network 1809, which may be similar to any respective entity described herein. The process 1800 may be performed by a service provider, which may, in turn, utilize a blockchain network, as described herein.

At block 1802, the process 1800 includes receiving input from a registered user to create an organization entity. Using diagram 1801 for illustration, suppose that a user of user device 1803 has already onboarded (e.g., registered) with the service provider 1819, as described herein. For example, the service provider 1819 may have already created an account on behalf of the user, stored account information to the blockchain, generated and/or provisioned keys (e.g., a user profile cryptographic key, a cryptographic key pair (e.g., including a user private/public key), etc.). In this example, the user cryptographic key pair may be associated with the user's identity, independent from a role in a particular organization. Suppose that the registered user is associated with a particular organizational entity, such that the registered user (e.g., a managing partner of a law firm) is authorized to create an account on behalf of the organizational entity (e.g., the law firm). The user device 1803 may receive registration data 1805 associated with the organizational entity as input from the registered user, which may include suitable organization documents (e.g., proof of partnership, incorporation, other legal documents, a charter for the organization, etc.) for creating an account for the organization. The service provider 1819 may, upon receiving and processing the registration data 1805, create an account for the organizational entity. In some embodiments, an account profile for the organizational entity may be stored on the service provider system. In some embodiments, the service provider 1819 may further invoke a request to the blockchain network 1809 to create an account (e.g., utilizing a smart contract) for the organization on the blockchain, such that an account profile for the organization is stored to the blockchain. In some embodiments, any suitable organizational entity account data 1807 may be stored to the blockchain. This may include, for example, document hashes for organization registration documents, an organizational entity identifier (which may be referred to herein as an "organization identifier"), public information associated with the organization (e.g., the organization name, managing officers, etc.). In some embodiments, any suitable data associated with the organizational entity may be stored to the blockchain 1809, the service provider 1819, and/or the user device 1803.

At block 1804, the process 1800 includes generating a smartcard for the registered user that is associated with a particular role of the registered user within the organizational entity. Continuing with the illustration of diagram 1801, as described in reference to block 1802, the blockchain network 1809 may store account data 1811 associated with the organizational entity that was registered a block 1802. In some embodiments, account data 1811 may correspond to (and/or included) the account data 1807. In some embodiments, the account data 1811 may include other information, for example, references to document hashes that are subsequently stored in association with the organizational entity over time, authors/owners (e.g., user profile hashes, user ID's, and/or role ID's) associated with respective document hashes, etc. In some embodiments, the organizational entity identifier may further be stored with the account data 1811, which may be used to uniquely identify the organizational entity.

In some embodiments, upon the creation of account data 1807 for the organizational entity that is stored to the blockchain network 1809, service provider 1819 may further facilitate storing organizational entity user data 1813 associated with the registered user. In some embodiments, the organizational entity user data 1813 may be associated with the registered user's role (e.g., which may be one of a plurality of roles) and/or status within the registered organizational entity. For example, the organizational entity user data 1813 may include a role identifier (e.g., a unique alphanumeric string), which indicates the role (e.g., president, partner, etc.) of the user within the organizational entity. In some embodiments, as described further herein (e.g., with respect to smartcard 1815), the role identifier may be associated with one or more access rights (e.g., privileges) of the role identifier, for example, to act on behalf of the organization (e.g., to execute a contract, to access a building and/or computing device, to obtain a license, etc.). In some embodiments, the registered user who first registered the organizational entity may be granted access rights to create the organizational entity user data 1813 (and/or one or more smartcards) for their own account. In some embodiments, as described further herein, the registered user (and/or other approved users) may be further granted administrative access rights to create and/or provision other user accounts associated with the organizational entity. In some embodiments, the organizational entity user data 1813 may indicate a status of the user role within the organizational entity (e.g., employed, on-leave, account role disabled, etc.). In some embodiments, the organizational entity user data 1813 may be associated with the account data 1811 for the organization (e.g., including a reference to the organizational entity identifier within the organizational entity user data 1813. In some embodiments, the organizational entity user data 1813 may be further associated with user profile data 1817, including the user profile hash (e.g., the user profile cryptographic key), the user identifier for the personal user account of the registered user, and/or one or more user keys, as described herein. In some embodiments, for any given organizational entity account (e.g., represented by account data 1811) for a particular organizational entity, there may be one or more users of the organization that are subsequently onboarded (e.g., according to each user's one or more roles) and respectively associated with organizational entity user data 1813 (e.g., a one-to-many (1:N) relationship between account data 1811 and organizational entity user data 1813). In this example, the registered user of block 1802 may be the first onboarded user that is associated with the organization. Each subsequent user (e.g., user role) that is associated with the organization may be respectively associated with organizational entity user data 1813, and/or be associated with their own user profile data 1817 (e.g., a 1:1 relationship between organizational entity user data 1813 and user profile data 1817).

In some embodiments, for a given user role within an organization (e.g., for a given organizational entity user data 1813) the service provider 1819 may provision one or more role cryptographic keys that are respectively associated with the organizational entity user data 1813. In some embodiments, a role cryptographic key (e.g., a public/private key pair) may be associated with a particular role (e.g., a role ID) of the user within the organizational entity. In some embodiments, the role cryptographic key may enable the user (e.g., the role identifier of the user) to execute a transaction on behalf of the organizational entity, acting the user's capacity within the specific role (e.g., a law firm managing partner signing a contract on behalf of the law firm). In some embodiments, the role cryptographic private key may be used to sign a transaction request, similar to as described herein, while the blockchain network 1809 may authenticate the signed transaction request using the corresponding role cryptographic public key. In some embodiments, a role cryptographic key may be provisioned within a smartcard 1815, which may be a physical device (e.g., a card, a storage device) and/or a digital smartcard. For example, a physical smartcard may be used to access a building, using a role cryptographic key. In some embodiments, a digital smartcard may be stored to a wallet on a user device (e.g., 1803), among one or more smartcards that are provisioned to the wallet. In some embodiments, a given smartcard 1815 may be include any suitable data associated with a user role within an organizational entity. This may include, for example, a smartcard identifier (e.g., a unique identifier for the smartcard), an organizational identifier (e.g., identifying the particular organizational entity the smartcard is associated with), a user identifier (e.g., associated with the user profile 1817), a role identifier (e.g., indicating the role of the user), one or more role cryptographic keys associated with the role, a status of the user within the particular role, etc. In some embodiments, the status of a particular smartcard 1815 may be the same or different from a status of the organizational entity user data 1813, depending on the context. For example, the smartcard 1815 status may be disabled (e.g., disabling access to a particular building), while the organizational entity user data 1813 may be enabled (e.g., indicating that the user is still employed with the organization). In some embodiments, a given organizational entity user data 1813 (e.g., for a given role identifier) may be associated with multiple smartcards (e.g., a 1:N relationship), for example, with each smartcard indicating unique access rights and/or privileges of the particular smartcard. For example, one smartcard may enable rights to sign a document on behalf of the organization, while another smartcard may enable rights to access a storage drive. In some embodiments, each smartcard may be associated with a different role cryptographic key. In some embodiments, a given user may have multiple roles within the organization, each role having its own set of one or more smartcards provisioned. It should be understood that any suitable relational system (e.g., between user profiles, user roles, organizational entities, and/or smartcards) may be employed for performing techniques described herein. Furthermore, each of these data objects may include any suitable number and/or type of data elements. In some embodiments, these data objects (e.g., user profile data 1817, organizational entity user data 1813, smartcard(s) 1815, and/or organizational entity account data 1811) may be stored to the blockchain network 1809 in suitable association with one another.

At block 1806, the process 1800 includes onboarding other users associated with the organizational entity to receive smartcards associate with respective roles within the organizational entity. Continuing with diagram 1801 for further illustration, in some embodiments, the user device 1803 of the registered user (e.g., an administrator of the organizational entity) may enable provisioning of other user roles associated with the organizational entity. For example, the user device 1803 may enable the administrator to upload role information for different users of the organization. In some embodiments, this may involve provisioning a new account for the user with the service provider 1819, which may further be associated with a role (e.g., a role identifier) within the organization. In some embodiments, one or more smartcards may also be provisioned (e.g., for a newly provisioned role for a user), as described above. In some embodiments, subsequent to accounts and/or roles being provisioned for respective users of the organizational entity, each of the users (e.g., via respective user devices) may perform an onboarding process with the service provider 1819. In some embodiments, each user's onboarding process may be similar to as described herein, for example, performing a liveliness test, uploading a jurisdictional identifier, verifying the user's identity, inputting credentials, etc. In this example, since a user role may already be previously provisioned, the user may link the provisioned user role identifier with the account that is activated during the onboarding process. Thus, upon completing the onboarding process, the user account may be activated, and the user device for the respective user may receive one or more smartcards (e.g., associated with the role(s) of the user within the organizational entity). In some embodiments, similar data objects may be stored to the blockchain network 1809 for each onboarded user, as described in reference to block 1804.

In some embodiments, instead of pre-provisioning user accounts and/or user data for a user role within an organizational entity (e.g., which are subsequently activated during an onboarding process with each user, described above), a different ordering may be used for onboarding users. For example, a user may be onboarded, similar to as described herein. Then, an application may enable the user to signal to an administrator of the organizational entity (e.g., the user of user device 1803) that the user has onboarded, and is requesting to be approved for a particular rule (e.g., to receive one or more smartcards for a particular role). Upon receiving the request, the administrator may then grant (or deny) the request, which may then activate the account and complete the smartcard provisioning process to the respective user device.

Figure 19:
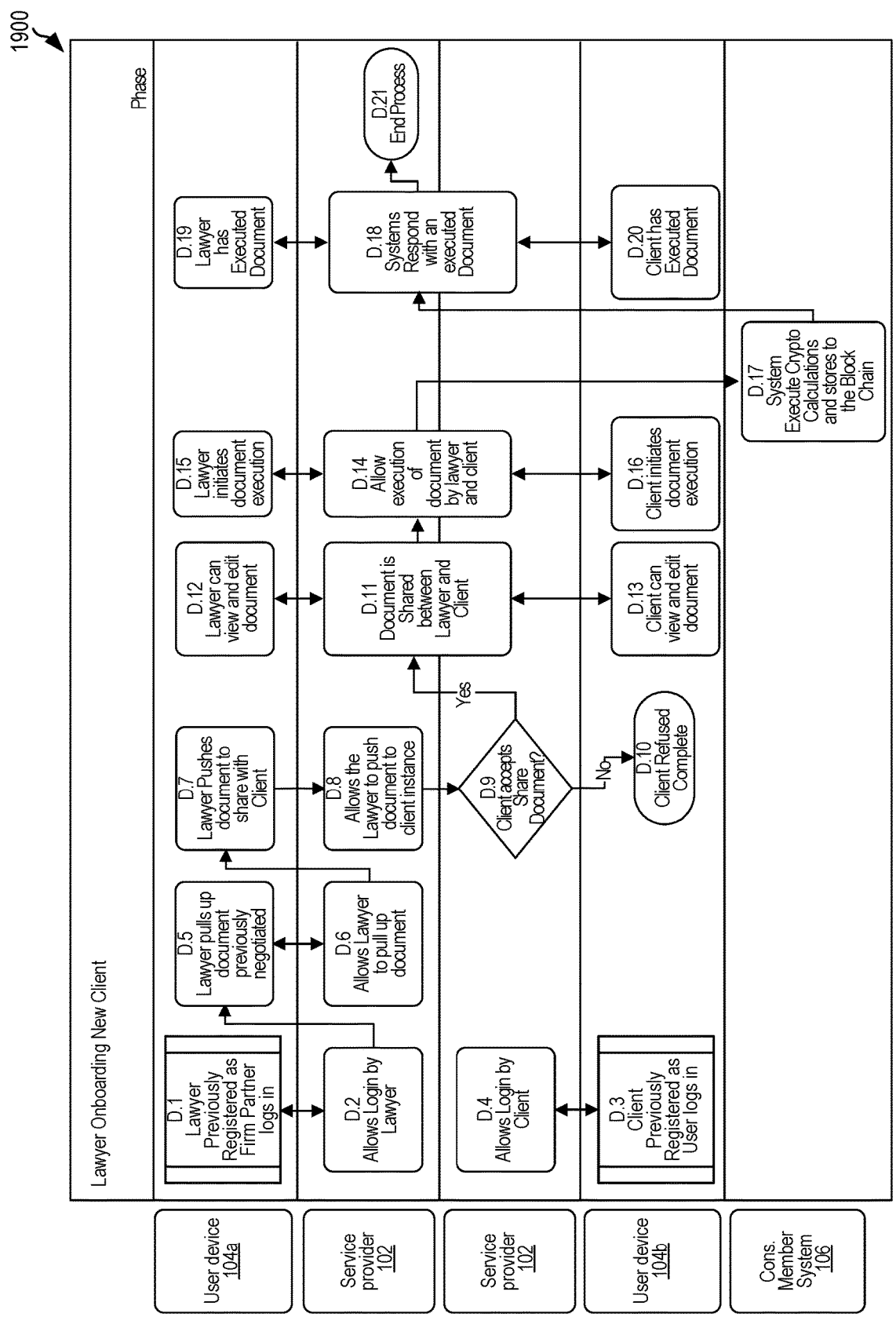
FIG. 19 illustrates an example flow chart for a service provider system that facilitates signing of a document by two parties, according to some embodiments.

FIG. 19 illustrates an example process 1900 for a service provider system that facilitates signing of a document by two parties, according to some embodiments. In this example, both parties may be registered users of the service provider 102. A first party may be a lawyer who is a partner at a law firm. In some embodiments, the lawyer may have previously onboarded with the service provider 102, both creating a user profile associated with their personal identity and also onboarding themselves with a particular role at the law firm (e.g., as a partner role within the law firm), as described in reference to FIG. 18. The second party may be a new client, and the service provider 102 is facilitating signing an agreement (e.g., a contract document) between the two parties. In this case, the lawyer may execute the contract using a role cryptographic key to sign the document (e.g., associated with the role identifier of the partner). The role cryptographic key may be associate with the partner's authority to sign a document on behalf of the firm. Meanwhile, the client may be signing the document with their user private key (e.g., in their personal capacity as a user). It should be understood that any suitable number of parties may be associate with a document, and each party may sign the document in any suitable capacity (e.g., associated with an organizational role, a user, etc.). As a result of the process 1900, data associated with (e.g., confirming) the executed contract may be stored to the blockchain. The process 1900, described further below in reference to Table 2, may be performed by elements of the system 100 (e.g., user device 104a and 104b, the service provider 102, and/or the consortium member system 106). The user device 104a may perform steps of the "Lawyer Device" in Table 2, while the user device 104b may perform the steps of the "Client Device" in Table 2. The service provider 102 may perform steps of "Service Provider" in Table 2. The consortium member system 106 (e.g., each of the consortium member systems of the blockchain network) may perform steps of "Distributed Ledger" in Table 2. It should be understood that any suitable sequence of operations may be performed for facilitating the signing of an agreement by two or more parties.

TABLE 2

| Step | Performed By | Description |
| --- | --- | --- |
| D.1 | Lawyer Device | User device (104a) enables sign in by lawyer to application. The application may enable the lawyer to indicate they will perform operations, acting in their capacity as the partner role. |
| D.2 | Service Provider | Enable login by lawyer to the service provider platform. |
| D.3 | Client Device | User device (104b) enables sign in by client to application |
| D.4 | Service Provider | Enable login by client to the service provider platform |
| D.5 | Lawyer Device | Receive document from service provider and display document |
| D.6 | Service Provider | Provide document to Lawyer Device for display |
| D.7 | Lawyer Device | Application receives input to share document with Client for signing |
| D.8 | Service Provider | Enables document to be shared with client |
| D.9 | Service Provider | Prompt Client Device to accept the shared document |
| D.10 | Client Device | Response to prompt from D.9 is "No"- Client refuses sharing; terminate process |
| D.11 | Client Device | Response to prompt from D.9 is "Yes"- Document is shared with both Lawyer Device and Client Device |
| D.12 | Lawyer Device | Lawyer Device views and may edit the document |
| D.13 | Client Device | Client Device views and may edit the document |
| D.14 | Service Provider | Enable execution (e.g., signing) of document by one or both parties |
| D.15 | Lawyer Device | Receive input to execute document (e.g., signature of document, via lawyer role cryptographic private key) |
| D.16 | Client Device | Receive input to execute document (e.g., signature of document, via user cryptographic private key) |
| D.17 | Distributed Ledger | Receive transaction request from Service Provider; execute cryptographic calculations, as appropriate, and data objects (e.g., document hash, respective user profile cryptographic keys, role identifier of the lawyer, user identifier of the client, etc.) to the blockchain |

TABLE 2-continued

| Step | Performed By | Description |
|---|---|---|
| D.18 | Service Provider | Receive execution result from the blockchain, confirming that the document was stored to the blockchain; provide result to respective user devices |
| D.19 | Lawyer Device | Present result that confirms successful execution of the agreement (e.g., indicating storage of the document to the blockchain) |
| D.20 | Client Device | Present result that confirms successful execution of the agreement (e.g., indicating storage of the document to the blockchain) |
| D.21 | Process Complete | End Process |

FIGS. 20-24 and 29-31 illustrate example flow diagrams showing processes 2000, 2100, 2200, 2300, 2400, 2900, 3000, and 3100, according to at least a few examples. These processes, and any other processes described herein, are illustrated as logical flow diagrams, each operation of which represents a sequence of operations that can be implemented in hardware, computer instructions, or a combination thereof. In the context of computer instructions, the operations may represent computer-executable instructions stored on one or more non-transitory computer-readable storage media that, when executed by one or more processors, perform the recited operations. Generally, computer-executable instructions include routines, programs, objects, components, data structures and the like that perform particular functions or implement particular data types. The order in which the operations are described is not intended to be construed as a limitation, and any number of the described operations can be combined in any order and/or in parallel to implement the processes.

Additionally, some, any, or all of the processes described herein may be performed under the control of one or more computer systems configured with specific executable instructions and may be implemented as code (e.g., executable instructions, one or more computer programs, or one or more applications) executing collectively on one or more processors, by hardware, or combinations thereof. As noted above, the code may be stored on a non-transitory computer-readable storage medium, for example, in the form of a computer program including a plurality of instructions executable by one or more processors.

Figure 20:
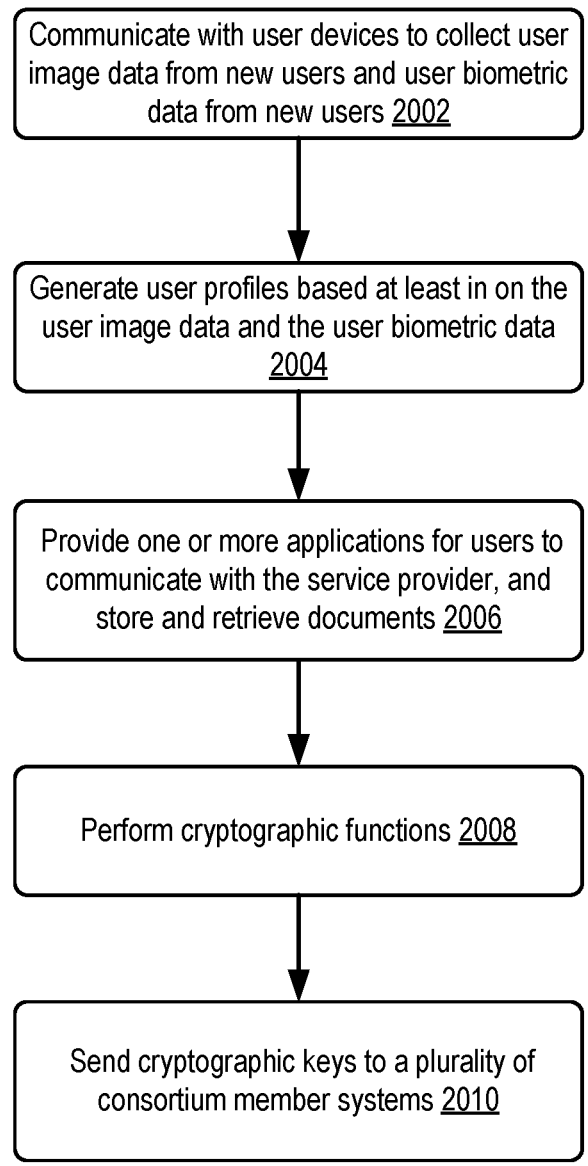
FIG. 20 illustrates a flow diagram showing an example process for using a service provider system to generate and manage unique identities for documents and profiles, according to some embodiments.

FIG. 20 illustrates a flow diagram showing an example process for using a secure storage system of a service provider to generate and manage unique identities for documents and profiles, according to some embodiments. In some embodiments, process 2000 may be performed by the service provider 102 of FIG. 1 in conjunction with an associated blockchain network (e.g., blockchain network 140).

The process 2000 begins at block 2002 by the service provider 102 communicating with user devices to collect user image data (e.g., corresponding to a jurisdictional identifier, such as a passport) from the new users and user biometric data (e.g., a sequence of livestream images showing the user's face moving in different directions over time) from the new users. In some embodiments, one or more operations of block 2002 may be similar to as described in reference to FIG. 5. In some embodiments, block 2002 may be performed by an onboarding system that includes an artificial intelligence module. The onboarding system may be hosted by the service provider 102.

At block 2004, the process 2000 includes the service provider 102 generating user profiles based at least in part on the user image data and the user biometric data. In some embodiments, one or more operations of block 2002 may be similar to as described in reference to FIG. 5. In some embodiments, block 2002 may be performed by the onboarding system.

At block 2006, the process 2000 includes the service provider 102 providing one or more applications for user devices to communicate with the service provider 102, and store and retrieve documents. In some embodiments, block 2006 may be performed by an application system hosted by the service provider 102. In some embodiments, the application system (and/or onboarding system) may receive user credentials from an application of a user device (e.g., email address, username, password, recovery question and answers, etc.). In some embodiments, the user credentials may be operable for generating user cryptographic keys (e.g., including a user private key and public key pair). In some embodiments, the user private key may be operable for performing at least one of: (I) logging on to the service provider 102, or (II) authenticating a user identifier of the user of the user device to execute a particular transaction based at least in part on signing the particular transaction with the user private key.

At block 2008, the process 2000 includes the service provider 102 performing cryptographic functions. In some embodiments, block 2008 may be performed by a cryptographic system hosted by the service provider 102. The cryptographic functions may include hashing data of the user profiles to generate user profile cryptographic keys, hashing data of documents to generate document cryptographic keys, and/or responding to requests from the application system, for example, verifying the authenticity of the user profile cryptographic keys and/or document cryptographic keys.

At block 2010, the process 2000 includes the service provider 102 (e.g., via a consortium member management system) sending at least one of the document cryptographic keys, the user cryptographic keys, or the user profile cryptographic keys to a plurality of consortium member systems of a blockchain network (e.g., the consortium member system 106 that includes a plurality of consortium member systems). In some embodiments, each consortium member system may include a distributed ledger configured to store the cryptographic keys received from the consortium member management system. In some embodiments, the consortium member systems may be associated with a collection of public entities such as governments, courts, municipalities, etc. In some embodiments, the cryptographic system may subsequently verify an association between a particular user profile cryptographic key and a particular document cryptographic key, whereby the association may have previously recorded by (e.g., stored to) the plurality of consortium member systems.

Figure 21:
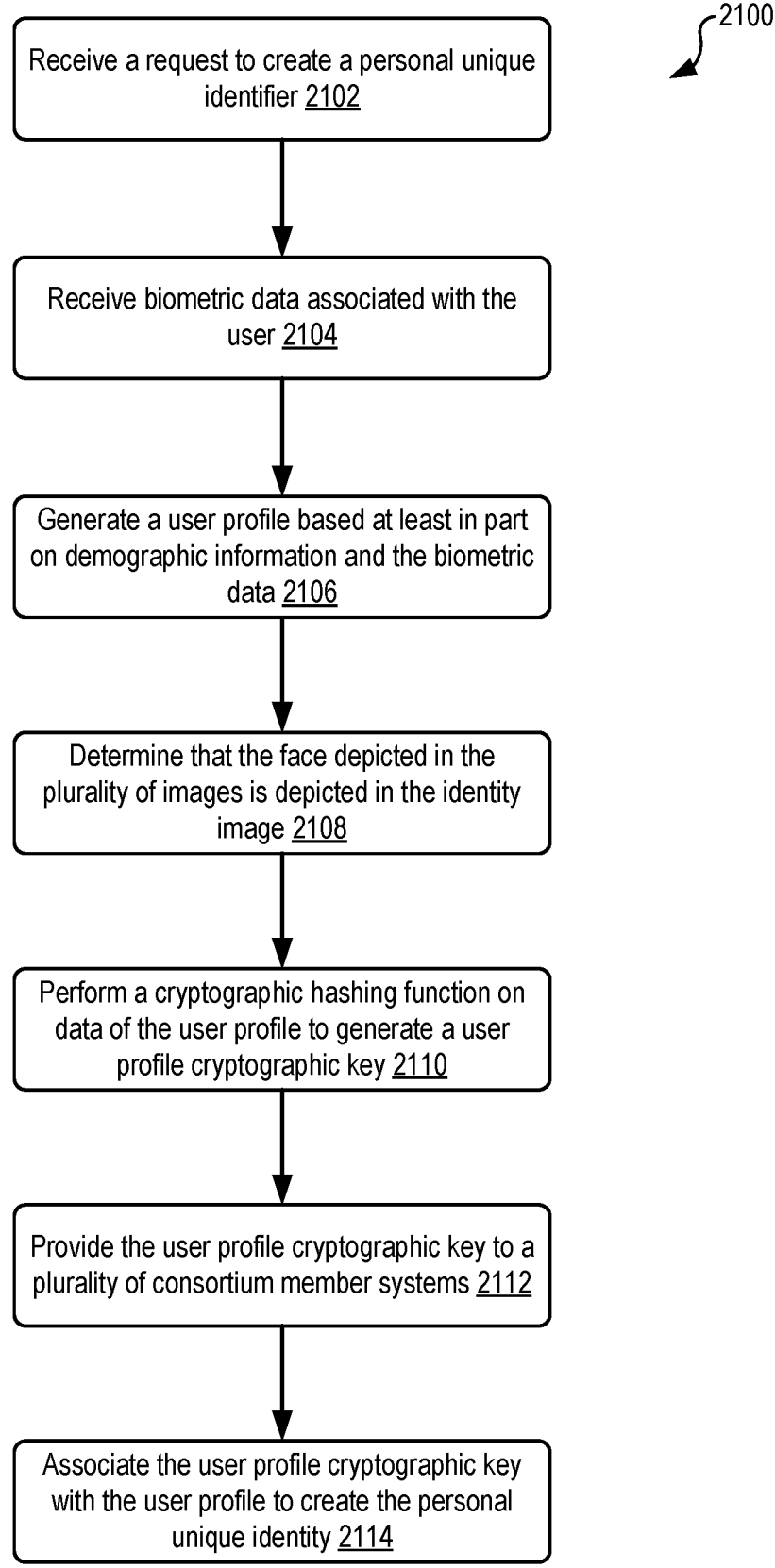
FIG. 21 illustrates a flow diagram showing an example process for onboarding a new user and creating a personal unique user profile for use by a service provider system, according to some embodiments.

FIG. 21 illustrates a flow diagram showing an example process 2100 for onboarding a new user and creating a personal (e.g., unique) user profile for use by a service provider, according to some embodiments. In some embodiments, process 2100 may be performed by service provider 102 of FIG. 1 in conjunction with an associated blockchain network (e.g., blockchain network 140). In some embodiments, one or more operations of process 2100 may be similar to as described in reference to FIG. 5 and/or FIG. 6.

The process 2100 begins at block 2102 by the service provider 102 receiving a request to create a personal unique identity. The request may originate from a user device (e.g., user device 104). The request may be received via a user interface of the user device 104 that is presented in an application running on the user device 104. In some embodiments, the request may be a request to create a new user profile (e.g., including user profile data 508) that be associated with the personal unique identity. In some embodiments, the request may include an identity image (e.g., user image data) associated with an identity document and demographic information associated with the user. For example, the identity image may be from a government-issued ID (e.g., passport, driver's license). The demographic information include address, age, etc. The personal unique identity, once created, enables cryptographic verification of an identity of the user. In some embodiments, one or more cryptographic keys (e.g., user profile cryptographic keys) may be associated with (and/or generated based on) the personal unique identity, as described herein. In some embodiments, these cryptographic keys may enable the user to "sign" documents, attest to documents, access venues, etc.

At block 2104, the process 2100 includes the service provider 102 receiving user biometric data associated with the user. The user biometric data may be sent from the user device. In some embodiments, the biometric data may include at least one of a plurality of images depicting a face of the user. For example, the application on the user device may lead a "liveliness" test to capture the images, which may be in the form of continuous image frames sampled at a suitable rate or non-continuous frames sampled at a predefined slower rate. During the liveliness test, the user may be instructed to change their face by winking, blinking, opening mouth, etc. to demonstrate that the user is indeed active and participating in with the onboarding process.

At block 2106, the process 2100 includes the service provider 102 generating a user profile based at least in part on the demographic information and the user biometric data. This may include generating and storing the demographic data and an image of the user.

At block 2108, the process 2100 includes the service provider 102 determining that the face depicted in the user biometric data (e.g., the plurality of images) is depicted in the user image data (e.g., the identity image). For example, the service provider 102 may utilize an artificial intelligence model to compare the identity image and the plurality of images to confirm that the same person is depicted in all of the images. If this is the case, the service provider 102 may confirm that the user has passed the liveliness test. If not, the test may fail and the user may be informed.

At block 2110, the process 2100 includes the service provider 102 performing a cryptographic hashing function on one or more data objects represented in the user profile to generate a user profile cryptographic key. For example, this may include using the data as input into a blockchain algorithm that hashes the data to generate the user profile cryptographic key, as described in reference to FIG. 5. In some embodiments, the user profile cryptographic key may be a unique representation of the user's identity.

At block 2112, the process 2100 includes the service provider 102 providing the user profile cryptographic key to a plurality of consortium member systems. In some embodiments, each consortium member system may include a distributed ledger configured to store the cryptographic key. The consortium member systems may be a collection of public entities such as governments, courts, municipalities, etc. It should be understood that other suitable data may be generated and provided by the service provider 102 to the plurality of consortium member systems, including, but not limited to, a user cryptographic key (e.g., used to subsequently sign transaction requests on behalf of the user), a user identifier of the user profile, public information about the user, etc.

At block 2114, the process 2100 includes associating the user profile cryptographic key with the user profile to create the personal unique identity. In some embodiments, the user profile may further include and/or be associated with other data objects, as described herein (e.g., a user identifier, a user cryptographic key pair, role cryptographic keys, etc.). In some embodiments, the personal unique identity includes human-readable information relating to the profile and/or the one or more cryptographic keys.

Figure 22:
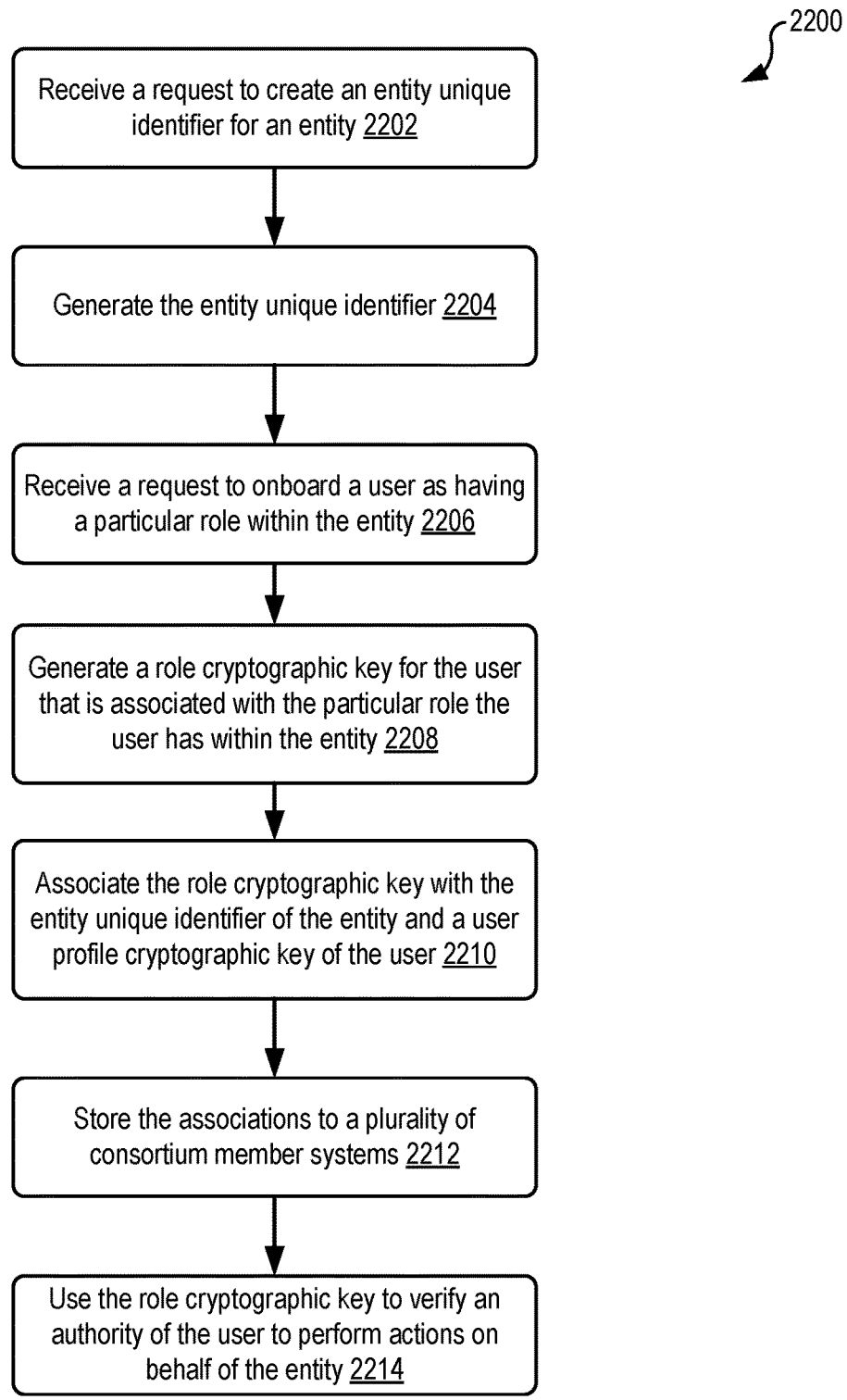
FIG. 22 illustrates a flow diagram showing an example process for onboarding a new entity by a service provider system, according to some embodiments.

FIG. 22 illustrates a flow diagram showing an example process for onboarding a new entity by a service provider system, according to some embodiments. In some embodiments, process 2200 may be performed by the service provider 102 of FIG. 1 in conjunction with an associated blockchain network (e.g., blockchain network 140). In some embodiments, one or more operations of process 2200 may be similar to as described in reference to FIG. 18.

The process 2200 begins at block 2202 by the service provider 102 receiving a request to create an entity unique identifier for an entity (e.g., an organizational entity, such as a corporation, a government branch, non-profit organization, etc.). The request may have been received from a user device operated by an authorized user (e.g., an administrator, president, or other suitable representative agent, etc.) of the entity. In some embodiments, the authorized user may be an already registered user of the service provider 102, as described in reference to FIG. 18. In some embodiments, the authorized user may not be an already registered user. In this case, the authorized user may be onboarded with the service provider 102 as a registered user in association with (e.g., concurrently with) onboarding the new entity. In some embodiments, the request to onboard the new entity may include appropriate documentation (e.g., entity charter documents, articles of incorporation, etc.) and registration information for the entity. In some embodiments, the request may include an identity image associated with an entity document and/or entity identity information associated with at least one entity user (e.g., the authorized user).

At block 2204, the process 2200 includes the service provider 102 generating the entity unique identifier associated with the entity. For example, as described in reference to blocks 1802 and 1804, the service provider 102 may generate an entity identifier (e.g., an organizational entity identifier) that is associated with generation of a new account for the organizational entity. In some embodiments, the entity unique identifier (and/or associated account information of the entity) may be stored to a blockchain network, as described herein.

At block 2206, the process 2200 includes the service provider 102 receiving a request to onboard a user as having a particular role within the entity. In some embodiments, one or more operations of block 2206 may be similar to operations of blocks 1804 and/or 1806 of FIG. 18. For example, the authorized user of block 2202 may have provisioned the particular role (e.g., a role identifier) for the user. In one example, the authorized user may be an administrator of the organization, and the onboarding user may be an employee (e.g., a new treasurer for the organization). In this example, the new employee may onboard with service provider 102 (e.g., using their respective user device), and then, upon verification of the new employee's identity and/or employment information, the service provider 102 may link their account information with the particular role (e.g., within the organization) that was provisioned by the administrator. In some embodiments, the new employee may create a new account, and then request to be authorized has having a particular role. In this example, the administrator may provision and/or approve a new role for this user upon receiving the request.

At block 2208, the process 2200 includes the service provider 102 generating a role cryptographic key for the user that is associated with the particular role the user has within the entity. For example, as described in reference to block 1804 of FIG. 18, the service provider 102 may provision (e.g., generate) a smartcard 1815 for the user, which may include a role cryptographic key associated with the role identifier for the user within the organizational entity. In some embodiments, the role cryptographic key (and/or smartcard) may be stored via suitable mechanism (e.g., within a digital wallet on the user device of the user). In some embodiments, the wallet, smartcard, and/or role cryptographic key may be encrypted (e.g., decryptable via a username/password of the user), enabling enhanced security. In some embodiments, the role cryptographic key may correspond to a pair of public and private keys, whereby the role cryptographic private key may be stored to the user device wallet (e.g., within the smartcard), and the role cryptographic public key may be stored by the service provider 102.

At block 2210, the process 2200 includes the service provider 102 associating the role cryptographic key with the entity unique identifier of the entity and/or a user profile cryptographic key of the user. For example, as described in reference to block 1804 of FIG. 18, one or more data objects may be associated with each other. The entity unique identifier (e.g., the organizational entity identifier) may be associated with a role identifier of the user within the organization. In some embodiments, the role identifier may further be associated with one or more role cryptographic keys (e.g., of respective smartcards). In some embodiments, the role identifier may further be associated with the user profile cryptographic key, which is associated with the personal unique identity of the user.

At block 2212, the process 2200 includes the service provider 102 storing the associations to a plurality of consortium member systems of a blockchain network. In some embodiments, as described in reference to block 1806, the one or more associations may be stored to the blockchain network. In this way, the blockchain network may register the role of the user with the organization (e.g., and associated role cryptographic keys) so that subsequent transactions may be performed in association with the role identifier (e.g., president, treasurer, etc.) of the user within the organizational entity.

At block 2214, the process 2200 includes the service provider 102 using the role cryptographic key to verify an authority of the user to perform actions on behalf of the entity. In some embodiments, this may be similar to as described in reference to FIGS. 18 and/or 19. For example, in the case where the user is a partner at a law firm and is signing a document on behalf of the law firm, the user may invoke a transaction request to the blockchain by signing with a role cryptographic private key (e.g., of a smartcard that is provisioned to the user) associated with the role identifier of the lawyer. A smart contract may then verify the signature of the transaction request. In some embodiments, the smart contract may execute the transaction in part by associating the document with the user profile cryptographic key of the lawyer (e.g., the personal unique identity of the user), the user identifier of the user, and/or any suitable user information.

Figure 23:
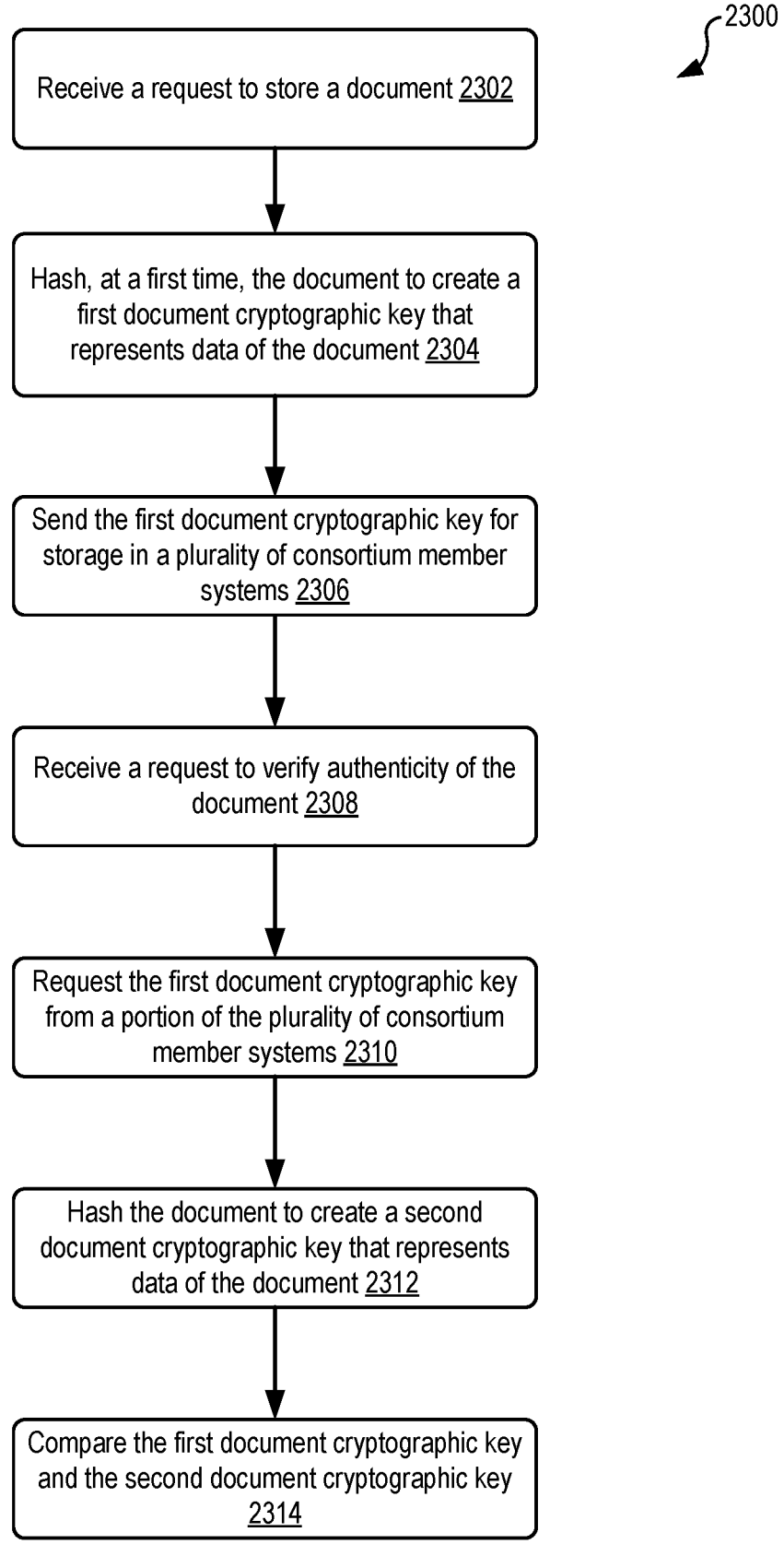
FIG. 23 illustrates a flow diagram showing an example process for a service provider system storing a document and then subsequently verifying an authenticity of the document, according to some embodiments.

FIG. 23 illustrates a flow diagram showing an example process for a service provider system storing a document and then subsequently verifying an authenticity of the document, according to some embodiments. In some embodiments, process 2300 may be performed by service provider 102 in conjunction with an associated blockchain network (e.g., blockchain network 140). In some embodiments, operations of process 2300 may be similar to as described in reference to FIGS. 14 and/or 15.

The process 2300 begins at block 2302, whereby the service provider receives a request to store a file (e.g., a document). For example, a user device may log in, verify the identity of a user with the service provider. The user device may then transmit a request to store the document.

At block 2304, the service provider hashes, at a first time, the document to create a first document cryptographic key that represents data of the document. In some embodiments, the first document cryptographic key may be similar to hash 1414 of FIG. 14.

At block 2306, the service provider sends the first document cryptographic key for storage in a plurality of consortium member systems. In some embodiments, the stored first document cryptographic key may be similar to document hash 1416 of FIG. 14. It should be understood that the stored key may be stored in association with other data objects (e.g., a user profile cryptographic key, associated with the identity of the user).

At block 2308, the service provider receives a request (e.g., a second request) to verify authenticity of the document. In some embodiments, this request may be received at a later (second) time. In some embodiments, this request may be associated with verifying that the document is the same as the one previously stored at the first time. In some embodiments, this request may also (and/or alternatively) be associated with verifying an owner/author of the original document (see. FIG. 16). In some embodiments, the user device may or may not be required to log in and/or verify the user's identity to transmit this request, depending on the context for the request.

At block 2310, the service provider requests the first document cryptographic key from a portion of the plurality of consortium member systems. For example, the service provider may perform a look up using the first document cryptographic key.

At block 2312, the service provider hashes the document to create a second document cryptographic key that represents data of the document.

At block 2314, the service provider compares the first document cryptographic key and the second document cryptographic key to determine if they match (e.g., via a bit-wise comparison). If there is a match, then the service provider may return a result to the requesting user device, indicating that the provided document is the same as the one previously stored (e.g., an authentic document). In some embodiments, the request may have come from the same or different entity that desires to determine the authenticity of the file.

Figure 24:
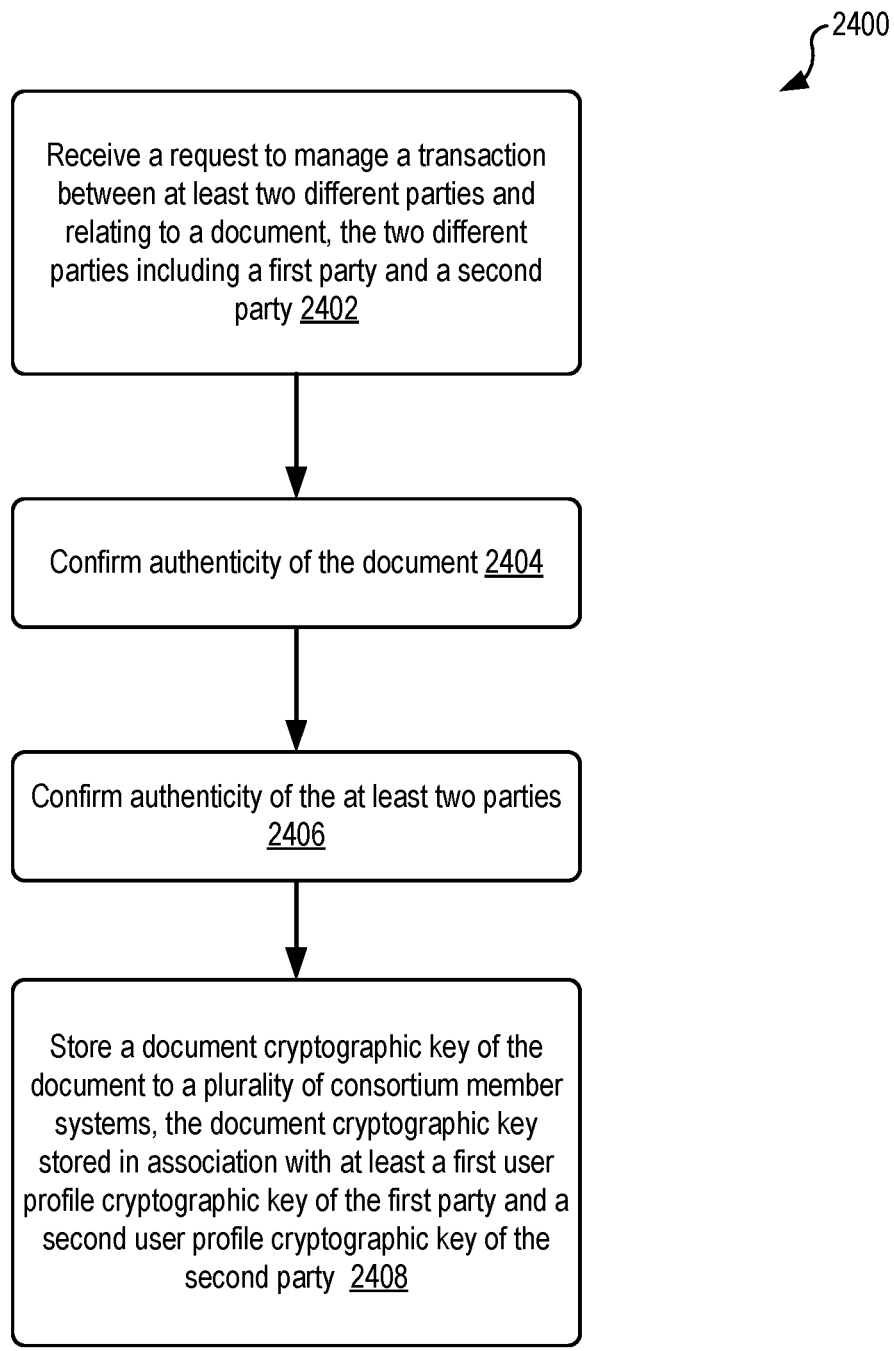
FIG. 24 illustrates a flow diagram showing an example process for a service provider system facilitating a transaction involving a plurality of parties, according to some embodiments.

FIG. 24 illustrates a flow diagram showing an example process for a service provider system facilitating a transaction involving a plurality of parties, according to some embodiments. In some embodiments, process 2400 may be performed by service provider 102 in conjunction with an associated blockchain network (e.g., blockchain network 140). In some embodiments, one or more operations of process 2400 may be similar to FIG. 17 and/or FIG. 19.

At block 2402, the service provider may receive a request to manage a transaction between at least two different parties and relating to a document, whereby the two different parties include a first party/entity and a second party/entity. In some embodiments, the document may have been previously associated with a document cryptographic key (e.g., a hash of the document), for example, which may have been previously stored to a plurality of consortium member systems of a blockchain network. In some embodiments, the first party may be associated with a first user profile cryptographic key and the second party may be associated with a second user profile cryptographic key.

At block 2404, the service provider confirms authenticity of the document. For example, the service provider may retrieve the document cryptographic key from the blockchain network, for example, using a unique document identifier (e.g., which may be stored as public information) to search for the document. In some embodiments, the document cryptographic key may also be stored directly to the service provider. In any case, the service provider may generate a hash of the document to create a document authentication cryptographic key. The service provider may compare the document cryptographic key with the document authentication cryptographic key, and verify that they match. In some embodiments, block 2404 may be optionally performed, for example, if the document is an original and/or both parties have previously attested to the authenticity of the document.

At block 2406, the service provider confirms the authenticity of the at least two parties to the transaction. In some embodiments, this may include confirming the identity of the two parties. In some embodiments, confirming authenticity may include obtaining user profile cryptographic keys for the respective parties, which may correspond to unique identity information for each party, as described herein. For example, a user device of the first party may have stored a first user profile cryptographic key that was generated during onboarding, and similar for the second party. In some embodiments, these keys may be provided to the service provider and used to verify the identity of the parties. In some embodiments, each party may be prompted to verify their identity by providing user biometric data (e.g., a fingerprint, a sequence of image from a liveliness test, etc.), which may be used to compare against previous biometric data stored for the user. For example, a multidimensional vector of a party's face may be previously stored during onboarding, whereby another vector may be generated at block 2406, and then used to compare with the previously stored vector. In some embodiments, any suitable one or more verification techniques may be used to confirm the authenticity of the parties. In some embodiments, identification information (e.g., user profile cryptographic keys, face vectors, etc.) may have been previously stored to the blockchain. In some embodiments, this information may be updated over time. For example, a user may enter credentials, which may be used to access a user private key of the user. The user private key may be used to execute a smart contract to update one or more data objects of the user profile.

At block 2408, the service provider stores a document cryptographic key of the document to a plurality of consortium member systems. In some embodiments, the document cryptographic key is stored in association with at least the first user profile cryptographic key of the first party and the second user profile cryptographic key of the second party. In some embodiments, this may be similar to as described in reference to FIG. 17. In some embodiments, any suitable information may be stored in association with the transaction execution. For example, in some embodiments, a hash (e.g., an overall hash) may be generated of one or more of the associated cryptographic keys for a transaction. In some embodiments, the stored information may be stored to a distributed ledger of a consortium member system.

Figure 25:
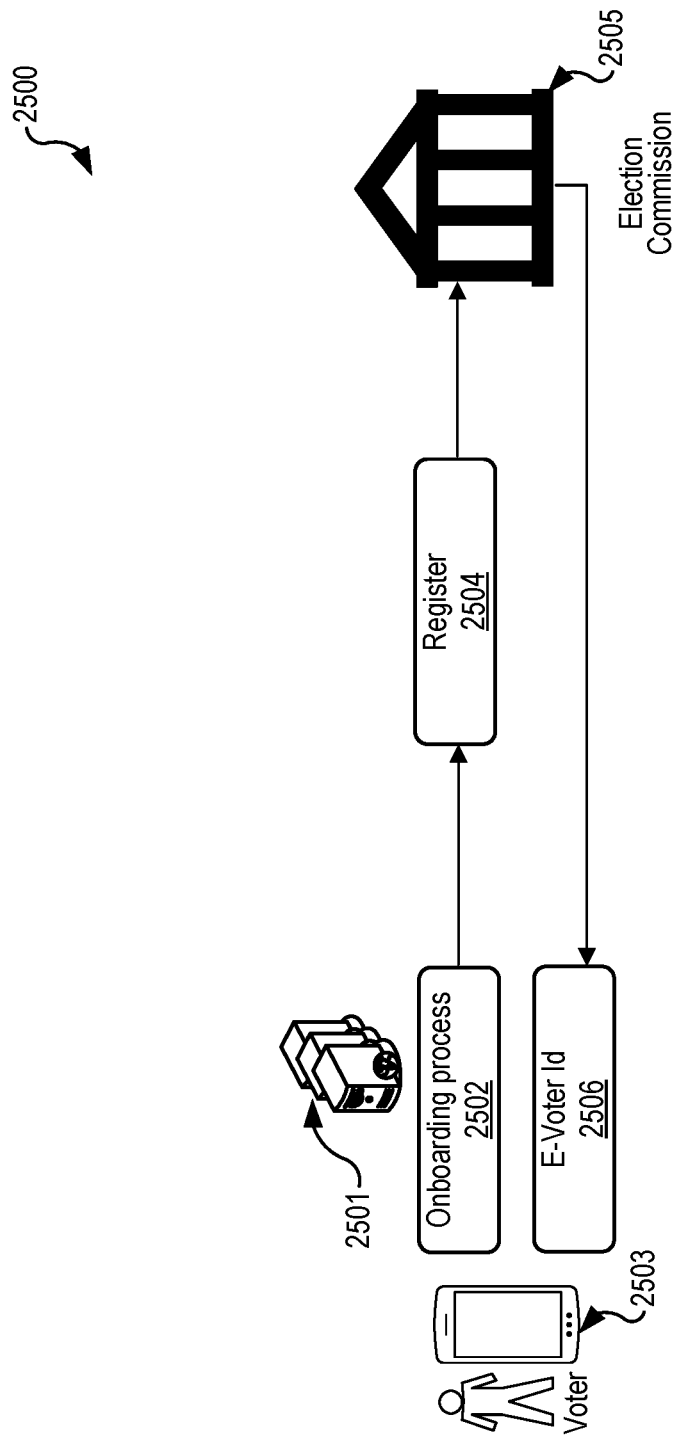
FIG. 25 illustrates a technique for a service provider system facilitating voter registration with an election commission entity, according to some embodiments.

FIG. 25 illustrates a technique for a service provider system facilitating voter registration with an election commission entity, according to some embodiments. In diagram 2500 of FIG. 25, several elements are depicted, including a user device 2503, a service provider 2501 (e.g., similar to service provider 102), and an election commission 2505. In some embodiments, the election commission 2505 may correspond to a computing system of an organizational entity (e.g., a government agency/body) that may be responsible for administering elections. In some embodiments, the election commission 2505 may be affiliated with the service provider 2501 (e.g., as mutually trusted entities).

In some embodiments, a user device 2503 may receive input to onboard a user (e.g., a voter) with the service provider 2501. In some embodiments, the user device 2503 may engage in an onboarding process 2502 with the service provider 2501. In some embodiments, this may be similar to as described with respect to FIG. 5 (e.g., conducting a liveliness test, uploading user image data, etc.) and/or FIG. 6. For example, the voter may confirm their identity with the service provider 2501 during this onboarding process. In some embodiments the service provider 2501 (e.g., via the voting management system 113) may facilitate a registration process 2504 with the election commission 2505, whereby the election commission 2505 verifies that the user is authorized to receive a voter identifier 2506 (e.g., an "E-voter ID"). For example, service provider 2503 may obtain a user profile cryptographic key (e.g., from the user device 2503) that confirms the identity of the user. The election commission 2505 may verify this information, for example, by querying a blockchain network (e.g., consortium member system 106), to which the user profile cryptographic key is previously stored. In some embodiments, the election commission 2505 may be a member of the consortium member system 106, and/or otherwise affiliated with the service provider 102. Upon verification of the identity of the user during the registration process 2504, the election commission 2505 may further verify other information about the user (e.g., demographics information, such as age, place of residence, qualifications, etc.). Upon completion of the registration process 2504, the election commission 2505 may generate the voter identifier 2506 for the user. In some embodiments, the voter identifier 2506 may be stored in association with other user information (e.g., the user profile cryptographic key and/or other cryptographic keys), a user identifier for the user's account with the service provider 2502, etc. In some embodiments, the voter identifier 2506 may be stored at any suitable location (e.g., the user device 2503, the service provider 2501, the election commission 2505, and/or the blockchain network). In some embodiments, the voter identifier 2506 may itself correspond to a cryptographic key (e.g., a hash of voter registration information of the user that is provided to the election commission). In some embodiments, the voter identifier 2506 may be tied to a specific election (e.g., have geographic, temporal, and/or spatial limitations).

Figure 26:
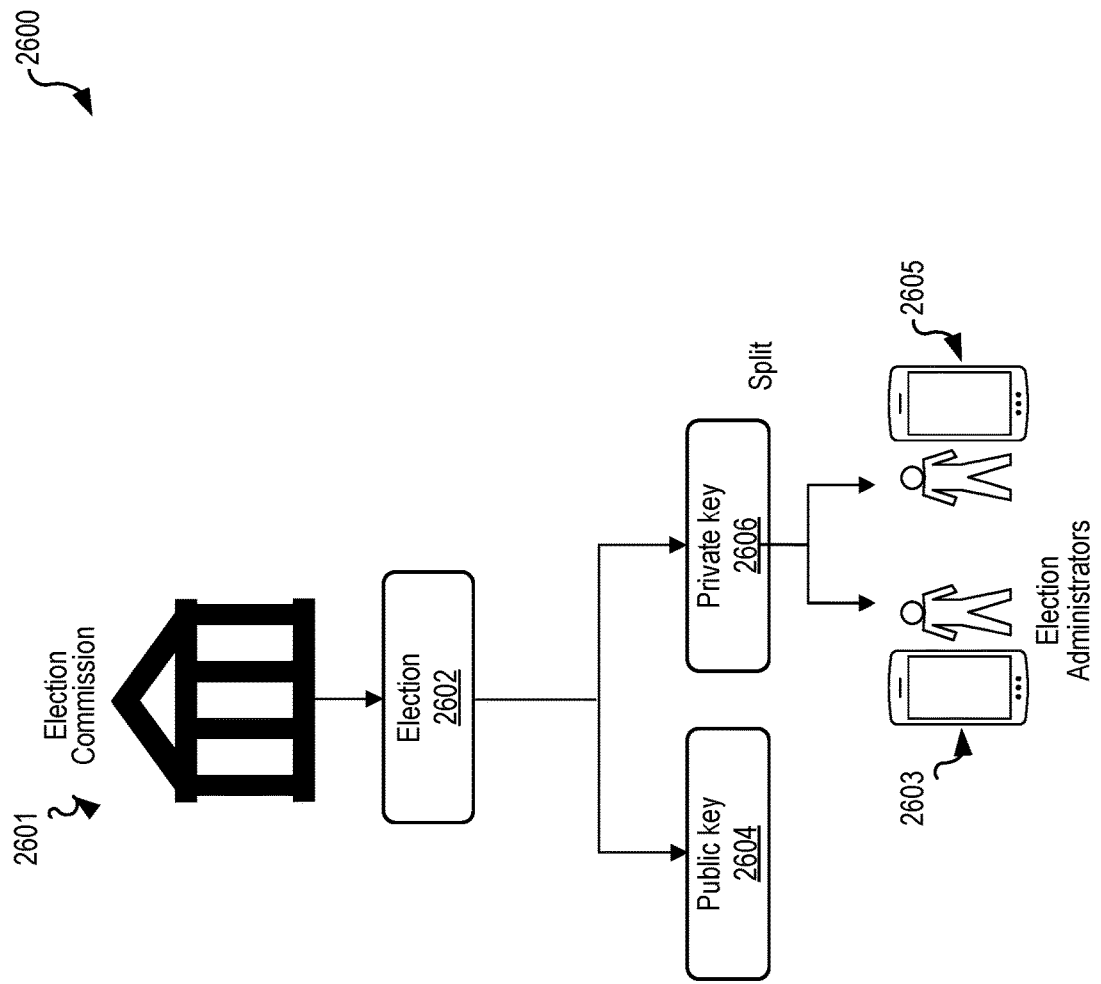
FIG. 26 illustrates a technique for provisioning keys for use in facilitating an election, according to some embodiments.

FIG. 26 illustrates a technique for provisioning keys for use in facilitating an election, according to some embodiments. In diagram 2600 of FIG. 26, several elements are depicted, including a plurality of representative user devices 2603, 2605 (for election administrators of a particular election) and an election commission 2601. In some embodiments, the election commission 2601 may similar to election commission 2505 of FIG. 25.

In some embodiments, the election commission 2601 may determine to conduct an election 2602 process. In some embodiments, the election 2602 may be associated with a set of rules for the election. For example, the rules may indicate who is allowed to vote in the election, who are the candidates, what day(s) the voting process will be conducted, etc. Any suitable rules/criteria may be used to define the terms of the election 2602. In some embodiments, the rules for conducting the election may be stored to a blockchain network, as described herein. For example, the rules may be codified such that they may be enforced via a smart contract. In some embodiments, as part of determining the rules for the election 2602, the election commission 2601 may determine a pair of cryptographic keys, including a public key 2604 and a private key 2606. In some embodiments, the cryptographic keys may be associated with the particular election. In some embodiments, the public key 2604 may be provisioned to each eligible voter. For example, the election commission 2601 may determine which voter identifiers (e.g., including voter identifier 2506) qualify and/or are registered to vote in the election, and then may distribute the public key 2604 to those user devices associated with the voter identifier. In some embodiments, the public key 2604 may be stored within a wallet on the voter's user device, similar to as described herein. For example, the wallet may itself be secured (e.g., encrypted), and may store other cryptographic keys and/or smartcards associated with the user (e.g., role cryptographic keys, a user cryptographic private key, a user profile cryptographic key, etc.).

In some embodiments, the private key 2606 may be further split into multiple components, whereby each component may be provisioned to a particular user device of an associated election administrator/official. In some embodiments, as part of the rules for the election 2602, the election commission 2601 may determine the number and identities of election administrators who administer the election. In some embodiments, the rules may further determine rules for conducting a multi-signature (a "multisig") process, whereby a certain a number (e.g., and/or a percentage, less than or equal to 100%) of private key 2606 components (e.g., received from respective administrator user devices) may be required in order to begin the process of conducting the election. In some embodiments, the multi-signature process may utilize any suitable algorithm for combining key parts to determine the re-combined private key 2606. In some embodiments, this may be desirable when certain election administrators are unavailable. Accordingly, for example, suppose that the rules for a particular election stipulate that 7 out of 10 private key components are required to begin the election process (e.g., via execution of one or more smart contracts). If at least 7 of the 10 appointed election administrators provide their respective component key parts to re-combine a sufficient portion of the private key 2606, the smart contract may be executed to begin tallying election results.

Figure 27:
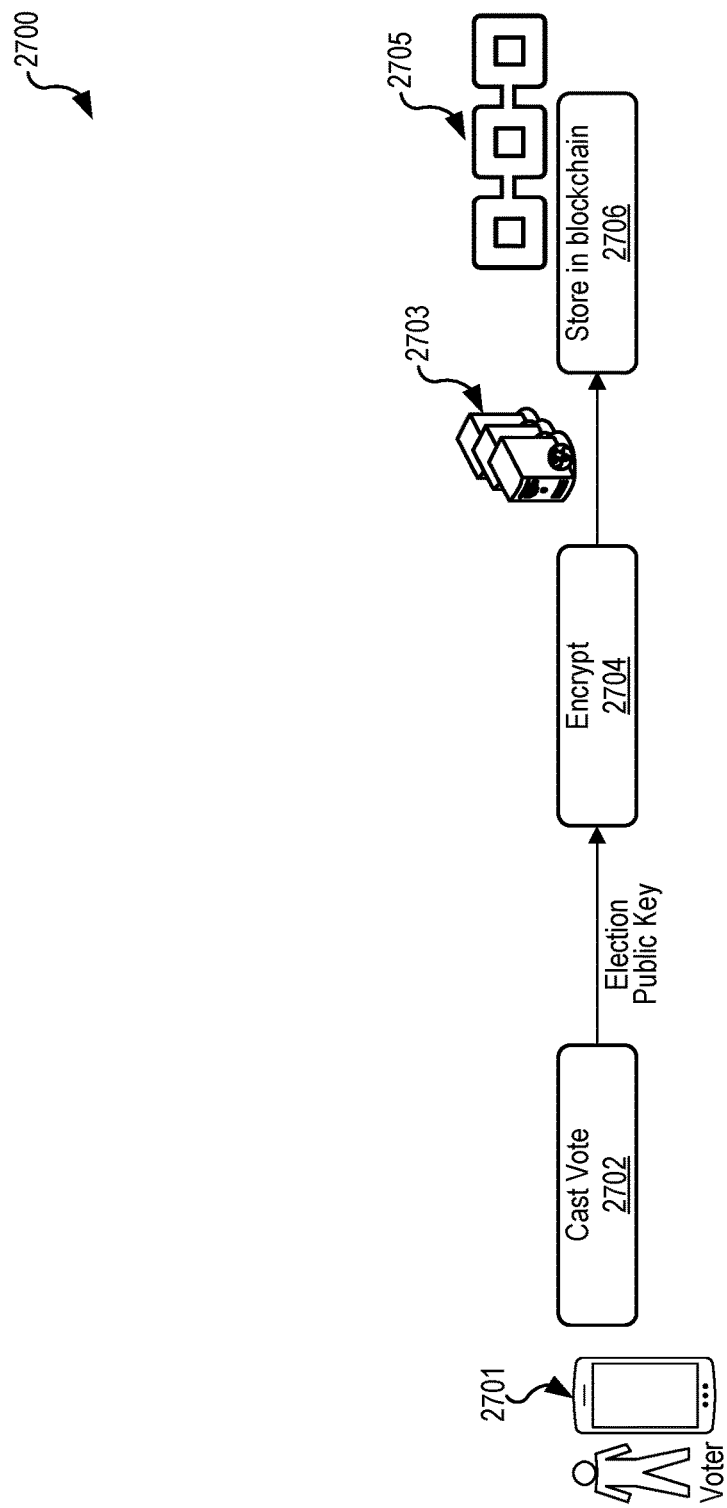
FIG. 27 illustrates a technique for casting a vote in an election by utilizing a previously provisioning key, according to some embodiments.

FIG. 27 illustrates a technique for casting a vote in an election by utilizing a previously provisioning key, according to some embodiments. In diagram 2700 of FIG. 27, several elements are depicted, including a voter's user device 2701, a service provider 2703 (e.g., service provider 102), and a blockchain network 2705. In some embodiments, the blockchain network 2705 may be affiliated with an election commission and/or the service provider 2703, as described herein.

In some embodiments, to facilitate casting a vote for a particular election (e.g., election 2602 of FIG. 26), the user device 2701 may launch an application to facilitate a vote casting process 2702. For example, the user device 2701 may log-in (e.g., similar to as described herein, verifying the user's identity and/or credentials) and may receive a selection of a particular option of a set of options (e.g., a particular candidate). The user device 2701 may then encrypt 2704 (e.g., sign) the vote using the election public key (e.g., public key 2604) that was previously provisioned to the user device 2701 for use in voting in the particular election. It should be understood that user device 2701 may be one of a plurality of user devices that may respectively receive a vote input to be cast in the election. Each vote transmitted by a user device may be signed using the public key 2604. In some embodiments, the service provider 2703 may facilitate receiving the signed votes, and subsequently executing process 2706 to store the votes in the blockchain 2705 (e.g., for subsequent tallying via a smart contract). For example, the votes may be stored to the ledger of a consortium member system, as described herein. In some embodiments, the transaction request to vote may be signed with the user private key.

In some embodiments, a user device may facilitate casting a vote at any suitable location. For example, as described above, user device 2701 may directly transmit a signed vote to a service provider 2703. This process may be performed at any suitable location (e.g., at home, at work, etc.). In some embodiments, the user device 2701 may be used to cast a vote at an approved location, for example at a kiosk that is located in a voting booth. For example, the user device 2701 may display a Quick Response (QR) code on the screen, whereby the kiosk may scan the QR code, and thus the user's identity may be verified. For example, in some embodiments, the QR code may be associated with the voter identifier, the user profile cryptographic key, and/or the public key that is provisioned to the user device 2701. It should be understood that any suitable one or more devices and/or combinations thereof may be used to facilitate casting a vote. In some embodiments, even though the service provider 2703 may receive the signed vote, the service provider 2703 may not be able to determine which option a particular voter voted for. This may due in part to the service provider 2703 not obtaining access to the private key for the election (e.g., 2606), and thus, not being able to decrypt the vote.

Figure 28:
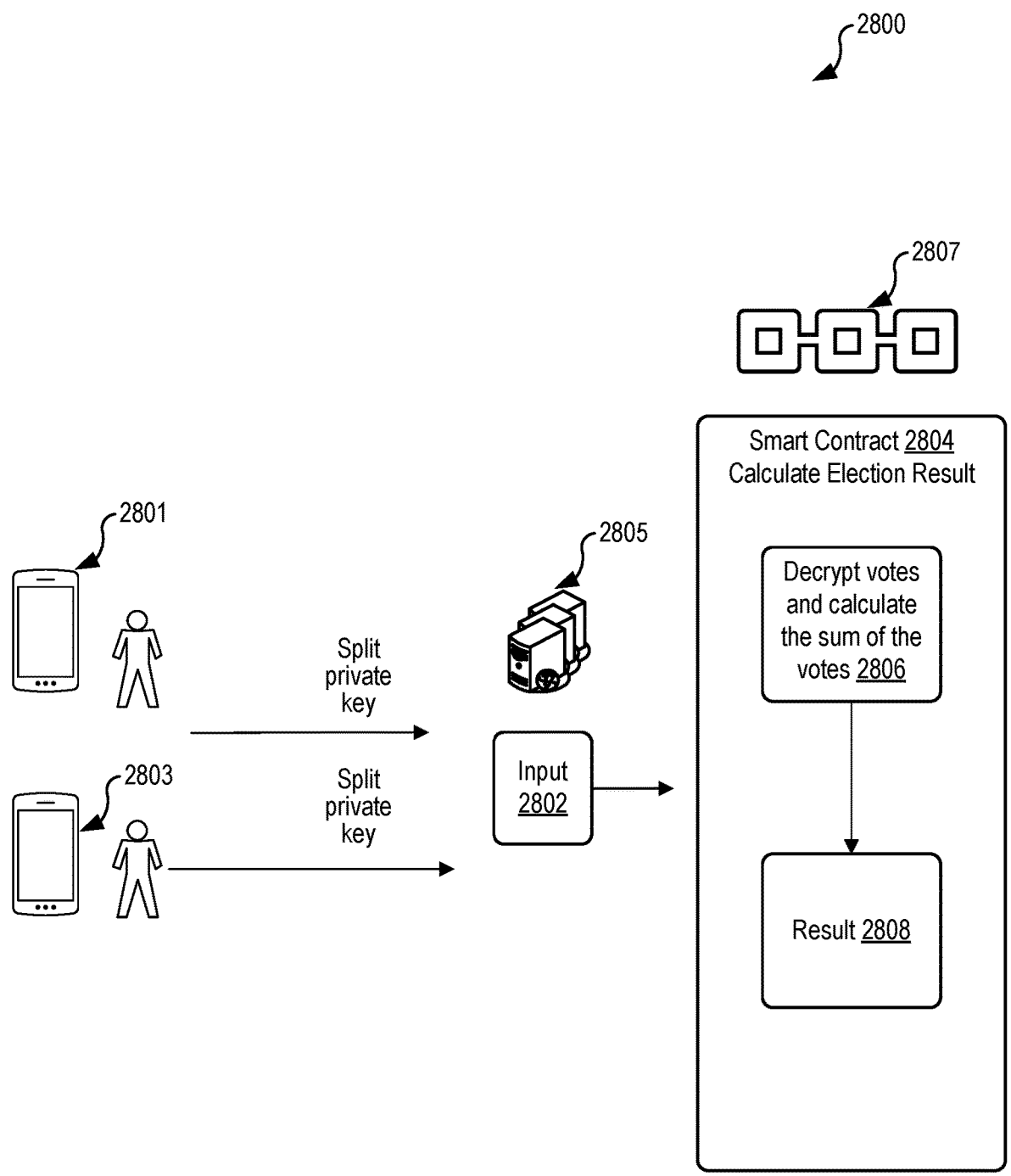
FIG. 28 illustrates a technique conducting an election via a blockchain network, according to some embodiments.

FIG. 28 illustrates a technique for a service provider system to facilitate conducting an election via a blockchain network, according to some embodiments. In diagram 2800 of FIG. 28, several elements are depicted, including representative user device 2801 and user device 2803 (e.g., respectively associated with an election administrator for an election), a service provider 2805 (e.g., service provider 102), and a blockchain network 2807.

In some embodiments, to authorize an election tallying process to begin (e.g., for determining the results of the election), a sufficient number of election administrators may transmit, via their respective user devices, a private key component (e.g., a fragment of private key 2606) to the service provider 2805. In some embodiments, these key components themselves may be encrypted, whereby the service provider 2805 may not be able to determine the key components. For example, the key components may be encrypted with a key that is unknown to the service provider 2805, and known by the smart contract 2804. The service provider 2805 may then execute a process 2802 to transmit the key components to the blockchain network 2807. In some embodiments, this process 2802 may happen independently of when the encrypted votes are actually received (e.g., see FIG. 27). For example, the votes may have already been cast, and now the election administrators are ready to compile the results for the election. Accordingly, at least a sufficient number of administrators submit their private key fragment, whereby a smart contract 2804 receives and re-combines the private key fragments. Assuming that a sufficient number of fragments are received, the smart contract 2804 determines that the election results may proceed with being determined.

Accordingly, the smart contract 2804 may execute a function 2806 to retrieve and decrypt each signed vote (e.g., which was signed using the election public key) using the election private key. In some embodiments, for each vote, the smart contract 2804 may further retrieve the user public key associated with the transaction request for the vote, and use that to verify the transaction request that was signed using the user private key. In some embodiments, the smart contract 2804 may verify that the particular user's voter identifier (e.g., which may be associated with the user public key) is authorized to vote in this election. In any case, upon verifying the user's eligibility to vote and the decrypting the vote itself, the smart contract 2804 may then include the vote in the overall vote tally. For example, the smart contract 2804 may calculate the sum of the authenticated votes and then determine a result 2808 of the election. The result 2808 may be returned to the election administrators and/or the election commission that sponsored the election. It should be understood that, in some embodiments, a user device (e.g., an election administrator's device) may directly transmit information to a blockchain network (e.g., blockchain network 2807). For example, in some embodiments, the election administrators may directly transmit the private key fragments for input to the smart contract 2804. In some embodiments, because the decryption of the votes happens only within the execution of the smart contract 2804, vote information may remain secure (e.g., confidential and/or anonymous).

Figure 29:
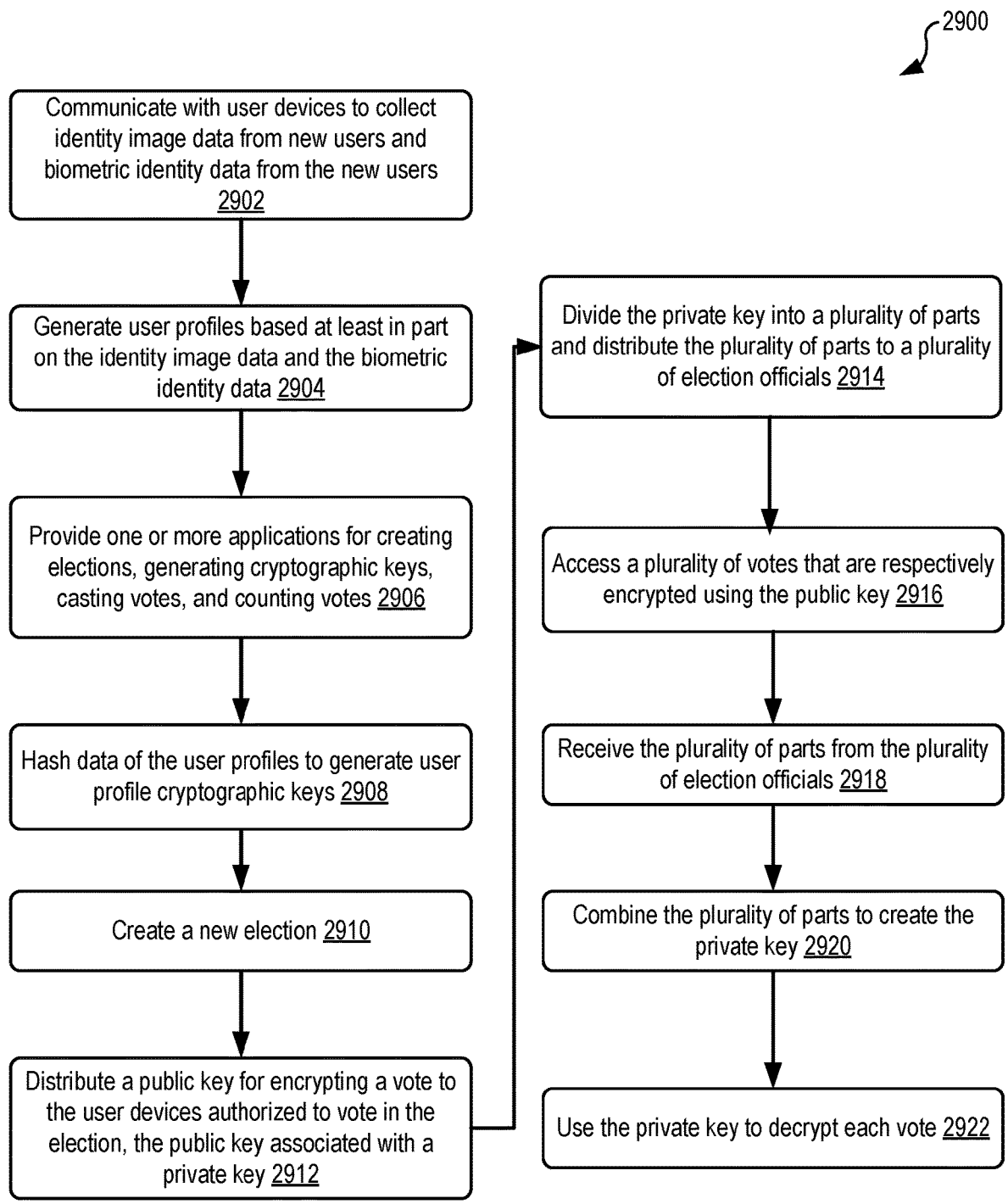
FIG. 29 illustrates a flow diagram showing an example process for conducting an election, according to some embodiments.

FIG. 29 illustrates a flow diagram showing an example process for a service provider (e.g., service provider 102) facilitating a secure election, according to some embodiments. In some embodiments, the service provider 102 may be affiliated with (and/or include) one or more entities (e.g., an election commission, a blockchain network, user devices, etc.), as described herein. In some embodiments, the service provider 102 may facilitate the execution of the election based in part on interactions with these entities.

The process 2900 begins at block 2902 by the service provider 102 communicating with user devices to collect user image data from new users and user biometric data from the new users. In some embodiments, block 2902 may be performed by an onboarding system that includes an artificial intelligence module. The onboarding system may be hosted by the service provider 102, as described herein.

At block 2904, the process 2900 includes the service provider 102 generating user profiles based at least in part on the user image data and the user biometric data. In some embodiments, block 2904 may be performed by the onboarding system. In some embodiments, the user profiles may include voter profiles, election official (e.g., election administrator) profiles, and/or candidate profiles. Thus, each user who participates in the voting platform may have their own unique profile.

At block 2906, the process 2900 includes the service provider 102 providing one or more applications for users to communicate with the service provider 102, for creating elections, generating cryptographic keys, casting votes, and counting votes, and the like. In some embodiments, block 2906 may be performed by an application system hosted by the service provider 102. In some embodiments, the applications may include web applications, desktop applications, mobile applications, and the like.

At block 2908, the process 2900 includes the service provider 102 hashing data of the user profiles to generate user profile cryptographic keys. In some embodiments, block 2908 may be performed by a cryptographic system hosted by the service provider 102. For a user (e.g., voter, candidate, election administrator) profile, the user profile cryptographic key may uniquely and securely identify the identity of a user associated with the user profile.

At block 2910, the process 2900 includes the service provider 102 creating a new election. In some embodiments, block 2910 may be performed by a voter management system hosted by the service provider. In some embodiments, the service provider 102 may create the new election on behalf of and/or in conjunction with an election commission. In some embodiments, the election commission perform one or more operations of block 2910, for example, determining the rules for the election, as described herein. In some embodiments, the rules may be codified at least in part within a smart contract of a blockchain network, as described herein. In some embodiments, the service provider 102 may provide options (e.g., candidate options) for selection by a user device based in part on the rules of the election. In some embodiments, the voting management system 113 of the service provider 102 may perform one or more of these operations. In some embodiments, one or more operations of block 2910 may be similar to as described in reference to FIG. 26.

At block 2912, the process 2900 includes distributing a public key, operable for encrypting a vote, to the user devices authorized to vote in the election, whereby the public key is associated with a private key counterpart. In some embodiments, the election commission and/or service provider 102 may perform one or more operations of block 2912. In some embodiments, the service provider 102 may facilitate the provisioning of public keys to the user devices. For example, a user device may have participated in an onboarding process. During the onboarding process, the user identity of the user that is associated with the user device may be verified. The user device may subsequently participate in a voter registration process, whereby the user device receives a voter identifier upon successful voter registration. In some embodiments, the voter registration process (e.g., with the election commission and/or the service provider 102) may include authenticating the user's identity from the onboarding process (e.g., via the user profile cryptographic key). In some embodiments, the public key may be distributed based in part upon confirming the user identity (e.g., the user profile cryptographic key), the voter identifier, and/or any suitable information about the user. In some embodiments, the public/private keys may be generated by the service provider 102, for example, if the service provider 102 is authorized to conduct operations on behalf of the election commission. In some embodiments, the service provider 102 may not generate the public/private keys. In some embodiments, the election commission may generate the public/private keys for distribution to user devices via a separate channel. In some embodiments, one or more operations of block 2912 may be similar to as described in reference to FIG. 25 and/or FIG. 26.

At block 2914, the process 2900 includes dividing the private key (e.g., the counterpart to the public key of block 2912) into a plurality of parts (e.g., components/fragments) and distribute the plurality of parts to respective user devices of a plurality of election officials/administrators. In some embodiments, this may be performed by any suitable entity. For example, the voter management system, hosted by the service provider, may perform operations of block 2914 on behalf of the election commission. In some embodiments, the election commission may directly perform this step (e.g., via a separate channel). Dividing the private key may including providing each election administrator a fragment (e.g., a sequence of bits that compose a portion of the private key) and sharing the respective fragment with each user device of the election administrators. In some embodiments, the key fragment may be determined such that a portion of the total key fragments may be later re-constituted to be used for conducting the election, as described herein. In some embodiments, one or more operations of block 29145 may be performed according to any suitable multi-signature algorithm. In some embodiments, one or more operations of block 2914 may be similar to as described in reference to FIG. 26.

At block 2916, the process 2900 includes accessing a plurality of votes. In some embodiments, this may be performed by the voter management system hosted by the service provider 102. Accessing the plurality of votes may include obtaining the votes from a plurality of user devices. As described herein, each vote may have been encrypted using the public key that was distributed at block 2912. In some embodiments, the vote may include information identifying a particular candidate of the plurality of candidates. In some embodiments, the vote may (or may not) be associated with a voter identifier and/or a user profile cryptographic key of the user who cast the vote. Thus, in some embodiments, the vote may identify the person who cast the vote and the candidate selected. In some embodiments, because the vote may be signed (e.g., encrypted) by the public key, the information that associates a particular voter with the candidate the voted for may be confidential (e.g., unknown to the service provider 102 or other parties). In some embodiments, a transaction request from the user device that includes the vote may be signed with a cryptographic key of the user (e.g., a user private key). In some embodiments, one or more operations of block 2916 may be similar to as described in reference to FIG. 27.

At block 2918, the process 2900 includes receiving the plurality of parts (e.g., private key fragments) from the respective user devices of the plurality of election administrators. In some embodiments, this may be performed by the voter management system hosted by the service provider 102. In this case, the service provider 102 may transmit the plurality of parts to the blockchain network upon receiving the plurality of parts. In some embodiments, block 2918 may be performed by the election commission or directly by the blockchain network that stores the smart contract that encapsulates the rules/code for operating the election. In some embodiments, as described herein, the plurality of parts may be required to be a certain percentage (e.g., 80%, 70%, etc.) of the length of the private key in order for the smart contract to begin operations to conduct the election (e.g., tallying votes to determine a winner), in accordance with the multi-signature algorithm being used by the smart contract.

At block 2920, the process 2900 includes combining the plurality of parts to create the private encryption keys. In some embodiments, this step may be performed by the blockchain network, as described in reference to FIG. 28. In some embodiments, this may be performed by the voter management system hosted of the service provider 102, for example, if the service provider 102 is a trusted entity for managing the election. In some embodiments, the plurality of parts may be received from applications running on user devices of the election administrators.

At block 2922, the process 2900 includes using the private encryption key (e.g., a sufficient recombined private key portion) to decrypt each vote and tally the votes. In some embodiments, this may be performed by the smart contract executing on each member system of the blockchain network. For example, as described in reference to FIG. 28, in some embodiments, the smart contract may decrypt a vote (e.g., which is encrypted using the election public key) using the election private key that was recombined. Upon decrypting the vote, the smart contract may add the vote to the total tally. In some embodiments, the smart contract may further verify a signature of the transaction request associated with the vote. For example, the transaction request may be signed with the user private key, which may be associated with the voter identifier for the user. In this case, the smart contract may use the user public key to verify the transaction request, and/or further verify that this voter identifier is authorized to vote in this election. In some embodiments, only the smart contract may have access to data within the vote (e.g., associating the voter with the candidate they voted for). Accordingly, this information may remain confidential. In some embodiments, a different election public/private key pair may be used per election, for example, as determined by the election commission.

Figure 30:
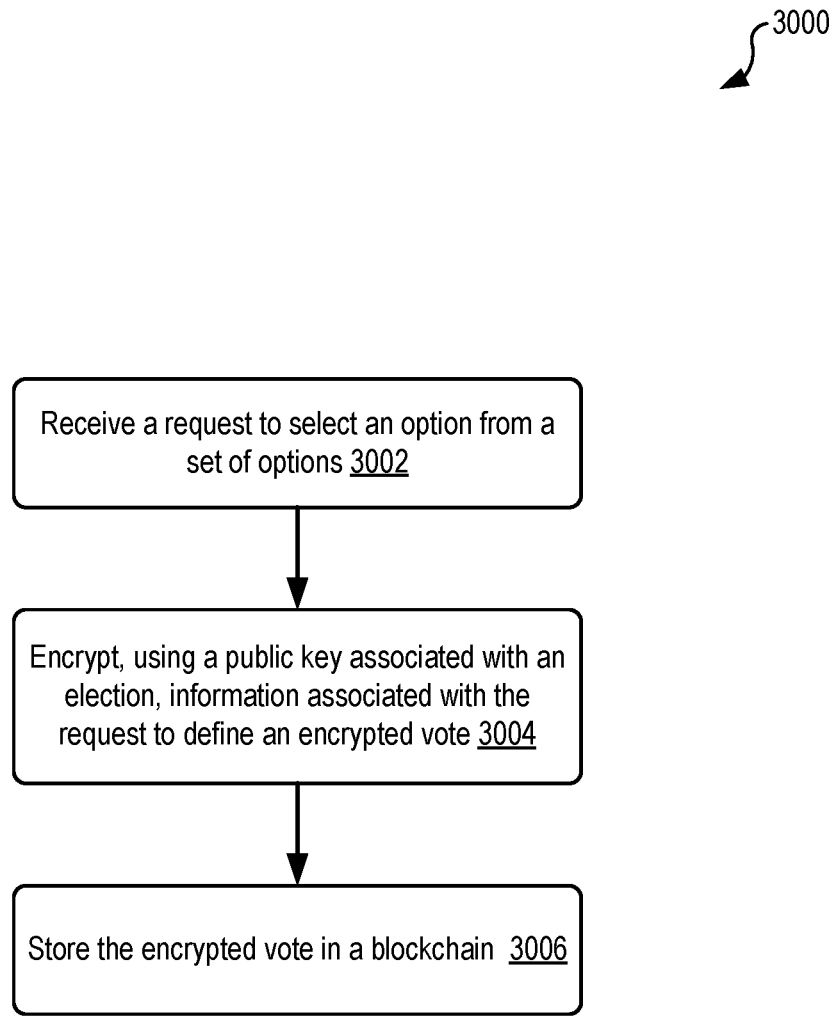
FIG. 30 illustrates another flow diagram showing an example process for a user device participating in casting a vote in an election, according to some embodiments.

FIG. 30 illustrates another flow diagram showing an example process for a user device participating to cast a vote in an election, according to some embodiments. In some embodiments, the process 3000 may be performed by the user device 104 of FIG. 1 in conjunction with the service provider 102 and a blockchain network (e.g., consortium member system 106).

At block 3002, the process 3000 include a user device receiving a request to select an option from a set of options. For example, an application of the user device 104 may receive a request to selection an option from a set of options. The options may be presented by the application as a user interface on a display of the user device. The options may correspond to candidates in an election, and selecting an option may include the user's selected candidate. In some embodiments, the user may be limited to one option. In some embodiments, the election may have multiple races each including its own set of options (e.g., candidates). The request may be received via user input at the user interface. The request may include a user profile cryptographic key that represents a hash of a user profile associated with a user, and information identifying a particular option of the set of options.

At block 3004, the process 3000 includes the user device encrypting, using a public key associated with an election, information associated with the request to define an encrypted vote. The public key may be unique to the election and may have been generated with an election commission created the election, as described herein.

At block 3006, the process 3000 includes the user device storing (e.g., via a service provider) the encrypted vote in a blockchain network. The blockchain may be implemented by a public consortium of multiple entities, which, in some embodiments, may be specific to the election jurisdiction. In some embodiments, the user device 104 may transmit a transaction request to the service provider 102, which may invoke the transaction request on behalf of the user device 104 with the blockchain network. In some embodiments, the user device 104 may interact directly with the blockchain network. In some embodiments, the transaction request may be signed with a user private key of the user (e.g., associated with the user identifier and/or voter identifier of the user). In some embodiments, this may enable the blockchain network to authenticate the signature of the vote (e.g., that the particular user is eligible to vote). In some embodiments, by encrypting the vote with the public key of the election, and, in part because no single entity has the private key needed to decrypt a vote, information associated with which candidate the voter voted for may remain confidential to other parties (e.g., unknown to the service provider, other candidates, other voters, the election commission, etc.).

Figure 31:
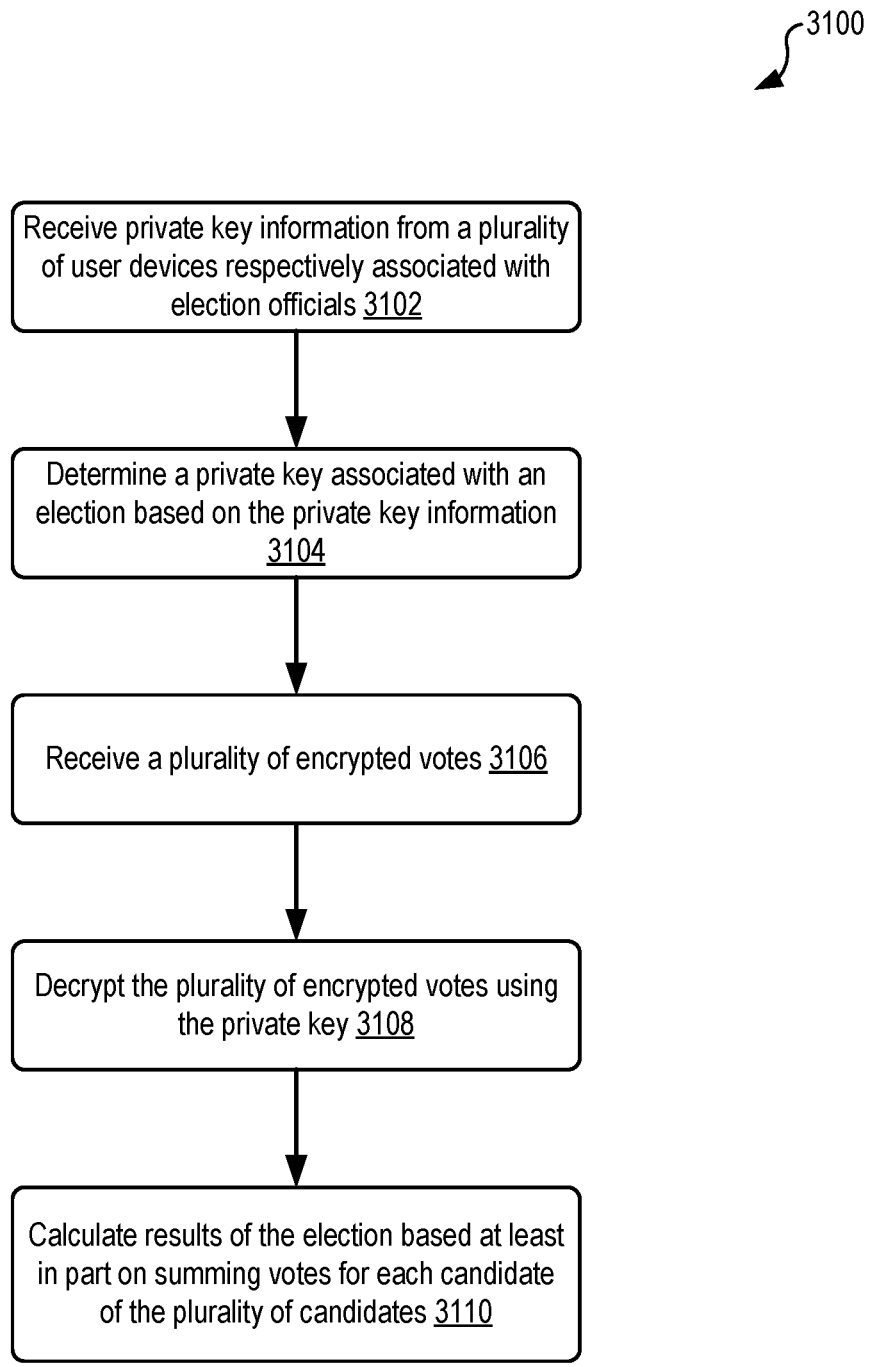
FIG. 31 illustrates another flow diagram showing an example process for obtaining votes and calculating the results of an election, according to some embodiments.

FIG. 31 illustrates another flow diagram showing an example process for a service provider system facilitating an election, according to some embodiments. In some embodiments, process 3100 may be performed by the service provider 102 in conjunction with a blockchain network (e.g., consortium member system 106). In some embodiments, one or more operations of process 3100 may be similar to as described in reference to FIG. 27 and/or FIG. 28. In process 3100, encrypted votes are received by a blockchain network, decrypted using at least a portion of a private key that is formed from fragment parts that are respectively received from election administrator user devices, and votes are counted based on the candidate voted for within each vote, to determine an outcome for the election.

At block 3102, the process 3100 includes receiving private key information from a plurality of user devices respectively associated with an election official. For example, the service provider 102 (and/or an affiliated blockchain network) may receive private key fragments of a previously determined private key (e.g., previously determined by an election commission and distributed to user devices of the election officials).

At block 3104, the process 3100 includes determining a private key associated with an election based on the received private key information. In some embodiments, consortium member systems of the blockchain network may respectively perform one or more operations of block 3104. For example, as described herein, the service provider 102 may transmit the private key fragments to the affiliated blockchain network. In some embodiments, each consortium member system of the plurality of consortium member systems of the blockchain network may, respectively, store and execute a smart contract for the election. In some embodiments, a member system (e.g., the smart contract) may receive the plurality of private key fragments, re-combine the fragments, and determine if the election may proceed (e.g., based on whether a sufficient number of fragments are received). If the election may proceed, then the smart contract may begin to process encrypted votes, as described below.

At block 3106, the process 3100 includes receiving, by the service provider, a plurality of encrypted votes. In some embodiments, the service provider 102 may transmit each encrypted vote of the plurality of encrypted votes to member systems of the blockchain network.

At block 3108, the process 3100 includes decrypting the plurality of encrypted votes using the private key. For example, each consortium member system, respectively executing the smart contract, may decrypt a vote, which is signed with the election public key, using the private key for the election. In some embodiments, the smart contract may perform any suitable verifications of the vote, for example, verifying that the particular voter identifier associated with the vote is eligible to vote in the election. In some embodiments, the smart contract may verify a user profile cryptographic key that is included with the vote.

At block 3110, the process 3100 includes calculating, by each consortium member system, the results of the election based at least in part on summing votes for each candidate of the plurality of candidates. In some embodiments, upon the smart contract of each consortium member system decrypting each vote and determining which candidate was selected by the vote, the smart contract may thereby compute the winner of the election. The blockchain network may thereafter collectively agree on the winner of election.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art. Indeed, the methods and systems described herein may be embodied in a variety of other forms; furthermore, various omissions, substitutions, and changes in the form of the methods and systems described herein may be made without departing from the spirit of the present disclosure. The accompanying claims and their equivalents are intended to cover such forms or modifications as would fall within the scope and spirit of the present disclosure.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multipurpose microprocessor-based computing systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

Conditional language used herein, such as, among others, "can," "could," "might," "may," "e.g.," and the like, unless specifically stated otherwise, or otherwise understood within the context as used, is generally intended to convey that certain examples include, while other examples do not include, certain features, elements, and/or steps. Thus, such conditional language is not generally intended to imply that features, elements, and/or steps are in any way required for one or more examples or that one or more examples necessarily include logic for deciding, with or without author input or prompting, whether these features, elements, and/or steps are included or are to be performed in any particular example.

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain examples require at least one of X, at least one of Y, or at least one of Z to each be present.

Use herein of the word "or" is intended to cover inclusive and exclusive OR conditions. In other words, A or B or C includes any or all of the following alternative combinations as appropriate for a particular usage: A alone; B alone; C alone; A and B only; A and C only; B and C only; and all three of A and B and C.

The use of the terms "a" and "an" and "the" and similar referents in the context of describing the disclosed examples (especially in the context of the following claims) are to be construed to cover both the singular and the plural, unless otherwise indicated herein or clearly contradicted by context. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. The use of "adapted to" or "configured to" herein is meant as open and inclusive language that does not foreclose devices adapted to or configured to perform additional tasks or steps. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. Additionally, the use of "based on" is meant to be open and inclusive, in that a process, step, calculation, or other action "based on" one or more recited conditions or values may, in practice, be based on additional conditions or values beyond those recited. Similarly, the use of "based at least in part on" is meant to be open and inclusive, in that a process, step, calculation, or other action "based at least in part on" one or more recited conditions or values may, in practice, be based on additional conditions or values beyond those recited. Headings, lists, and numbering included herein are for ease of explanation only and are not meant to be limiting.

The various features and processes described above may be used independently of one another, or may be combined in various ways. All possible combinations and sub-combinations are intended to fall within the scope of the present disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed examples. Similarly, the example systems and components described herein may be configured differently than described. For example, elements may be added to, removed from, or rearranged compared to the disclosed examples.

All references, including publications, patent applications, and patents, cited herein are hereby incorporated by reference to the same extent as if each reference were individually and specifically indicated to be incorporated by reference and were set forth in its entirety herein.

What is claimed is:

1. A service provider, comprising:
    a memory configured to store computer-executable instructions; and
    a processor configured to access the memory and execute the computer-executable instructions to perform operations of an onboarding system, a cryptographic system, and a consortium member management system;
    the onboarding system comprising an artificial intelligence module, the onboarding system configured to:
        communicate with user devices to collect user image data and user biometric data; and
        generate user profiles based at least in part on the user image data and the user biometric data;
    the cryptographic system configured to:
        perform cryptographic functions comprising:
            hashing data of the user profiles to generate user profile cryptographic keys;
            hashing data of documents to generate document cryptographic keys;
            generating user cryptographic keys, a user cryptographic key being operable for authenticating a user identifier of a user device to execute a transaction via a plurality of consortium member systems; and
            responsive to a request, verifying an association between a particular user profile cryptographic key and a particular document cryptographic key, the association previously stored to the plurality of consortium member systems; and
    the consortium member management system configured to send at least one of the document cryptographic keys, the user cryptographic keys, or the user profile cryptographic keys to the plurality of consortium member systems, each consortium member system comprising a distributed ledger configured to store the cryptographic keys received from the consortium member management system.

2. The service provider of claim 1, wherein a user profile cryptographic key includes a unique user profile hash that is generated based at least in part on hashing at least one of user image data or user biometric data for a respective user.

3. The service provider of claim 1, wherein the request is associated with verifying that a particular user identifier of a user, which is determined to be associated with the particular user profile cryptographic key, is indicated as being an owner of a particular document associated with the particular document cryptographic key.

4. The service provider of claim 1, wherein the onboarding system is configured to generate a particular a user profile of a user based at least in part on confirming, using a machine learning model, that particular user image data of the user matches particular user biometric data of the user.

5. The service provider of claim 1, wherein generating user cryptographic keys for a particular user comprises generating a user public key and a user private key, and wherein the user public key is one of the cryptographic keys stored to at least one of: (I) the service provider, or (II) the plurality of consortium member systems.

6. The service provider of claim 5, further comprising:
an application system configured to provide one or more applications for user devices to communicate with the service provider, and store and retrieve documents, and wherein the application system is configured to receive, from a user device, user credentials operable for generating the user private key, and wherein the user private key is operable for performing at least one of: (I) logging on to the service provider, or (II) authenticating a user identifier to execute a particular transaction based at least in part on signing the particular transaction with the user private key.

7. The service provider of claim 6, wherein a particular consortium member system executes a smart contract to authenticate the particular transaction, the authentication based at least in part on verifying a signature of the particular transaction using the user public key previously stored to the particular consortium member system.

8. The service provider of claim 6, wherein a user device stores one or more smartcards, a particular smartcard of the one or more smartcards being associated with a particular user role within a particular organizational entity, wherein the particular user role is associated with one or more access rights.

9. A computer-implemented method, comprising:
receiving, from a user device, user image data and user biometric data;
generating a user profile cryptographic key based at least in part on hashing the user image data and the user biometric data, the user profile cryptographic key being associated with a user identifier;
generating user cryptographic keys for the user identifier, the user cryptographic keys including a user public key and a user private key, a user cryptographic key being operable for authenticating the user identifier of the user device to execute a transaction via a plurality of consortium member systems;
storing at least the user public key and the user profile cryptographic key to the plurality of consortium member systems, the storing being performed in association with the user identifier;
receiving, from the user device, a request to store a document in association with the user identifier, the request signed with the user private key;
authenticating the request with the user public key;
generating a document cryptographic key of the document, the document cryptographic key generated in response to the authenticated request; and
executing a transaction request to the plurality of consortium member systems, the transaction request requesting respective consortium member systems to store data objects in association with one another, the data objects including at least: (I) the document cryptographic key, and (II) the user profile cryptographic key, the transaction request signed by the user private key.

10. The computer-implemented method of claim 9, wherein the user profile cryptographic key that is stored to the consortium member systems in association with the document cryptographic key corresponds to a first instance key, and wherein the method further comprises:
receiving, subsequent to executing the transaction request, a second request to verify that the document is associated with the user identifier, the second request including a second instance of the user profile cryptographic key; and
verifying that the document is associated with the user identifier based at least in part on obtaining a confirmation that the first instance key, previously stored in association with the document cryptographic key, matches the second instance of the user profile cryptographic key.

11. The computer-implemented method of claim 9, further comprising:
determining, using a machine learning model, that the user image data matches the user biometric data.

12. The computer-implemented method of claim 11, further comprising:
providing an instruction to the user device that requests a user to: (I) provide a jurisdictional identifier of the user, the user image data including the jurisdictional identifier, and (II) move a face of the user in different directions over a period of time such that the movement is captured via a sequence of livestream images, wherein the user biometric data includes the sequence of livestream images.

13. The computer-implemented method of claim 9, further comprising:
receiving user credentials of a user associated with the user identifier;
generating recovery keys for the user based at least in part on the user credentials of the user, the recovery keys including a recovery private key and a recovery public key; and
generating the user cryptographic keys based at least in part on hashing the recovery private key and one or more of the user credentials.

14. The computer-implemented method of claim 13, further comprising:
receiving an indication from the user device that the user does not have access to one or more keys, including (I) a recovery key, or (II) a user cryptographic key; and
responsive to receiving user credentials of the user, regenerating the one or more keys.

15. The computer-implemented method of claim 12, further comprising:
storing, to the plurality of consortium member systems, and, in association with the user profile cryptographic key, a multi-dimensional vector that corresponds to a representation of a face of the user, the multi-dimensional vector operable for authenticating the user.

16. A non-transitory computer readable medium storing specific computer-executable instructions that, when executed by a processor of a service provider, cause the service provider to:
receive, from a user device, user image data and user biometric data;
generate a user profile cryptographic key based at least in part on hashing the user image data and the user biometric data, the user profile cryptographic key being associated with a user identifier;
generate user cryptographic keys for the user identifier, the user cryptographic keys including a user public key and a user private key, a user cryptographic key being operable for authenticating the user identifier of the user device to execute a transaction via a plurality of consortium member systems;
store at least the user public key and the user profile cryptographic key to the plurality of consortium member systems, the storing being performed in association with the user identifier;

receive, from the user device, a request to store a document in association with the user identifier, the request signed with the user private key;

authenticate the request with the user public key generate a document cryptographic key of the document, the document cryptographic key generated in response to the authenticated request; and execute a transaction request to the plurality of consortium member systems, the transaction request requesting respective consortium member systems to store data objects in association with one other, the data objects including at least: (I) the document cryptographic key, and (II) the user profile cryptographic key, the transaction request signed by the user private key.

17. The non-transitory computer readable medium of claim 16, further comprising additional instructions that, when executed by the processor of the service provider, cause the service provider to perform additional operations comprising:

generating an organization identifier for an organizational entity; and storing the organization identifier to the plurality of consortium member systems.

18. The non-transitory computer readable medium of claim 17, further comprising additional instructions that, when executed by the processor of the service provider, cause the service provider to perform additional operations comprising:

generating a role cryptographic key that is associated with a role of a user within the organizational entity, the role cryptographic key being associated with one or more data objects including at least one of the organization identifier, the user profile cryptographic key, the user identifier of the user, a role identifier, or the user public key; and storing the role cryptographic key to the plurality of consortium member systems in association with the one or more data objects.

19. The non-transitory computer readable medium of claim 18, further comprising additional instructions that, when executed by the processor of the service provider, cause the service provider to perform additional operations comprising:

provisioning to the user device a smartcard, the smartcard including the role cryptographic key associated with the role of the user within the organizational entity, wherein the smartcard is one of one or more smartcards, respectively associated with different roles that the user has within the organizational entity, and wherein the smartcard corresponds to at least one of a physical smartcard or an electronic smartcard.

20. The non-transitory computer readable medium of claim 19, further comprising additional instructions that, when executed by the processor of the service provider, cause the service provider to perform additional operations comprising:

receiving, from the user device, a second request to store a second document on behalf of the role of the user within the organizational entity;

generating a second document cryptographic key of the second document; and executing a second transaction request to the plurality of consortium member systems, the second transaction request requesting a smart contract of a consortium member system to execute a function to store, in association, at least the second document cryptographic key and the role identifier of the user within the organizational entity, wherein the second transaction request is signed with the role cryptographic key of the user, and wherein the smart contract authenticates that the second transaction request is executed on behalf of the role of the user within the organizational entity based at least in part on verifying a signature of the second transaction request.

* * * * *